United States Patent
Arstein et al.

(10) Patent No.: US 10,047,887 B2
(45) Date of Patent: Aug. 14, 2018

(54) CONDUIT GRIPPING DEVICE HAVING RETAINING STRUCTURE FOR CONDUIT FITTING

(71) Applicant: Swagelok Company, Solon, OH (US)

(72) Inventors: Dale C. Arstein, Highland Heights, OH (US); Cal R. Brown, Lyndhurst, OH (US); Mark A. Clason, Orwell, OH (US); Peter C. Williams, Cleveland Heights, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 15/172,305

(22) Filed: Jun. 3, 2016

(65) Prior Publication Data

US 2016/0281892 A1    Sep. 29, 2016

Related U.S. Application Data

(63) Continuation of application No. 14/556,322, filed on Dec. 1, 2014, which is a continuation of application
(Continued)

(51) Int. Cl.
*F16L 19/06* (2006.01)
*F16L 33/207* (2006.01)
(Continued)

(52) U.S. Cl.
CPC ......... *F16L 33/2071* (2013.01); *F16L 19/083* (2013.01); *F16L 19/103* (2013.01); *Y10T 29/49826* (2015.01)

(58) Field of Classification Search
USPC .... 285/342, 343, 247, 254, 286, 289, 382.7, 285/3
See application file for complete search history.

(56) References Cited

U.S. PATENT DOCUMENTS

| 1,672,879 A | 6/1928 | Campbell, Jr. |
| 1,809,064 A | 6/1931 | Pearson |

(Continued)

FOREIGN PATENT DOCUMENTS

| CN | 1113665 | 12/1995 |
| CN | 201053546 | 4/2008 |

(Continued)

OTHER PUBLICATIONS

International Search Report and Written Opinion from PCT/US09/67508 dated Mar. 8, 2010.
(Continued)

*Primary Examiner* — Aaron M Dunwoody
(74) *Attorney, Agent, or Firm* — Calfee, Halter & Griswold LLP

(57) ABSTRACT

The disclosure presents exemplary embodiments of a cartridge nut concept for conduit fittings. The cartridge nut concept may include the feature of loosely retaining one or more conduit gripping devices with a fitting component such as a male or female threaded nut. The cartridge nut concept may be realized using one or more geometry or shape features or characteristics of one or more conduit gripping devices. Still further, the cartridge nut concept may be realized in combination with a ferrule cartridge concept.

26 Claims, 49 Drawing Sheets

Related U.S. Application Data

No. 13/009,325, filed on Jan. 19, 2011, now Pat. No. 8,931,810.

(60) Provisional application No. 61/297,066, filed on Jan. 21, 2010, provisional application No. 61/331,035, filed on May 4, 2010, provisional application No. 61/331,025, filed on May 4, 2010, provisional application No. 61/331,028, filed on May 4, 2010, provisional application No. 61/331,032, filed on May 4, 2010.

(51) Int. Cl.
*F16L 19/10* (2006.01)
*F16L 19/08* (2006.01)

(56) References Cited

U.S. PATENT DOCUMENTS

| | | |
|---|---|---|
| 2,389,233 A | 11/1945 | Cowles |
| 2,497,273 A | 2/1950 | Richardson |
| 2,547,889 A | 4/1951 | Richardson |
| 3,004,776 A | 10/1961 | Sebardt |
| 3,074,747 A | 1/1963 | Boughton |
| 3,083,989 A | 4/1963 | Press |
| 3,103,373 A | 9/1963 | Lennon et al. |
| 3,215,457 A | 11/1965 | Teeters |
| 3,218,096 A | 11/1965 | Press |
| 3,219,367 A | 11/1965 | Franck |
| 3,250,550 A | 5/1966 | Lyon |
| 3,306,637 A | 2/1967 | Press et al. |
| 3,321,947 A | 5/1967 | Teeters |
| 3,325,192 A | 6/1967 | Sullivan |
| 3,433,508 A | 3/1969 | Teeters |
| 3,498,647 A | 3/1970 | Schroder |
| 3,582,115 A | 6/1971 | Clague |
| 3,695,640 A | 10/1972 | Clague |
| 3,707,302 A | 12/1972 | Hiszpanski |
| 3,972,547 A | 8/1976 | Itoya |
| 4,022,597 A | 5/1977 | Kotsakis |
| 4,076,286 A | 2/1978 | Spontelli |
| 4,136,897 A | 1/1979 | Haluch |
| 4,309,050 A | 1/1982 | Legris |
| 4,328,980 A | 5/1982 | Normark |
| 4,500,117 A | 2/1985 | Ayers et al. |
| 4,575,274 A | 3/1986 | Hayward |
| 4,592,574 A | 6/1986 | Vollmuth et al. |
| 4,805,932 A | 2/1989 | Imhof et al. |
| 5,351,998 A | 10/1994 | Behrens et al. |
| 5,388,866 A | 2/1995 | Schlosser |
| 5,568,910 A | 12/1996 | DelNegro et al. |
| 5,882,050 A | 3/1999 | Williams et al. |
| 5,961,160 A | 10/1999 | Frohlich |
| 6,079,949 A | 6/2000 | Albino et al. |
| 6,629,708 B2 | 10/2003 | Williams et al. |
| 6,695,027 B2 | 2/2004 | Hashimoto |
| 6,905,142 B2 | 6/2005 | Do |
| 7,108,288 B2 | 9/2006 | Bennett et al. |
| 7,316,777 B2 | 1/2008 | Loy, Jr. |
| 7,496,936 B2 | 2/2009 | Fujimura et al. |
| 7,690,693 B2 | 4/2010 | Moner |
| 8,007,013 B2 | 8/2011 | Arstein |
| 8,641,099 B2 | 2/2014 | Cuva |
| 2002/0148128 A1 | 10/2002 | Williams |
| 2005/0097763 A1 | 5/2005 | Williams |
| 2006/0006651 A1 | 1/2006 | Watanabe |
| 2006/0138772 A1 | 6/2006 | Galante et al. |
| 2009/0045624 A1 | 2/2009 | Nakata et al. |
| 2010/0148501 A1 | 6/2010 | Bennett |
| 2011/0181042 A1 | 7/2011 | Clason |
| 2013/0106103 A1 | 5/2013 | Horsfall et al. |
| 2014/0232111 A1 | 8/2014 | Shimamura |
| 2014/0353969 A1 | 12/2014 | Shimamura |
| 2015/0167873 A1 | 6/2015 | Arstein |
| 2016/0195204 A1 | 7/2016 | Bennett |

FOREIGN PATENT DOCUMENTS

| | | | |
|---|---|---|---|
| CN | 101305232 | 11/2008 | |
| CN | 101617159 | 12/2009 | |
| CN | 101802474 | 8/2010 | |
| DE | 841091 | 6/1952 | |
| DE | 4219722 A1 * | 12/1993 | ............. F16L 19/10 |
| EP | 1647753 | 4/2006 | |
| GB | 2032555 | 5/1980 | |
| JP | S57187985 | 11/1982 | |
| JP | 11-030368 | 2/1999 | |
| JP | 2005-337326 | 12/2005 | |
| JP | 2007146893 | 6/2007 | |
| JP | 2008512628 | 4/2008 | |
| JP | 2009085430 | 4/2009 | |
| JP | 2009097715 | 5/2009 | |
| JP | 2010060047 | 3/2010 | |
| WO | 2005/106310 | 11/2005 | |
| WO | 2006/084766 | 8/2006 | |
| WO | 09/03015 | 12/2008 | |
| WO | 2009/018079 | 2/2009 | |
| WO | 2009/034948 | 3/2009 | |
| WO | 10/129261 | 11/2010 | |

OTHER PUBLICATIONS

Office action from Israeli Patent Application No. 220969 dated Jan. 25, 2015 along with English translation of relevant portions of action.
Office action from Japanese Application No. 2012-550082 dated Mar. 26, 2015.
Office action from Chinese Application No. 201180015523.8 dated Jun. 19, 2015.
Office action from Israeli Application No. 242651 dated May 8, 2016 along with English translation of relevant portions of action.
Office action from U.S. Appl. No. 14/556,322 dated Feb. 10, 2017.
Office action from European Application No. 16201872.5 dated Feb. 9, 2017.
Office action from Canadian Application No. 2,787,338 dated Aug. 31, 2016.
Office action from Japanese Application No. 2015-187690 dated Jul. 20, 2016.
Office action from Korean Application No. 10-2012-7021423 dated Jun. 26, 2017.
Office action from Korean Application No. 10-2017-7009809 dated Jul. 3, 2017.
Office action from U.S. Appl. No. 14/556,322 dated Jul. 11, 2017.
Office action from Chinese Application No. 201610086856.4 dated Jun. 2, 2017.
Office action from Chinese Application No. 201610087737.0 dated Jun. 22, 2017.
Office action from Chinese Application No. 201510731712.5 dated Jul. 10, 2017.
Office action from Canadian Application No. 2,787,338 dated Jul. 19, 2017.
Office action from Japanese Application No. 2016-092294 dated May 10, 2017.
Office action from Chinese Application No. 201610087714.X dated Apr. 1, 2017.
Search Report from European Application No. 16201872 dated Feb. 1, 2017.
Office action from Chinese Application No. 201510731712.5 dated Feb. 4, 2017.
Office action from Chinese Application No. 201610087190.4 dated Apr. 1, 2017.
Office action from U.S. Appl. No. 14/707,306 dated Aug. 11, 2017.
Office action from Chinese Application No. 201510731726.7 dated Sep. 4, 2017, received on Sep. 20, 2017.
Office action form European Application No. 11735091.8 dated Sep. 28, 2017.
Notice of Allowance from U.S. Appl. No. 14/556,322 dated Oct. 16, 2017.

* cited by examiner

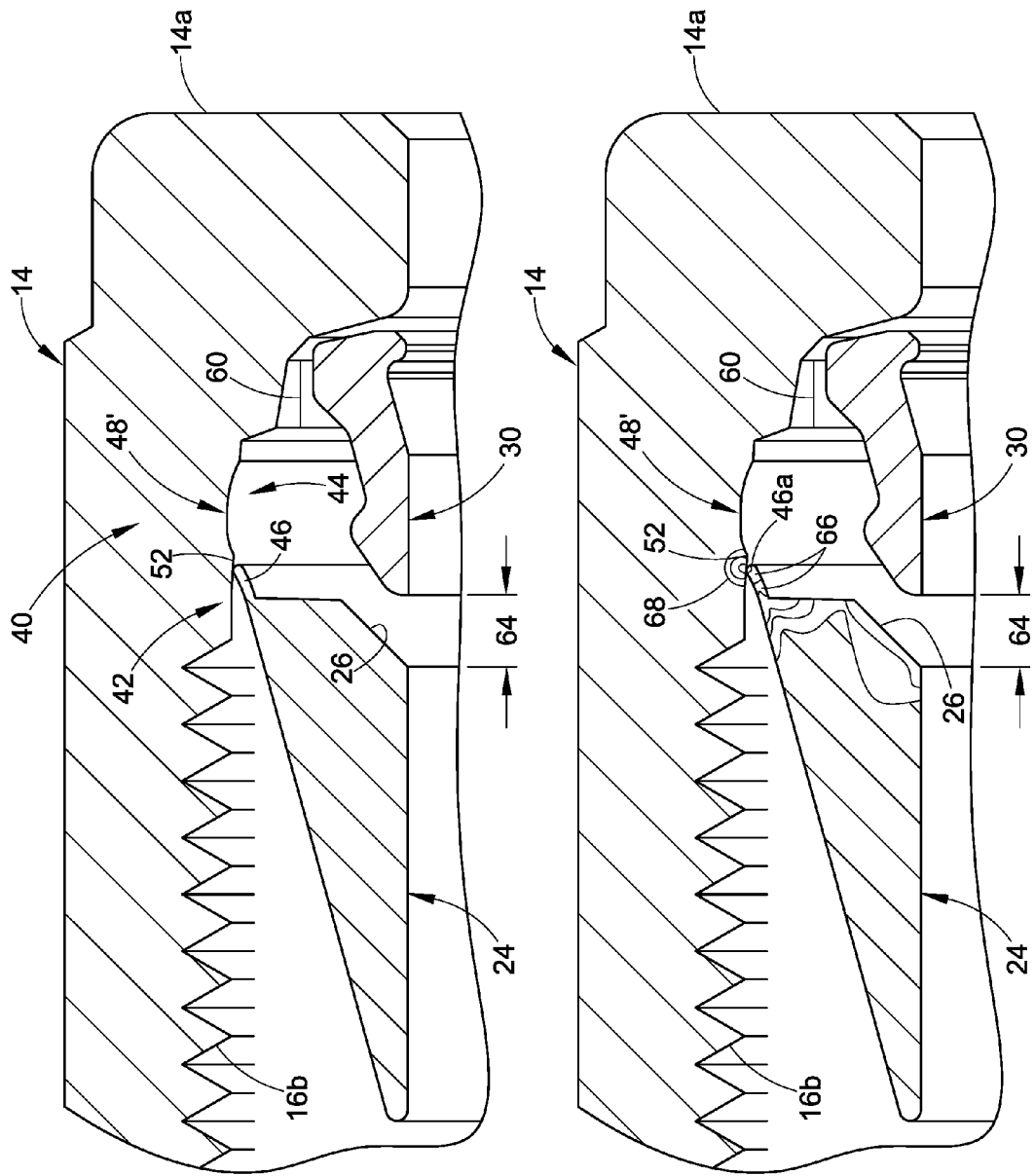

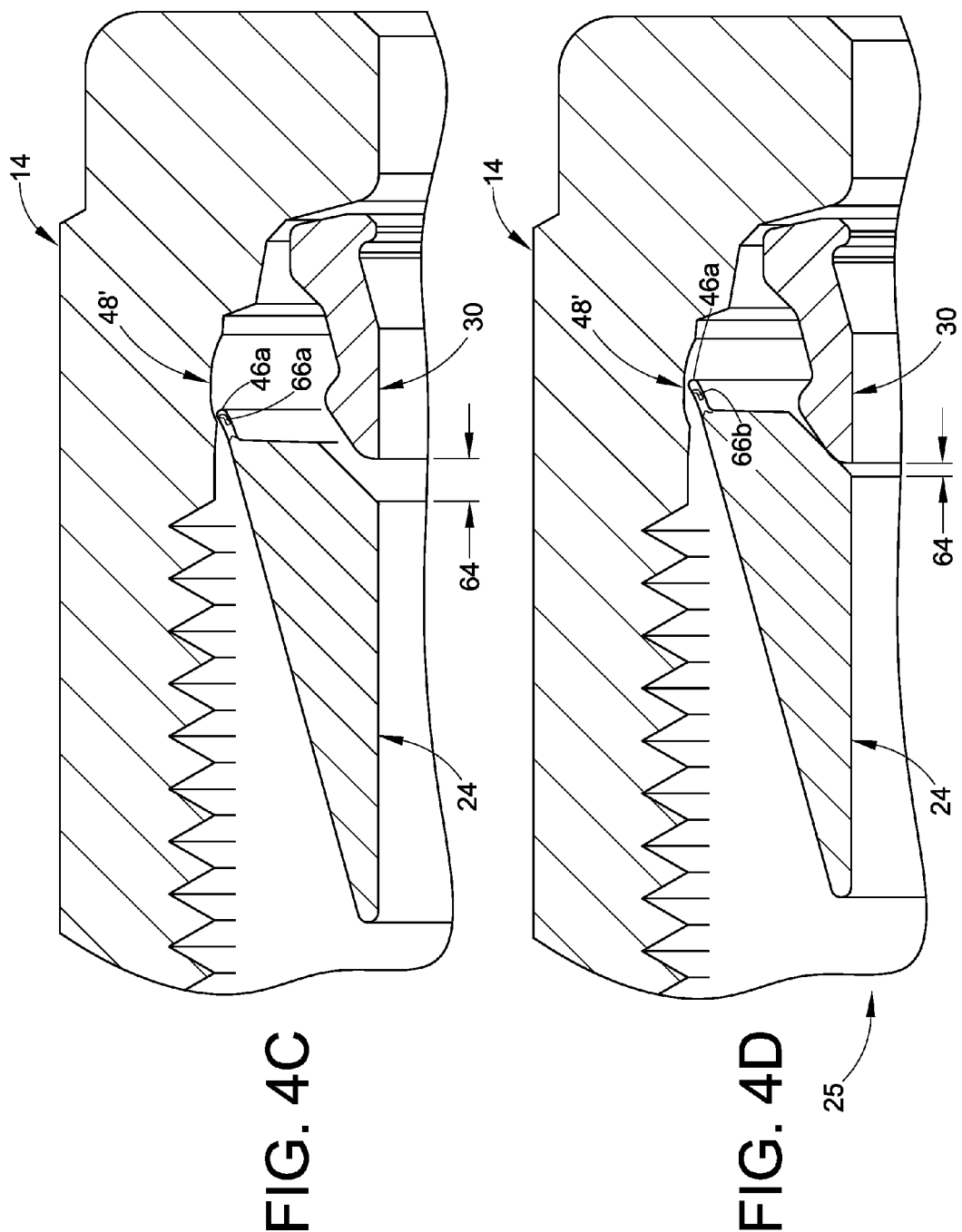

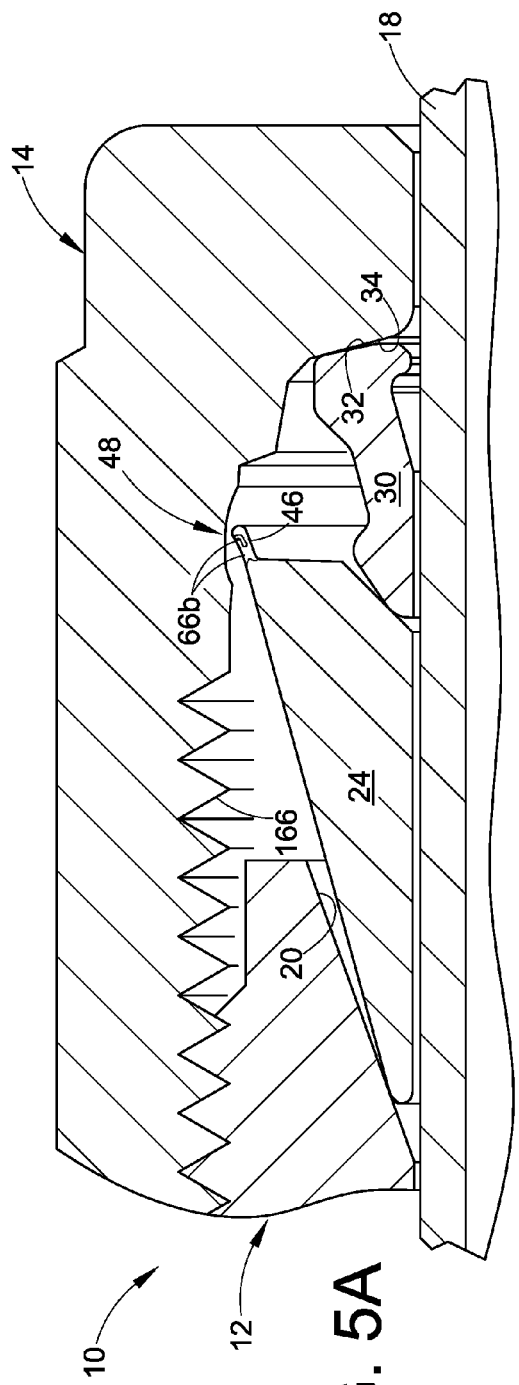
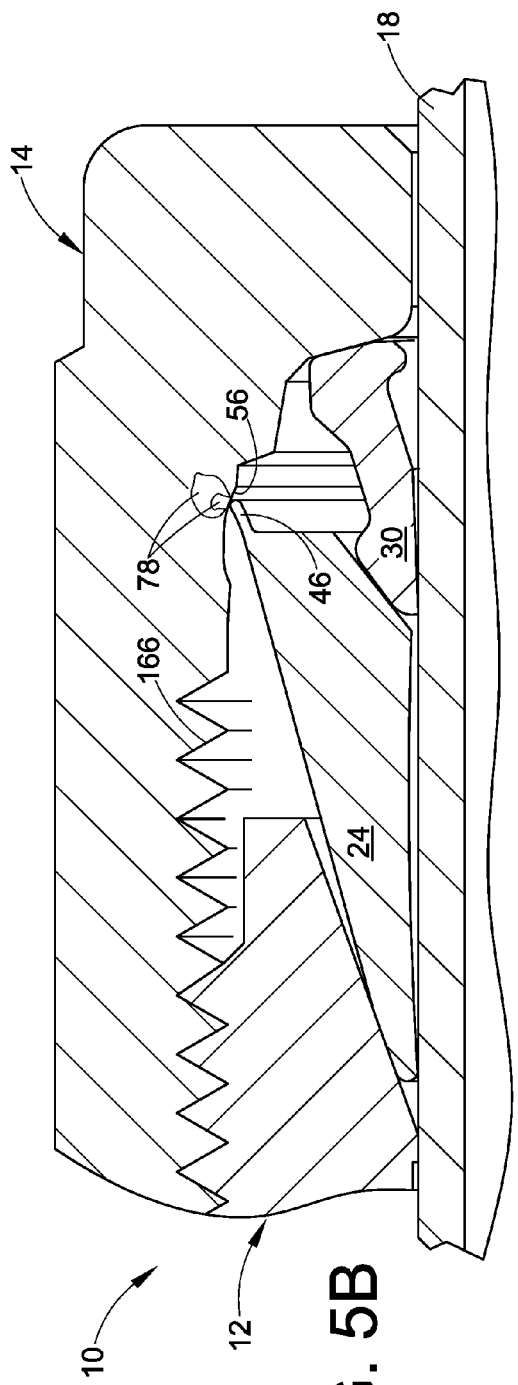
FIG. 5A
FIG. 5B

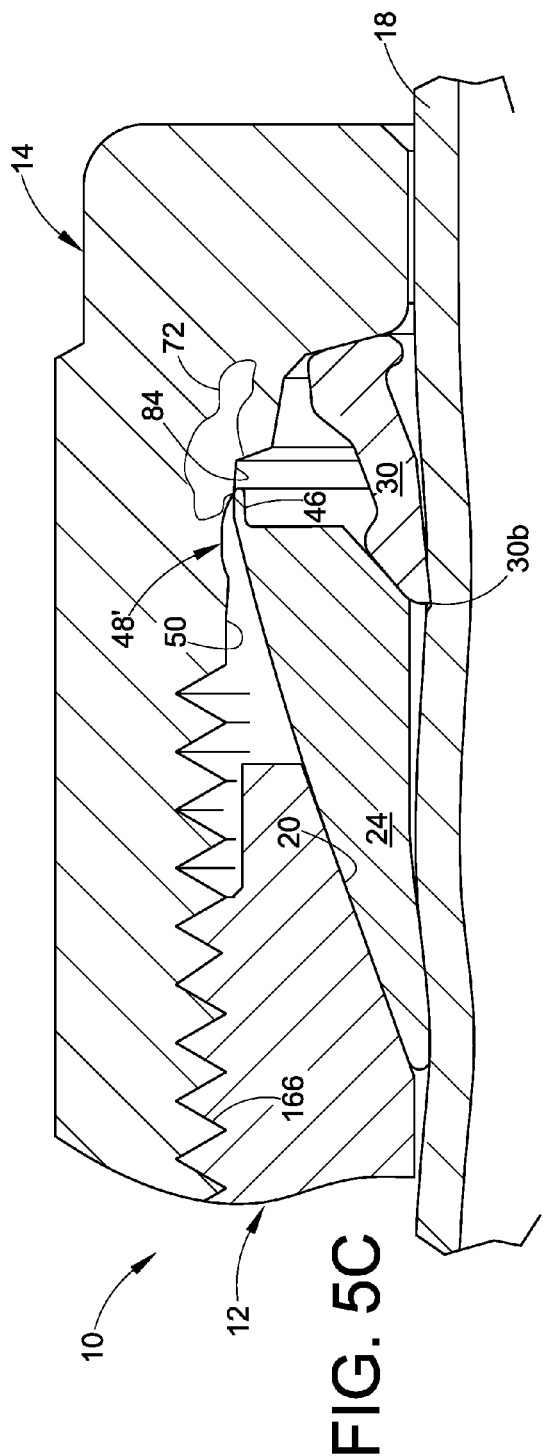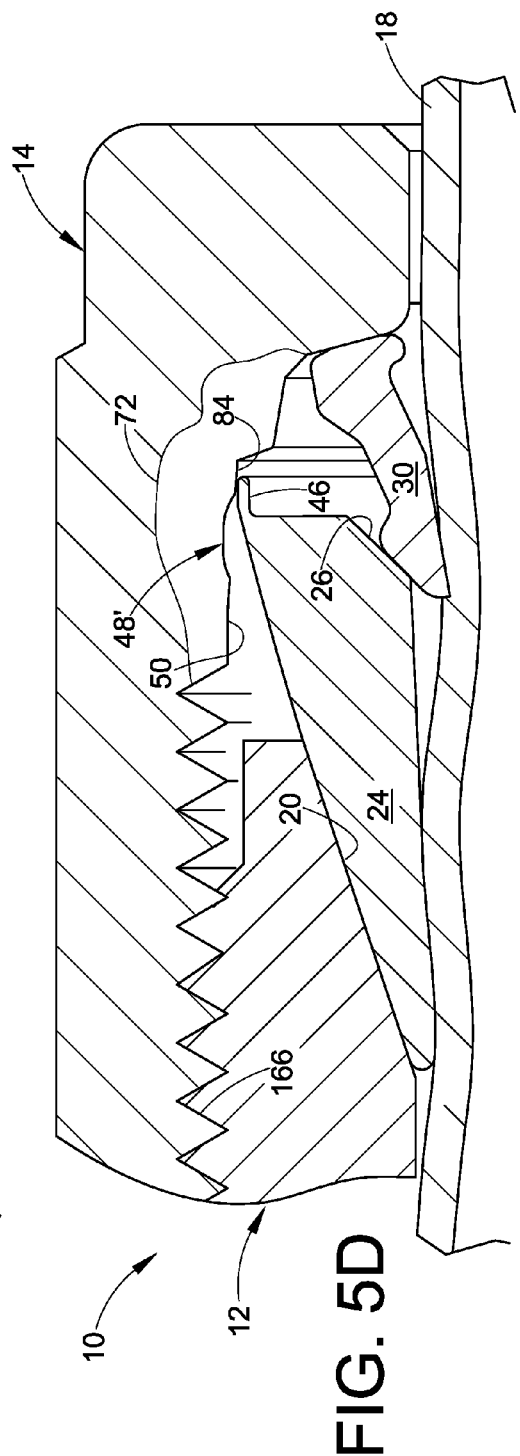

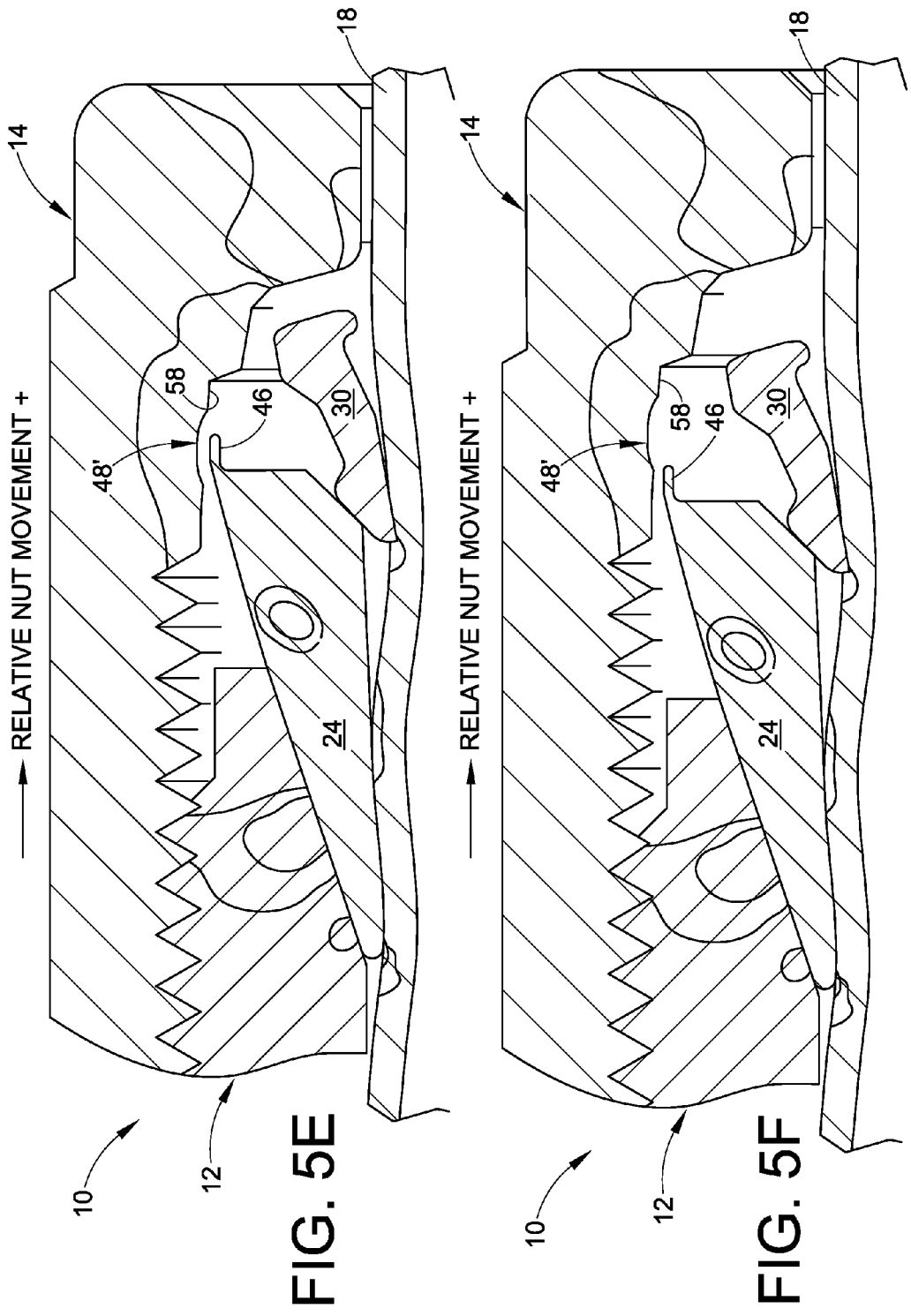

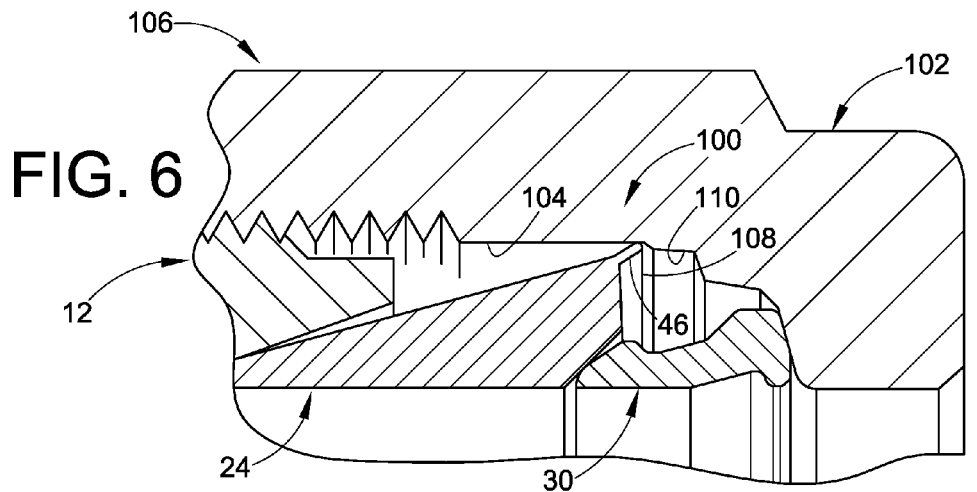
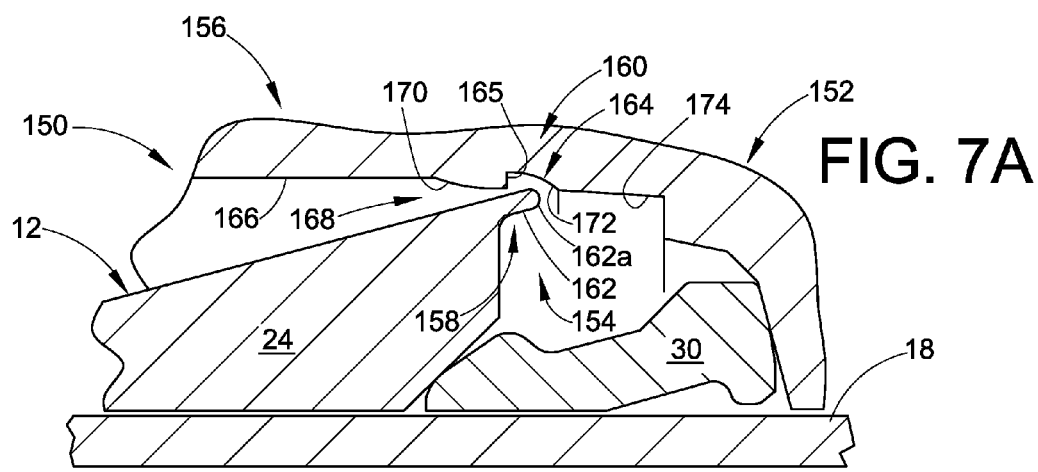
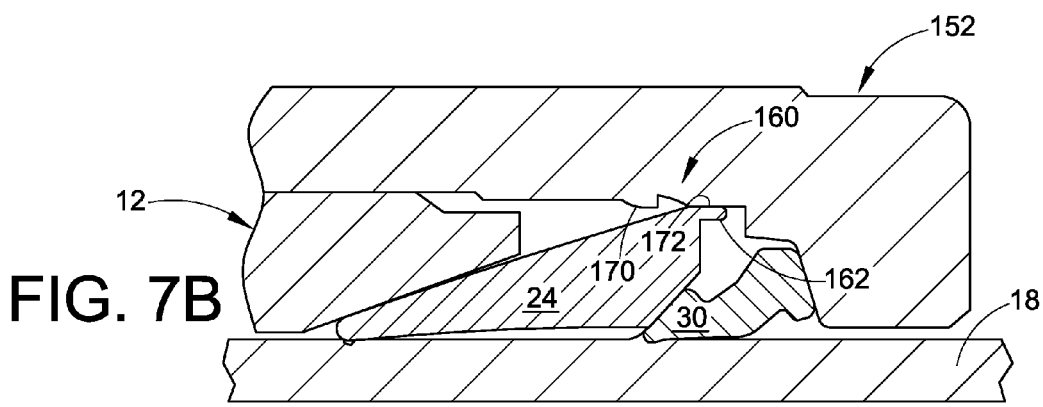

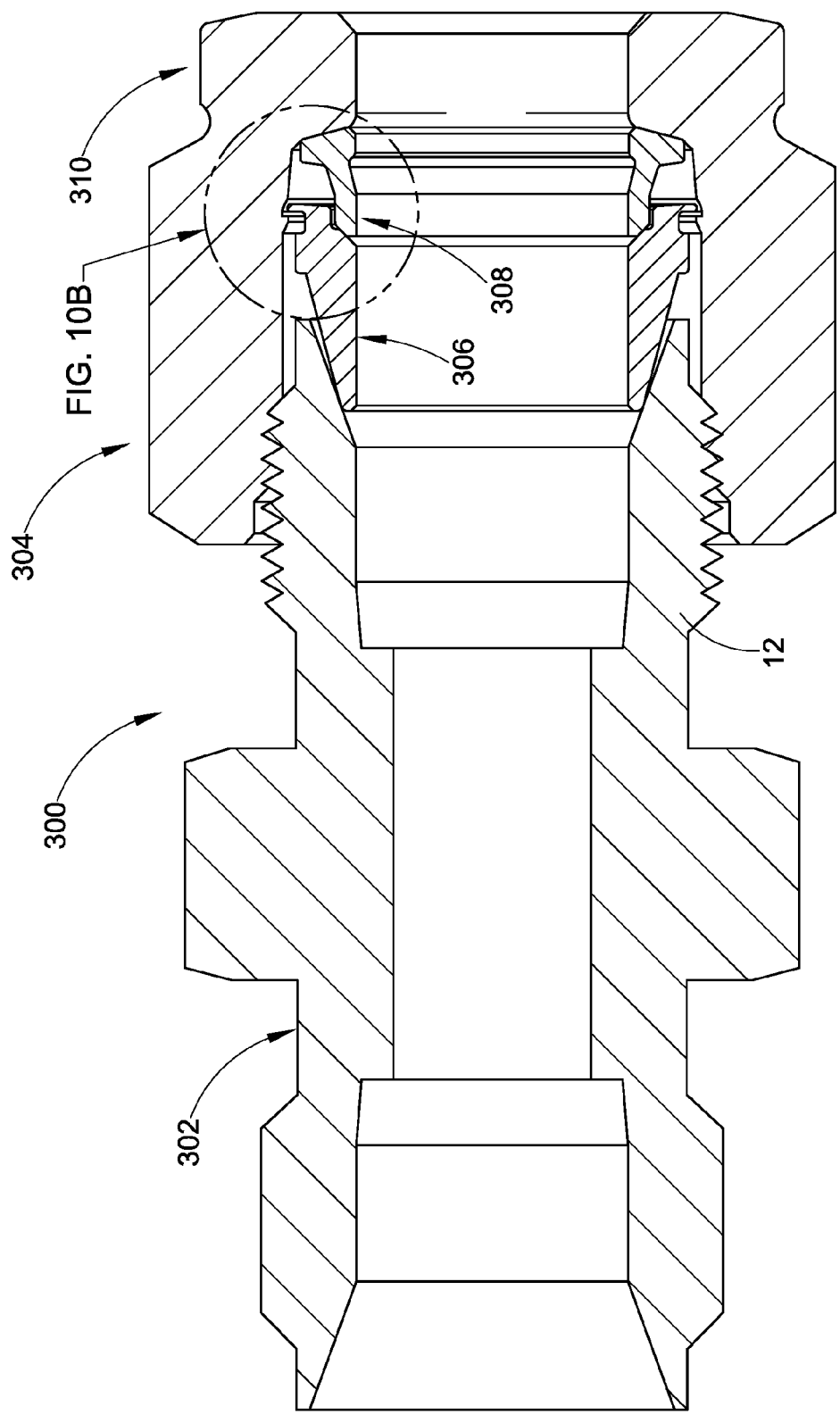

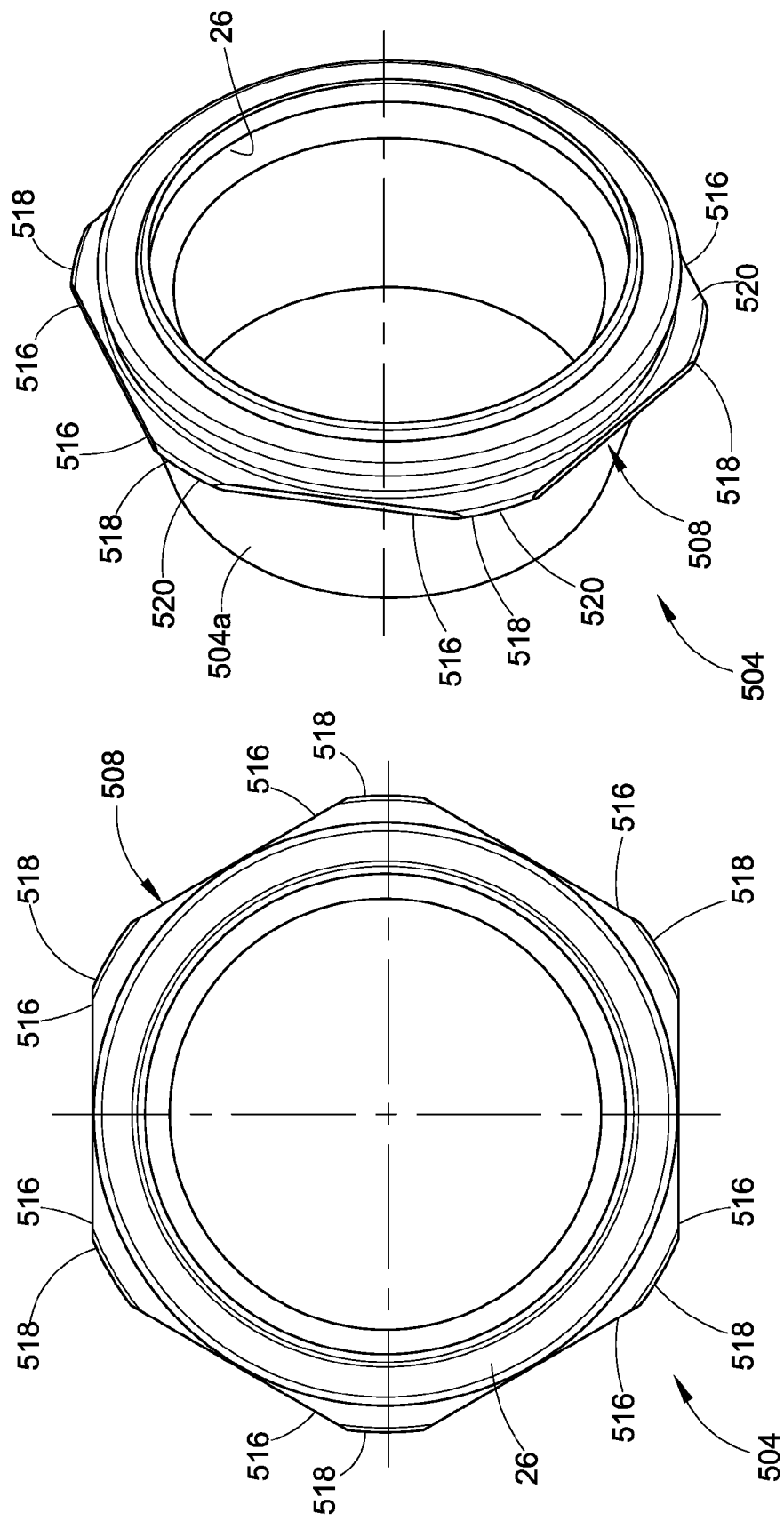

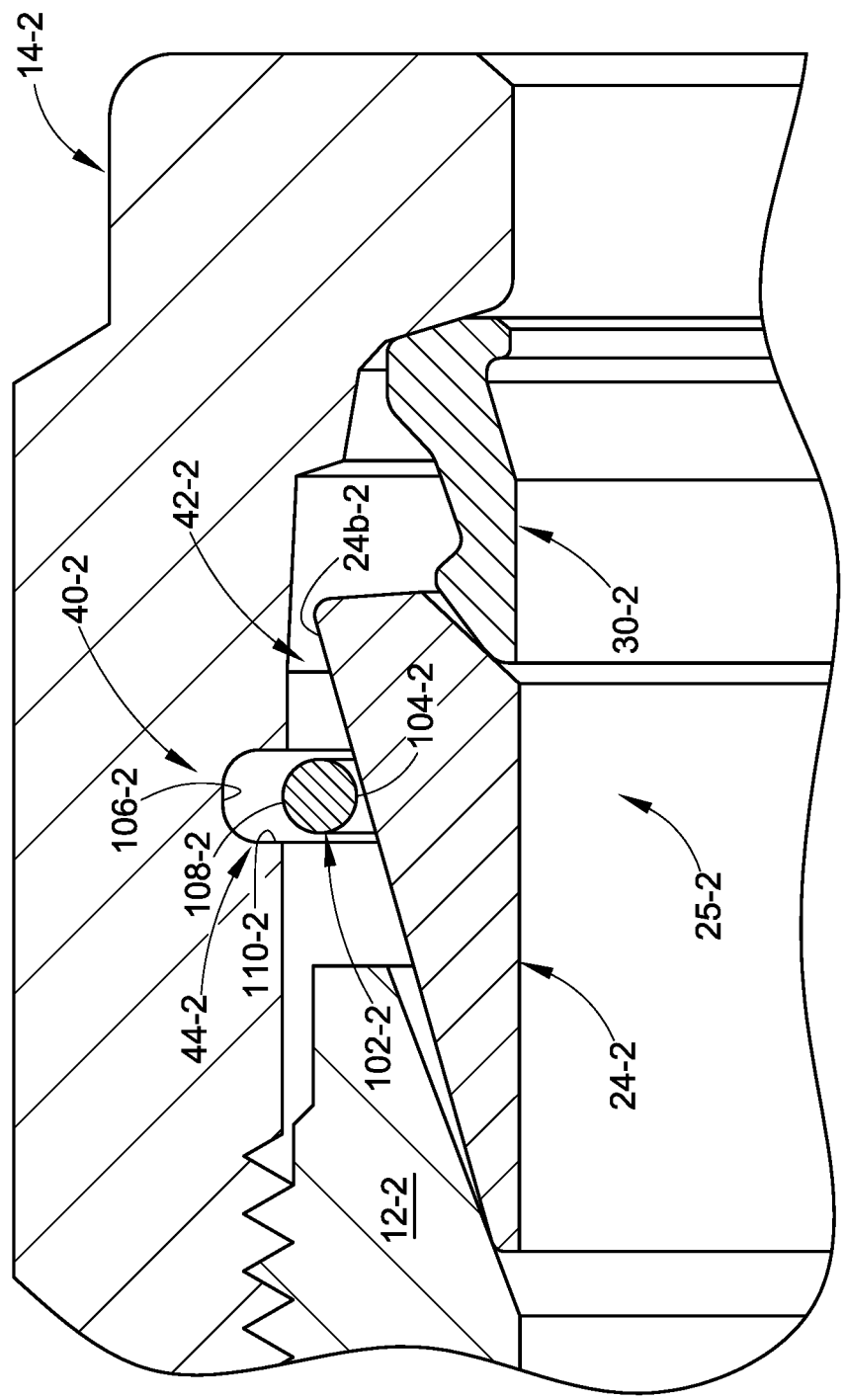

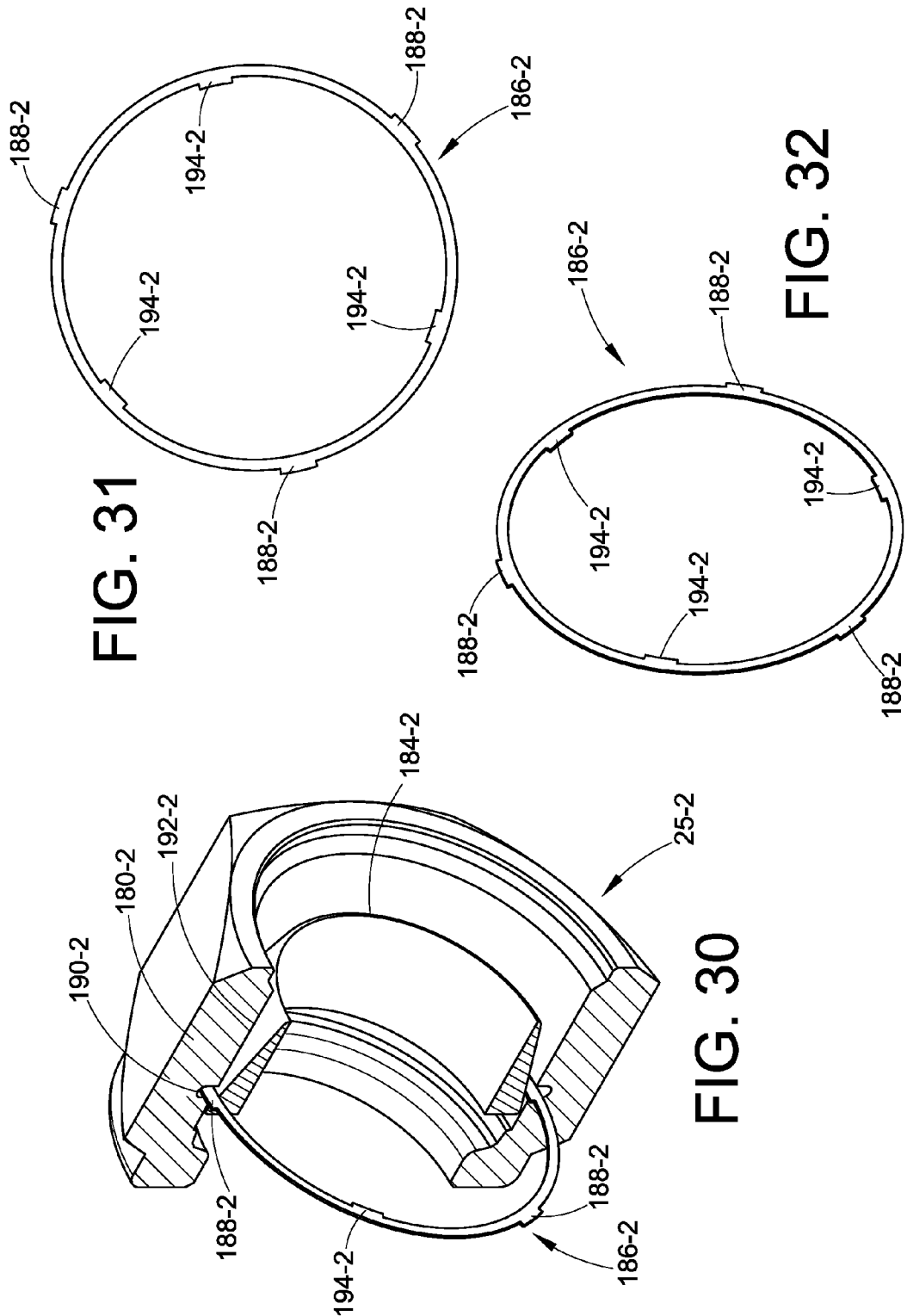

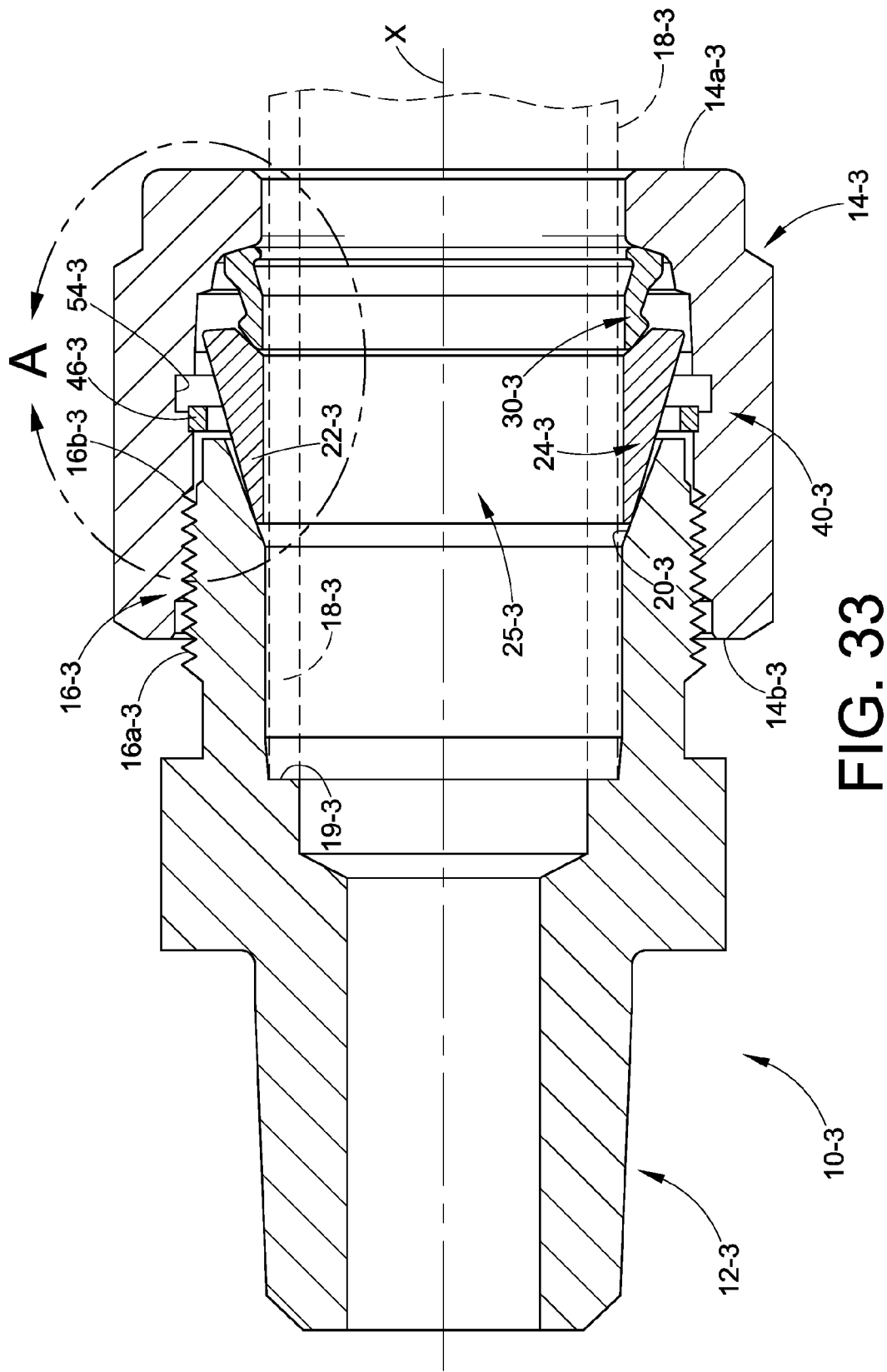

CONDUIT GRIPPING DEVICE HAVING RETAINING STRUCTURE FOR CONDUIT FITTING

RELATED APPLICATIONS

This application is a continuation application of U.S. Ser. No. 14/556,322, filed Dec. 1, 2014, entitled CONDUIT GRIPPING DEVICE HAVING RETAINING STRUCTURE FOR CONDUIT FITTING which is a continuation application of U.S. Ser. No. 13/009,325, filed Jan. 19, 2011, entitled CONDUIT GRIPPING DEVICE HAVING RETAINING STRUCTURE FOR CONDUIT FITTING, now U.S. Pat. No. 8,931,810 which claims the benefit of the following five United States provisional patent applications, the entire disclosures of which are fully incorporated herein by reference: U.S. Provisional Patent Application Ser. No. 61/297,066, entitled FITTING COMPONENT WITH CONDUIT GRIPPING DEVICE RETAINING STRUCTURE and filed Jan. 21, 2010, U.S. Provisional Patent Application Ser. No. 61/331,035, entitled CONDUIT GRIPPING DEVICE HAVING RETAINING STRUCTURE FOR CONDUIT FITTING and filed May 4, 2010, U.S. Provisional Patent Application Ser. No. 61/331,025, entitled CONDUIT FITTING WITH CONDUIT GRIPPING DEVICE RETAINING RING and filed May 4, 2010, U.S. Provisional Patent Application Ser. No. 61/331,028, entitled FITTING COMPONENT WITH CONDUIT GRIPPING DEVICE RETAINING CLIP and filed May 4, 2010, and U.S. Provisional Patent Application Ser. No. 61/331,032, entitled CONDUIT FITTING WITH CONDUIT GRIPPING DEVICE RETAINING STRUCTURE and filed May 4, 2010.

TECHNICAL FIELD OF THE INVENTIONS

The present disclosure relates to fittings for making mechanically attached connections between a conduit and another fluid component, for containing liquid or gas fluids. More particularly, the disclosure relates to fittings for tube and pipe conduits that use one or more conduit gripping devices, such as for example, one or more ferrules.

SUMMARY OF THE DISCLOSURE

In accordance with an embodiment of one or more of the inventions presented in this disclosure, at least one conduit gripping device and a first coupling or fitting component are retained together as a discontinuous unit or cartridge prior to the unit being assembled with a second coupling or fitting component to form a complete fitting assembly. In another embodiment, a retaining structure may be provided by which one or more conduit gripping devices and a first coupling or fitting component are retained together as a discontinuous unit or cartridge prior to being assembled with a second fitting component. In a more specific embodiment, a retaining structure may be provided that retains at least two discrete conduit gripping devices with a discrete fitting component as a discontinuous unit or cartridge, wherein the retaining structure comprises structural features associated with one or more of the conduit gripping devices and the fitting component. For example, in one embodiment, a front ferrule comprises an extension, for example a skirt or tang, that engages an interior surface of a fitting component such as, for example, a nut.

In another embodiment, a conduit gripping device or ferrule may be provided with a retaining structure in the form of a flange or other radial extension that in a first or retaining position retains the ferrule or a ferrule set with a retaining fitting component as a discontinuous unit or cartridge prior to the unit being assembled with a second coupling or fitting component to form a complete fitting assembly. In another embodiment, such a flange bends or deflects into a second or release position during a partial or complete pull-up.

Additional features may include a retaining structure that does not adversely interfere with initial pull-up or subsequent remakes of the fitting assembly, a retaining structure that uses metal components so that the fitting assembly comprises all metal parts, and a retaining structure that may loosely retain the one or more conduit gripping devices so as to facilitate assembly to a finger tight position and a pulled-up position.

In another embodiment, for fitting assemblies that use two or more conduit gripping devices or two or more parts of the conduit gripping device, a cartridge design is provided that holds the conduit gripping devices and related parts, if any, together as a separate discrete unit prior to assembly with the retaining fitting component. In an exemplary embodiment, two ferrules are held together as a cartridge ferrule set in the form of a discrete unit prior to assembly with a retaining fitting component.

In another embodiment, a retaining structure may be provided that comprises a bendable or flexible member that extends from an interior wall of a socket of the retaining fitting component to retain a conduit gripping device therewith. In still a further embodiment, the mating fitting component contacts the retaining structure and may plastically deforms the member to allow the retaining fitting component to be separable from the one or more conduit gripping devices.

In another embodiment, a retaining structure may be provided that comprises a retaining member that is retained in a recess in an interior wall of the retaining fitting component to retain a conduit gripping device. In still a further embodiment, the retaining member may comprise a flexible ring or other generally annular device that is radially dimensioned to interfere or contact a surface of a conduit gripping device to retain the conduit gripping device with the retaining fitting component as a cartridge or subassembly. In another exemplary embodiment, the retaining member may comprise an o-ring or other radially flexible device that has a first radial dimension to retain a conduit gripping device, and that may radially expand to allow the retaining fitting component to be axially separated from the mating fitting component and the conduit gripping device.

In another embodiment, a retaining structure may be provided that comprises a retaining member that cooperates with an interior wall of the retaining fitting component to retain a conduit gripping device therewith. In still a further embodiment, the retaining member may be displaced axially, or radially, or both relative to the retaining fitting component between two positions to retain or release the conduit gripping device relative to the retaining structure. In another embodiment, the mating fitting component contacts the retaining member at a first position and the retaining member moves relative to the retaining fitting component to a second position to allow the retaining member to be released or separable from the one or more conduit gripping devices. In an exemplary embodiment, the retaining member comprises an o-ring, snap ring or any other generally annular or separate member that can be repositioned by the mating fitting component during pull-up.

In another embodiment, a retaining structure may be provided that comprises a retaining member that holds at least one conduit gripping device with the retaining fitting component, the retaining member releasing the at least one conduit gripping device when the at least one conduit gripping device deforms during at least a partial pull-up of the fitting onto a conduit. In an exemplary embodiment, the retaining member comprises a hook or clip-like device that can attach to the retaining fitting component and a conduit gripping device, with the clip-like device and the conduit gripping device being separable or released from each other when the conduit gripping device deforms during pull-up. The inventions herein further include but are not limited to a preassembly of a retaining fitting component, a conduit gripping device and a hook or clip-like retaining member; and a preassembly of a ferrule retainer for a ferrule with a retaining fitting component wherein the ferrule retainer comprises a hook or clip-like device that can connect the ferrule and the retaining fitting component together as a cartridge. In another embodiment, a conduit gripping device may be welded or otherwise attached to a retaining fitting component, for example, with adhesive or similar materials, to form a cartridge.

These and other aspects and advantages of the inventions described herein will be readily appreciated and understood by those skilled in the art in view of the accompanying drawings.

BRIEF DESCRIPTION OF THE DRAWINGS

FIGS. 4A-4D illustrate Finite Element Analysis (FEA) simulations of another embodiment of one or more of the inventions herein during an assembly process, shown in half-longitudinal cross-section.

FIGS. 5A-5D illustrate FEA simulations of the embodiment of FIGS. 4A-4E during a complete pull-up of the fitting, shown in half-longitudinal cross-section.

FIGS. 5E and 5F illustrate FEA simulations of the embodiment of FIGS. 4A-4D during partial disassembly of the fitting after a complete pull-up of the fitting as in FIGS. 5A-5D, shown in half-longitudinal cross-section.

FIG. 6 is another embodiment of a fitting having a discontinuous cartridge of a ferrule retained with a fitting component.

FIGS. 7A and 7B illustrate FEA simulations of another embodiment of a fitting having a subassembly of a ferrule retained with a fitting component, in a finger tight and pulled-up position respectively, in half-longitudinal cross-section.

FIGS. 9A and 9B illustrate another embodiment of a fitting having a discontinuous cartridge of one or more conduit gripping devices retained with a fitting component, in a finger tight position, with FIG. 9B being an enlarged view of the circled portion of FIG. 9A.

FIGS. 14-16 are a side elevation, back (outboard) elevation and perspective view respectively of a conduit gripping device with a retaining flange as may be used with the embodiment of FIG. 12.

FIG. 26 illustrates an enlarged view of the circled region of FIG. 25;

FIGS. 30-32 illustrate another embodiment of a cartridge nut using a retaining ring for a ferrule, in cutaway, elevation and perspective views respectively.

FIG. 33 is another embodiment of a conduit fitting cartridge, subassembly or preassembly illustrating one embodiment of one or more of the inventions herein, shown in longitudinal cross-section and joined to a second fitting component in a finger tight position.

DESCRIPTION OF THE EXEMPLARY EMBODIMENTS

Figure 1:
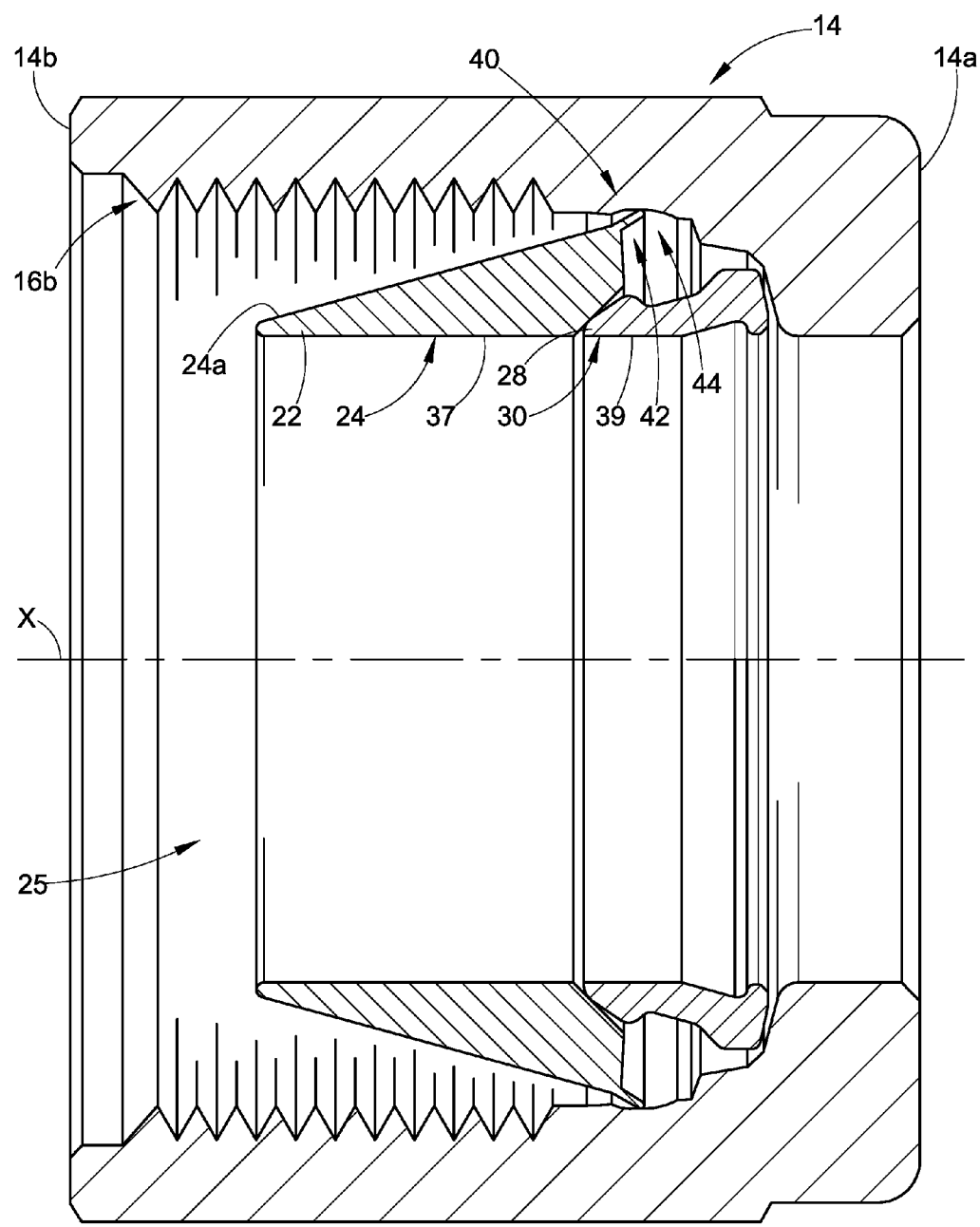
FIG. 1 is an embodiment of a conduit fitting cartridge, subassembly or preassembly illustrating one embodiment of one or more of the inventions herein, shown in longitudinal cross-section.

Although the exemplary embodiments herein are presented in the context of a stainless steel tube fitting, the inventions herein are not limited to such applications, and will find use with many different conduits such as tube and pipe as well as different materials other than 316 stainless steel, including metals and non-metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs that use one or more conduit gripping devices. We use the term "conventional" to refer to commercially available or later developed parts or parts that are otherwise commonly known, used or that those of ordinary skill in the art would be familiar with in general, as distinguished from parts that may be modified in accordance with teachings herein. We use the term "ferrule set" to refer to a combination of conduit gripping devices with or without other parts that form the means by which conduit grip and seal are achieved. Although not necessary with all fitting designs, it is common that a ferrule set comprises two ferrules that are purposely matched to each other and to the fitting components, for example, based on material, manufacturer, interrelated design and geometry features and so on. In some fittings, in addition to the conduit gripping devices there may be one or more additional parts, for example seals. Therefore, the term "ferrule set" may also include in some embodiments the combination of one or more conduit gripping devices with one or more other parts by which the ferrule set effects conduit grip and seal after a complete pull-up. The inventions may be used with tube or pipe, so we use the term "conduit" to include tube or pipe or both. We generally use the term "fitting assembly" or "fitting" interchangeably as a shorthand reference to an assembly of typically first and second fitting components along with one or more conduit gripping devices. The concept of a "fitting assembly" thus may include assembly of the parts onto a conduit, either in a finger-tight position, a partial pull-up position or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether a direction is towards the center of a fitting (inboard) or away from the center (outboard). In the drawings, various gaps and spaces between parts (for example, gaps between the ferrules and the conduit in a finger-tight position) may be somewhat exaggerated for clarity or due to scale of the drawings.

A significant feature of some of the inventions herein is the provision of a retaining structure by which one or more conduit gripping devices are retained with a fitting component, also referred to herein as a retaining fitting component, prior to assembly of the fitting component with a mating fitting component. By "cartridge" we mean a group of parts retained together as a discontinuous unit, subassembly or preassembly. We therefore use the terms cartridge, unit, subassembly and preassembly synonymously herein in the context of a discontinuous structure. We also use the term "cartridge nut" or "conduit fitting cartridge" herein to refer to such a cartridge, unit or subassembly in which one or more conduit gripping devices are retained with a fitting component such as a female nut, for example. We also use the term "ferrule cartridge" or "conduit gripping device cartridge" to refer to a unit or subassembly made up of at least one ferrule or conduit gripping device with at least one other part held together as a discrete unit. In particular, a "ferrule cartridge" includes two or more ferrules held together as a discrete unit or subassembly, and may include additional parts, for example, seals. In the exemplary embodiments herein, the cartridge includes one or more ferrules retained with a fitting component, such as a female threaded nut. Therefore, the exemplary embodiments herein may be referred to as a cartridge nut design, however in alternative embodiments, a "cartridge nut" may include a male threaded cartridge nut design or a cartridge body design.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
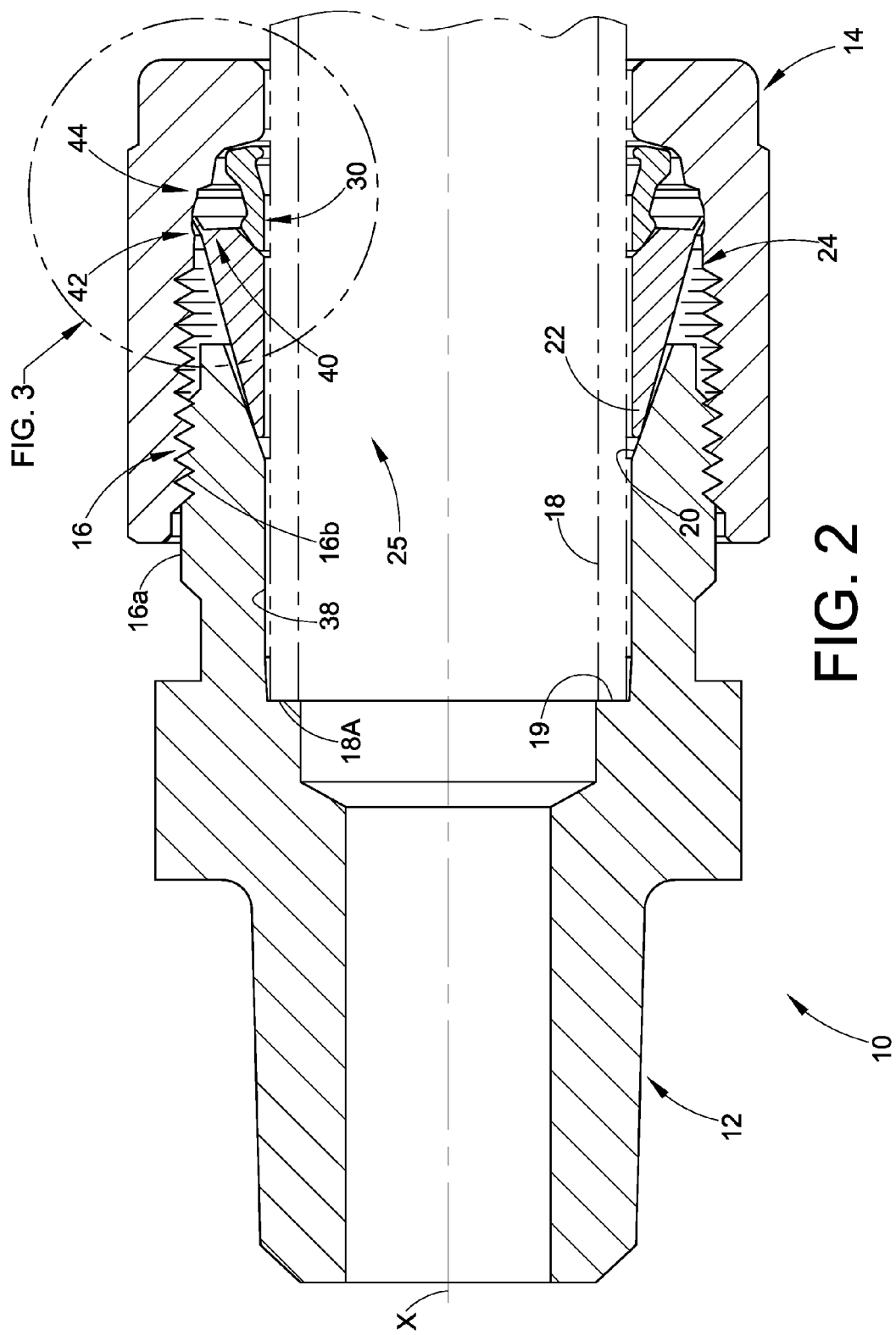
FIG. 2 is an embodiment of a conduit fitting assembly using the subassembly of FIG. 1, with the fitting assembly illustrated in a finger tight position.

With reference to FIGS. 1 and 2, a first embodiment of one or more of the inventions is presented. Note that in many of the drawings herein, for example FIG. 3, the fittings are illustrated in half longitudinal cross-section, it being understood by those skilled in the art that the fitting components are in practice annular parts about a longitudinal centerline axis X. All references herein to "radial" and "axial" are referenced to the X axis except as otherwise noted. Also, all references herein to angles are referenced to the X axis except as may be otherwise noted.

Figure 3:
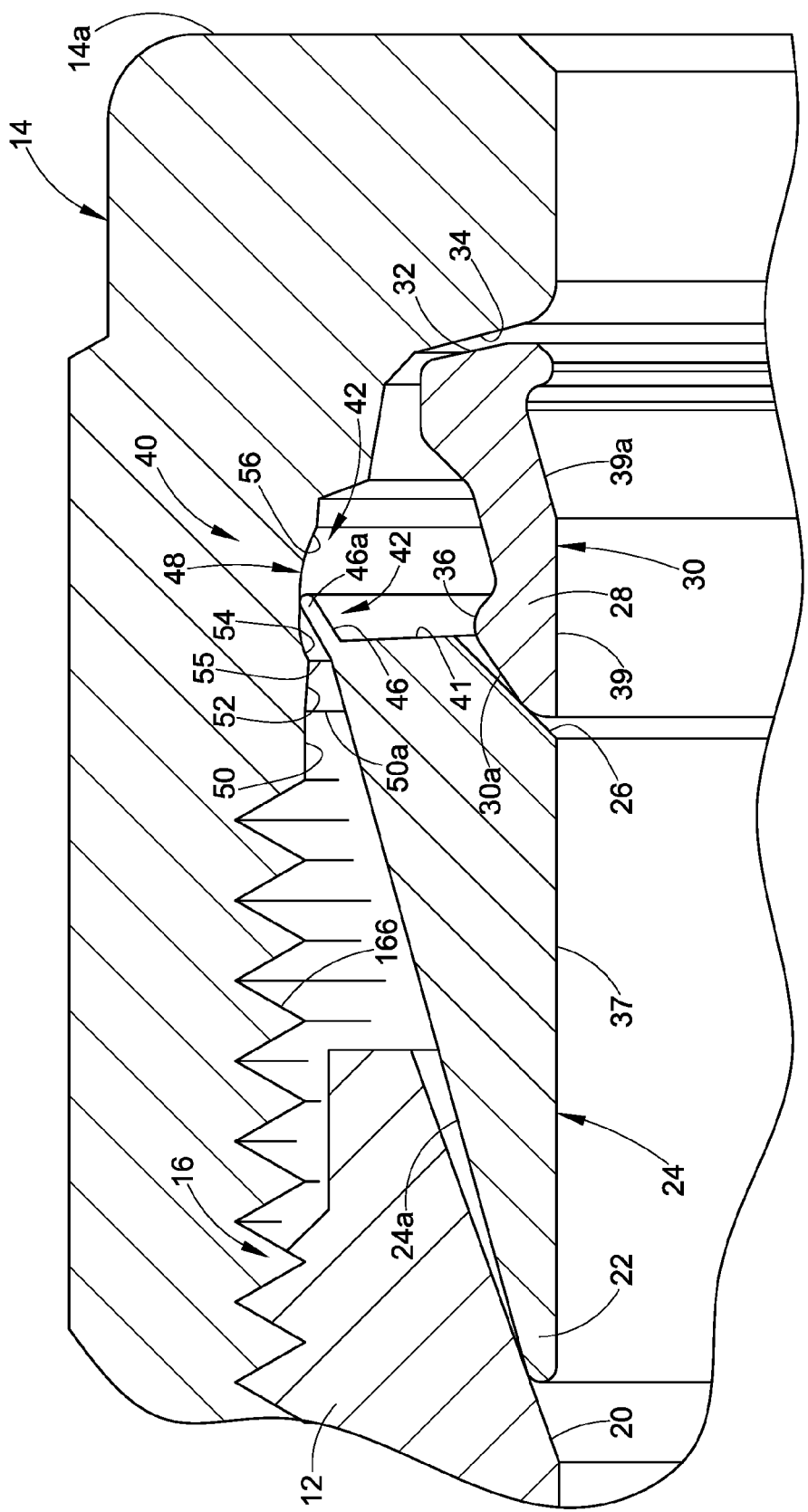
FIG. 3 is an enlarged view of the circled region A of FIG. 2.

In this disclosure unless otherwise noted, a fitting assembly 10 may include a first coupling or fitting component 12 and a second coupling or fitting component 14. These parts are commonly known in the art as a body and nut respectively, wherein the body 12 receives a conduit 18 end shown in phantom in FIG. 2 (also see FIG. 5A for example), and the nut 14 may be joined to the body 12 during make up of the fitting. Although we use the common terms of body and nut herein as a convenience, those skilled in the art will appreciate that the inventions are not limited to applications wherein such terminology may be used to describe the parts. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, an elbow and so on to name a few that are well known in the art. Although the body 12 and nut 14 are illustrated as being threadably joined together by a threaded connection 16, threaded connections are not required in all uses. For example, some fittings have parts that are clamped together. Fittings are also commonly referred to in the art as male fittings or female fittings, with the distinction being that for a male fitting the male body 12 includes an externally threaded portion 16a and the female nut 14 includes an internally threaded portion 16b. For a female fitting, the male nut 12 includes an externally threaded portion 16a and the female body 14 includes an internally threaded portion 16b. FIGS. 1-3 illustrate a male fitting assembly embodiment, for example, and FIG. 8A, for example, illustrates a female fitting assembly embodiment. Many of the exemplary embodiments herein illustrate a male fitting assembly embodiment, for example, but the inventions herein also may be conveniently adapted for use with a female fitting assembly. When the fitting components, such as a body and nut for example, are joined they form a generally enclosed interior space or volume for the conduit gripping devices, other optional seal components, a portions or all of a retaining feature for the cartridge nut concepts in the interior space or volume.

The fitting assembly 10 may be used to form a fluid tight connection between an end portion 18a of a conduit 18 and the body 12 using one or more conduit gripping devices, which in the exemplary embodiments herein may be realized in the form of one or more ferrules. However, conduit gripping devices other than those that may be understood in the art as 'ferrules' may also be used with the inventions herein. The conduit end 18a typically bottoms against a radial shoulder 19 (FIG. 2) that is part of the body 12, as is well known. The body 12 includes a tapered camming surface 20 that engages the front portion 22 of a first or front conduit gripping device or ferrule 24. The front ferrule 24 includes a tapered camming surface 26 (see FIG. 3) at its back end that engages a front portion 28 of a second or back conduit gripping device or ferrule 30. The back ferrule 30 includes a driven surface 32 that engages a drive surface 34 of the female nut 14. The back ferrule front portion 28 may optionally include a radially extending crown 36. The front and back ferrules include cylindrical interior walls 37, 39 that are closely received over the outer surface 38 of the conduit 18. The back ferrule may optionally include one or more radial recesses 39a. Although the exemplary embodiments herein illustrate fitting assemblies that use a conduit gripping device or ferrule set having two conduit gripping devices or ferrules, the inventions will readily find application to fittings that may use only a single conduit gripping device, as well as fittings that may use ferrule sets having more than two conduit gripping devices, or additional parts other than just ferrules or conduit gripping devices, for example, additional seals.

It is important to note that the exemplary geometric shapes, configurations and designs of the fitting coupling components 12, 14, and the conduit gripping devices 24, 30 are a matter of design choice and will depend in great measure on the materials used, and the design and performance criteria expected of the fitting. Many different coupling components and conduit gripping device designs are known in the art and may be designed in the future. The present disclosure and the inventions described herein and illustrated in the context of exemplary embodiments are directed to structure and method of retaining at least one conduit gripping device with one or a first of the fitting components as a discontinuous subassembly or cartridge which can thereafter be joined with another or second fitting component to form a fitting assembly.

The term "complete pull-up" and derivative forms as used herein refers to joining the fitting components together so as to cause the one or more conduit gripping devices to deform, usually but not necessarily plastically deform, to create a fluid tight seal and grip of the fitting assembly 10 on the conduit 18. A "partial pull-up" and derivative terms as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a complete fitting assembly. A finger tight position or condition refers to the fitting components and conduit gripping devices being loosely assembled onto the conduit but without any significant tightening of the male and female fitting components together, usually typified by the conduit gripping device or devices not undergoing plastic deformation.

We use the term "discontinuous" to describe the conjoined nature of the cartridge or preassembly in the sense that the one or more conduit gripping devices and the fitting component (also referred to herein as the retaining fitting component), for example a female threaded nut in the FIG. 1 embodiment, are manufactured as separate and discrete components and remain separate and discrete components, although in accordance with the inventions herein these components may be retained together as a discrete cartridge, subassembly or preassembly, and further wherein after final assembly or even a complete pull-up the parts remain discrete and may be disassembled into their constituent discrete parts if so desired. The terms "discontinuous" or "conjoined" are used herein to distinguish from fitting designs in which a conduit gripping device is attached to or made integral with a fitting component, wherein the conduit gripping device may remain integral or may in some designs break off or detach from the fitting component during complete or partial pull-up. In a discontinuous type structure, as that terminology is used in this disclosure, the one or more conduit gripping devices may optionally release or become separable from the retaining fitting component during either partial or complete pull-up without requiring a fracture, shear or other separation of material or adhesive. The terms "discontinuous" or "conjoined" are further intended to include broadly the idea that the one or more conduit gripping devices may be loosely or alternatively snugly retained with the retaining fitting component.

FIG. 2 illustrates the fitting assembly 10 in a finger-tight condition, meaning that the various parts 12, 14, 24 and 30 have been assembled onto the conduit 18 (illustrated in phantom for clarity) but are loosely assembled or slightly tightened or snugged up a bit by manually joining the nut 14 and body 12 together. Fittings are commonly pulled-up to a complete pulled-up position by counting complete and partial turns of the nut 14 relative to the body 12 from the finger-tight position. The present inventions, however, may be used with fitting designs that alternatively may be pulled-up by torque.

In order to effect complete conduit grip and seal, the nut and body are tightened together—commonly known in the art as pull-up or pulling up the fitting and derivative terms—such that the back ferrule 30 and front ferrule 24 axially advance against their respective camming surfaces 26 and 20. This causes a radially inward compression of the ferrules against the outer surface of the conduit 18 to effect grip and seal. An outer conical surface 24a of the front ferrule 24 engages the body camming surface 20, while a conical or tapered surface 30a of the back ferrule engages the frusto-conical camming surface 26 of the front ferrule 24. In the exemplary fitting assembly of FIG. 2, conduit grip is primarily achieved with the back ferrule, with the front ferrule primarily providing a fluid tight seal. However, in some designs the front ferrule may also grip the conduit and the back ferrule may also provide a fluid tight seal. Thus, the term "conduit gripping device" may include two distinct functions, namely conduit grip and seal, whether or not a specific conduit gripping device performs one or both of those functions. The present inventions may alternatively be used with single gripping device style fittings in which a single conduit gripping device performs both the conduit grip and seal functions, and still further alternatively may be used with fittings that use more than two conduit gripping and sealing devices. Although not limiting the scope of the present inventions, the exemplary fitting design of FIG. 2 is well known and commercially available from Swagelok Company, Solon, Ohio. These fittings, other than with the retaining feature of the present disclosure, are also further described in a number of issued and pending patent applications, including U.S. Pat. Nos. 5,882,050 and 6,629,708 which are fully incorporated herein by reference. The fitting of FIG. 2 herein may operate as described in such patents, but are modified as described herein to provide a discontinuous cartridge, subassembly or preassembly for retaining at least one conduit gripping device with one of the fitting components, as set forth below.

The retaining structure or mechanism 40 is provided for retaining the conduit gripping devices 24, 30 together with one of the fitting components 12, 14 as a discontinuous unit, cartridge, preassembly or subassembly 25 prior to connecting with the mating fitting component so as to install the conduit gripping devices onto the conduit 18. Although various embodiments and drawings herein may illustrate the retaining fitting component joined with the mating fitting component or assembled with the mating fitting component on a conduit end, those skilled in the art will readily appreciate from the drawings that the retaining fitting component and at least one conduit gripping device may be retained together as a discrete and separate subassembly or cartridge 25 prior to the retaining fitting component being joined to the mating fitting component In the exemplary embodiments herein, two conduit gripping devices may be retained with the female threaded nut 14 as a discontinuous cartridge 25, but alternative embodiments may be realized with a single conduit gripping device or more than two gripping devices, or with male threaded nuts, or any combination thereof. For the case of multiple conduit gripping devices or a ferrule set, we refer to the in-board conduit gripping device (for example, the front ferrule 24 in the embodiment of FIGS. 1-3) as the retaining conduit gripping device. Alternative embodiments however may utilize a retaining structure that cooperates with the back ferrule 30 as the retaining conduit gripping device.

The term "connecting" and variations thereof as used herein with respect to the discontinuous cartridge 25 means that the conduit gripping devices and the retaining fitting component are initially formed or manufactured as separate, discrete and distinct parts, and then retained together in a discontinuous manner so as to be able to be easily joined with the mating fitting component (in the present example, a male threaded body 12) into a fitting assembly 10. Thus, a final assembly process may consist of joining or connecting together two parts, the body 12 and the cartridge 25 having the conduit gripping devices 24, 30 retained with the nut 14.

A benefit of a cartridge design with the female fitting component is that the ferrules are retained within the machined socket of the nut, with the inboard end 14b (FIG. 1) extending preferably but not necessarily axially past the front end of the front ferrule. The ferrules 24, 30 thus are somewhat shrouded and protected from possible damaging impacts against the ferrule surfaces.

In a somewhat more specific embodiment of the cartridge concept, the retaining structure typically although need not be realized in the form of an interfering surface, structure or member of the retaining fitting component that resists or inhibits removing the conduit gripping devices after the cartridge is assembled by interfering with a surface, member or structure that is part of at least one of the conduit gripping devices. In the case of two conduit gripping devices, the inboard device typically will include a structure, surface or member that cooperates with the interfering structure, surface or member of the fitting component.

The retaining structure 40 may be realized in many different ways, but in general may include a first retaining portion 42 that is associated with one of the conduit gripping devices, and a second retaining portion 44 that is associated with the fitting component being used to form the subassembly 25.

The first retaining portion 42 may be associated with the front ferrule 24, and the second retaining portion 44 may be associated with the female threaded nut 14. We also herein refer to the fitting component that is used to form the discontinuous cartridge as the retaining fitting component to distinguish it from the mating fitting component that is joined or connected to the retaining fitting component during assembly and pull-up. In many cases, the retaining fitting component may be modified to include the second retaining portion 44, but in alternative designs the retaining fitting component may be a conventional design without modification, but in any event will have a surface or structure therein or associated therewith that functions as the second retaining portion 44. Thus, even though the fitting assembly 10 may comprise three or more discrete elements (two fitting components and one or more conduit gripping devices), final assembly may if so desired involve two parts—the cartridge and the mating fitting component—that are joined together on a conduit end to make up the fitting assembly.

In many applications, it may be desirable after a partial or complete pull-up to be able to remove the retaining fitting component without disturbing the one or more conduit gripping devices. For example, after a fitting assembly 10 has been completely pulled up onto a conduit, the conduit gripping devices typically although not necessarily have been plastically deformed into a gripping engagement against the conduit 18 outer surface. It is not uncommon for assembled fittings to be later disassembled in order to allow maintenance and repair of one or more fluid components in a fluid system. After the repair or maintenance is completed the fitting is reassembled and retightened. This process is commonly referred to in the art as disassembly and remake. But in order to perform many repair and maintenance activities, the nut 14 often must be removed, or at least be slid axially back or away from the body 12 in order to allow the conduit to be withdrawn from the body 12. Typically, it will be desired to leave the one or more conduit gripping devices attached to the conduit, and even if that is not a desired outcome, it may often be desired to allow the nut to be pulled axially back away from the ferrules, which may not be possible unless the nut and ferrules have become released or separable during pull-up from each other. Therefore, it may be a desirable option that in such cases the nut and conduit gripping devices become separable during a partial or complete pull-up, at least to the extent that the ferrules and the retaining structure do not interfere with backing the retaining fitting component away from the mating fitting component and conduit gripping devices. The present inventions contemplate, as an optional feature, that the retained conduit gripping devices and the retaining fitting component, and particularly the retaining structure, initially assembled in the form of the discontinuous cartridge, can be separated or disengaged even after the conduit gripping devices have been fully installed on the conduit. In other words, the retaining structure 40 may be designed so as to decouple from the one or more conduit gripping devices after a partial or complete pull up of the fitting assembly onto the conduit. Exemplary embodiments of this optional feature will be discussed hereinbelow.

It is also important to note that the retaining structure 40 is preferably although not necessarily designed so that prior to or after a partial or complete pull-up the retaining structure does not appreciably or adversely affect the form, fit and function of the fitting components and the conduit gripping devices. In other words, the retaining structure preferably does not affect or alter the manner in which the fitting components and the conduit gripping devices move and deform during pull-up so as to effect a conduit grip and seal. Still further, it is preferable although not necessarily required that the retaining structure 40 not interfere with remake of the fitting assembly, either with the original conduit gripping devices that were used in the fitting assembly, or if different conduit gripping device are used for remake but with the original nut and body. For example, in some instances, after a maintenance or repair activity the original ferrules that are still attached to the conduit might no longer be used for re-make. In such cases it is not uncommon to simply cut off the conduit end that has the original ferrules. A new ferrule or ferrule set may then be used with the original nut and body for the re-make operation. Since this is typically a field-based operation in situ, there may no longer be a need for a cartridge configuration but rather the installer can simply use a new ferrule or ferrule set. Alternatively, remakes may also be performed with a new cartridge if so desired. As a further alternative embodiment, the retaining structure may be configured so that the original retaining fitting component and retaining structure may be re-used to hold a new ferrule or ferrule set.

The design of the retaining structure 40, including the location, shape, size, length and profile of the retaining member 46, may depend in part on the design of the cooperating second retaining portion 44. The design of the retaining structure 40, including the design of the first retaining portion 42 and the second retaining portion 44, may also depend in part on how robust a connection is desired between the retaining fitting component and the conduit gripping devices, in other words, the nature of the retention force desired. For example, in some applications it may be desired to have the ferrules 24, 30 strongly and securely retained with the fitting component 14 so that the ferrules do not fall out or get knocked out during handling, shipping or exposure to other force applying environments, while in other applications such a strong retention force may not be needed. As another example, in some applications it may be desired to have the ferrules snugly held together and retained with the fitting component, while in other applications it may be more desirable to have the ferrules somewhat loosely held together and retained with the fitting component. Looser retention of the ferrules in the nut 14 may facilitate pull-up of the fitting assembly by not interfering with centering of the ferrules as the nut 14 is initially rotated relative to the body 12. In this disclosure we refer to a loose connection or assembly to mean that the one or more conduit gripping device(s) has some freedom of movement along one or more axes to align and center during a finger-tight or pull-up operation. This alignment may present itself, as an example, when the conduit is inserted through the center bores of the conduit gripping devices and the conduit gripping devices are able to center and align on either the conduit, or relative to each other, the body, or the nut or any combination thereof. By way of example, a loose connection may be one that allows for the conduit gripping devices to move freely or at least to be able to easily adjust alignment to make contact with the camming surfaces in the fitting body 12—for example surface 20 of FIG. 3—and the nut 14—for example surface 34 of FIG. 3—and in the case of two gripping devices contact between the surfaces 26 and 30a for example—with only a finger-tightening of the nut. This assures the correct starting position for pull-up by turns The term "loose" does not imply or require complete freedom of movement is required, but is distinguished from a snug or tight assembly in that the conduit gripping devices are able to center and align during the fitting assembly and initial tightening process or at least assembling to a finger-tight position. These are just a few of the criteria that may be considered when designing the retaining structure 40.

The second retaining portion 44 may also be designed to achieve the desired retaining force for the subassembly 25 prior to assembly with the mating fitting component. The second retaining portion may also optionally be designed to facilitate release of the retaining fitting component from the one or more conduit gripping devices after assembly with the mating fitting component, for example after or during a partial pull up or a complete pull up of the fitting assembly onto a conduit.

The retaining structure 40 may also be designed such that the ferrules 24, 30 are somewhat loosely retained and may even have a slight rattle when the nut 14 is gently shaken. This looseness may in some applications and embodiments facilitate final assembly with the second or mating fitting component (in this example the body 12), especially in allowing the ferrules to center and align during pull-up of the fitting assembly 10. In alternative embodiments, however, the ferrules 24, 30 may be snugly or even tightly retained in the nut 14. In any case, it is contemplated that after the front ferrule 24 has been inserted (the back ferrule being inserted first for a two ferrule fitting) that the retaining structure 40 will prevent or inhibit the front ferrule 24 (as well as the back ferrule for a two ferrule fitting assembly) from dropping out of the nut 14, even if the nut is dropped or otherwise exposed to shock or other adverse forces prior to assembly with the mating fitting component 12.

A general concept of the present disclosure, the retaining structure 40 may have a retaining position and a release or disengage position. In the retaining position the conduit gripping devices and the retaining fitting component form the discontinuous cartridge 25. In the release position, the retaining fitting component is separable from the conduit gripping devices. Preferably, the retaining structure is in the release position after a partial or complete pull-up but not in a finger-tight position. For example, the retaining member 46 may be a structure that is movable relative to the retaining fitting component so as to have a first axial position at which the retaining member 46 cooperates with the second retaining portion 44 of the retaining fitting component to retain the ferrules, and a second axial position at which the retaining member 46 releases from the second retaining portion 44. The retaining structure 40, and in a particular example the retaining member 46, may also optionally exhibit a first radial position and a second radial position at the first and second axial positions respectively as will be further described hereinbelow. In still other embodiments, the retaining member 46 may have first and second radial positions at a single axial position.

We now describe a variety and number of different embodiments, techniques and methods for realizing a cartridge nut for conduit fittings, with the above description generally applicable to the various embodiments herein. Additional aspects and features described below also apply to the various embodiments and are not limited in application to the specific embodiment being described.

In the exemplary embodiment of FIGS. 1-3, as contrasted with the front ferrule designs of the above incorporated patents as well as other conventional ferrule designs and conduit gripping device designs, the front ferrule 24 herein may include the first retaining portion 42, realized in this embodiment in the form of a retaining member which may be, for example, an annular rearward extension or protrusion 46, in this example a flange-like annular member. The retaining member 46 may take on any shape or configuration that is compatible with the second retaining portion 44 of the retaining fitting component or nut 14, so that the retaining member 46 and the nut 14 coact to retain the ferrules 24, 30 together with the nut 14 as a discrete and discontinuous subassembly 25.

As best illustrated in FIG. 3, the extension 46 may be generally annular and may taper outwardly, both radially and axially, from a back wall 41 of the front ferrule 24, or as in FIG. 3 from a corner portion of the front ferrule at the juncture of the tapered surface 24a and the back wall 41. However, alternatively the extension 46 may extend substantially radially from the back wall 41. The location, shape, size, length and profile of the extension or protrusion 46 will depend in part on the design of the cooperating second retaining portion 44 of the nut 14. For example, the extension 46 need not be a continuous annular piece, but may include slots or other voids to increase the flexibility of the extension. In other embodiments the extension 46 need not be annular, but could have a hemispherical or other arcuate profile, or non-arcuate. The first retaining portion 42 may also extend from a portion of the front ferrule 24 other than the back wall 41. In such a case it will be desirable that the first retaining portion be disposed on the front ferrule at a location that will not adversely influence the operation of the ferrule, for example, the camming action with the body 12 or the camming action with the back ferrule.

The second retaining portion 44 may be realized in the form of a recess or groove 48 that is formed in a generally cylindrical interior wall 50 of the retaining fitting component, in this example the nut 14. The diameter of the cylindrical interior wall 50 is generally determined as a function of the conduit 18 outer diameter and the diameter of the mating body 12 so as to accommodate the threaded connection 16. Alternatively, the interior wall portion 50 need not be cylindrical but may have a taper having a radially decreasing dimension in the direction of the back or outboard end 14a of the nut. Some nuts may include such a taper as a gauge for verifying maximum axial depth of the threads 16b. The groove 48 may be of such radial and axial depths preferably as to freely or loosely receive the distal end portion 46a of the extension 46. However, in alternative configurations the groove 48 may be of such axial and radial depths as to maintain contact with the distal end 46a of the extension 46. Having the extension 46 loosely received in the groove 48 does not necessarily imply that there is no contact between the extension 46 and the defining wall of the groove 48, but rather that the retained front ferrule 24 has some degree of play or looseness even while retained with the nut 14. This may allow for easier alignment and centering of the ferrules 24, 30 to the finger tight position as illustrated in FIG. 3 without undue friction between the extension 46 and the nut 14. Note that for the two ferrule embodiment of FIGS. 1-3, the back ferrule 30 is inserted first, then the front ferrule 24 is inserted, so that the front ferrule acts to retain the back ferrule as well.

Since the wall portion 50 typically has a diameter that is about the same as the minor diameter of the threads 16b, it is preferred though not required that the maximum outer dimension of the extension 46 by less than or equal to the diameter of the wall portion 50. This allows the extension 50 to easily clear the threads 16b so that the front ferrule 24 may be easily inserted into the nut 14.

Axially disposed between the outboard end 50a of the cylindrical wall 50 and the groove 48, an optional inwardly tapered portion 52 may be provided. This optional feature may be in the form of a frusto-conical surface that tapers radially inwardly towards the back end 14a of the nut 14. This optional surface may have a profile or contour that is other than a frusto-conical surface. As the front ferrule 24 is inserted into the nut 14, the extension 46 engages the tapered surface 52, which somewhat resists further insertion of the ferrule 24. As the front ferrule 24 is further axially advanced into the nut 14 interior, the extension 46 will inwardly bend somewhat until the distal end 46 clears the tapered surface 52, at which point the extension 46 may exhibit a snap action sound or feel as the extension 46 enters the groove 48. The angle of the taper of the optional surface 52 may be selected as needed for providing the amount of bending or deflection desired of the extension 46. We have found, for example, that an angle of about 20° to about 40° works well but the designer may choose any angle that is suitable for a particular design. The optional use of the tapered surface 52 may provide an indication that the ferrules are in place and generally concentrically aligned with the axis X before applying the greater axial force needed to snap the ferrules into the nut 14. The tapered surface 52 is optional in that the extension 46 may be sized so as to slightly engage the cylindrical surface 50 before entering the groove 48, however, in some embodiments this may be less desirable as the cylindrical wall 50 is substantially longer than the tapered portion 52, and the extension 46 may also interfere with the threads 16b. Although the extension 46 may have line to line clearance with the minor diameter of the threads 16b, it is preferred that there be at least a minimal but definite clearance between the extension 46 and the nut threads 16b to facilitate inserting the front ferrule 24 into the nut 14.

Once the extension 46 is positioned within the groove 48, as in FIG. 1, the ferrules 24, 30 are retained with the nut 14 as a discontinuous cartridge 25. There may be but need not be some inward radial plastic deformation of the extension 46 as it is pushed along the tapered surface 52, but preferably the extension 46 will at least partially return towards its initial form so that the outer diameter of the distal end 46a is greater than the smallest diameter of the tapered portion 52. This will cause an interference between the distal end 46a and the nut 14 so as to keep the ferrules 24, 30 retained with the nut 14. Although in FIGS. 1-3 there appears to be direct contact between the extension 46 and the defining wall of the groove 48, such is not required, and preferably there will be a small gap therebetween so that the front ferrule 24—and hence the back ferrule 30 as well—are somewhat loosely retained in the nut 14 so as to facilitate make up to the finger tight position when the subassembly 25 is joined to the mating fitting component or body 12.

In the embodiment of FIGS. 1-3, the groove 48 may be realized by two curved or otherwise tapered portions 54 and 56. The shape or contour of the groove 48 walls need not be curved but may have other shapes and contours as needed, for example, frusto-conical shapes. The groove 48 also may be realized alternatively with a single radius curved surface (see FIG. 7A for example herein) rather than the use of two different radius curved surface portions 54, 56. The two curved surface portions 54,56 also may but need not share a common center, and the curved portions need not be arcuate but may have any suitable shape to achieve the retaining function in cooperation with the first retaining portion 42.

The first curved portion 54 of the groove 48 has an increasing radial dimension towards the back end 14a of the nut. This radial dimension of the first curved portion 54 may become greater than the smallest diameter of the tapered portion 52, and preferably although not necessarily greater than the diameter of the cylindrical wall 50 so as to freely accommodate the extension 46. The first curved portion 54 may join the tapered surface 52 with the second curved portion 56. The second curved portion 56 has a decreasing radial dimension towards the back end 14a of the nut.

The first curved portion 54 functions to allow the extension 46 to snap into or otherwise be received in the groove 48 after the front ferrule 24 has been axially pushed or inserted into the nut 14 so as to move the distal end portion 46a over and past the tapered surface 52. The front ferrule 24 and the groove 48 may be dimensioned such that as an option, a tactile or audible snap or click or both may be sensed by an assembler. For example, the extension 46 may act as a clip or tang that snaps into the groove 48. The distal end 46a of the extension may have a greater radial dimension than the groove 48 so that a surface portion 55 interferes with a portion of the extension 46 to inhibit or resist removal or disassembly of the ferrules from the assembled discontinuous cartridge 25.

The radial outermost dimension of the extension 46, the depth of the first curved portion 54, and the degree of inward bending to which the extension 46 is subjected, may also be chosen such that when the cartridge 25 is in the retained configuration of FIG. 1, the ferrules 24, 30 are somewhat loosely retained and may even have a slight rattle when the nut 14 is gently shaken. This looseness may in some applications facilitate final assembly with the second or mating fitting component (in this example the body 12), especially in allowing the ferrules to center and align during pull-up of the fitting assembly 10. In alternative embodiments, however, the ferrules 24, 30 may be snugly or even tightly retained in the nut 14.

FIGS. 2 and 3 therefore show the subassembly 25 after it has been joined to the second or mating fitting component 12 to a finger tight position. In this position, the extension 46 is axially disposed within the groove 48, and in this embodiment with the parts snugged up the extension distal end 46a is axially near or adjacent the second curved portion 56. From the finger tight position, the body 12 and nut 14 may be further tightened together by relative rotation so as to completely pull-up the fitting assembly 10 so that the ferrules 24, 30 form a fluid tight seal and grip of the fitting assembly 10 on the conduit 18. As the nut 14 axially advances toward the body 12 during pull-up—for example from right to left in the illustration of FIG. 3—the distal end 46a of the extension engages the second curved portion 56 of the groove 48. Because the second curved portion 56 tapers radially inwardly towards the back end of the nut 14, the extension 46 will be compressed radially inwardly as the nut 14 advances during pull-up. This further bending of the extension 46 may be used to plastically deform the extension 46 so that it takes a set sufficient to allow the outermost radial dimension of the extension 46 to be preferably less than or about equal to the smallest radial dimension of the optional first tapered portion 52. If the first tapered portion 52 is not used, then the extension 46 preferably takes a set so that the outermost radial dimension is preferably less than or about equal to the diameter of the cylindrical wall 50. By allowing for the extension 46 to clear these radial dimensions, the nut 14 may easily be backed off from the fitting assembly 10 after a complete pull-up, for example, during a maintenance or repair activity or other activity in which the pulled-up fitting is disassembled. In alternative embodiments, however, it may not be necessary to deflect or bend the extension 46 anymore than is needed to facilitate removing the nut 14 after a complete pull-up, and in some cases there may be no need to deform the extension 46 or to provide a clearance between the extension 46 and the nut 14. The fitting 10 may be disassembled even if there is still some interference or friction between the extension 46 and the nut 14.

An optional second tapered surface 58 may be used to still further deflect the extension 46 inwardly during pull-up to reduce interference between the extension 46 and the nut 14 when the fitting is disassembled. Note in this example that the second tapered surface 58 has a decreasing radial dimension axially towards the back end 14a of the nut. Preferably, although not necessarily, the largest radial dimension of the second tapered surface 58 is less than the smallest radial dimension of the first tapered surface 52. The extension 46 may take a permanent or plastic set or may have some elastic spring-back depending on factors such as the type of material of the ferrule 24, then thickness of the extension 46 and so on. It is contemplated that the extension 46 will be inwardly deflected enough to overcome the designed-in retaining force between the ferrule 24 and the nut 14. It is also contemplated that the extension 46 be positioned on the ferrule 24 body so as to not interfere with the back ferrule 30 or the nut 14 during pull-up of the fitting, or during re-make of the fitting. The optional second tapered surface 58 may adjoin the interior back wall 34 of the nut 14 which may itself have various optional tapers and contours, and forms a socket 60 that receives the back ferrule 30.

The extension 46 need not be circumferentially a single piece. For example, the extension 46 may comprise several axially extending fingers, such as three or more for example evenly positioned about the axis X, that snap into the recess 48. The extension 46 also need not be integrally machined with the ferrule 24, but may alternatively be an attached member or members.

With reference next to FIGS. 4A-4D, we show illustrations from an FEA model of how the ferrules 24, 30 and the nut 14 cooperate during assembly so as to realize a discontinuous cartridge 25. It will be noted that FIGS. 4A-4D (as well as FIGS. 5A-5D) illustrate another embodiment of the retaining structure, although the basic concept of a recess or groove in the nut 14 cooperating with an extension of the front ferrule 24 may be the same as described hereinabove and will generally operate the same except as otherwise noted. The nut 14 interior socket 60 that receives the back ferrule 30 also may have a simpler geometry because the socket 60 geometry does not substantially affect the retaining feature. The five views are actually snapshots of a full FEA video of what happens when the ferrules 24, 30 are axially pushed into the nut 14 so as to be in a retained position.

The FEA illustrations herein also include simplified markings or contour lines to show stress regions to further elaborate on what happens to the ferrules during assembly. Although in the FEA figures we show many of the parts cross-hatched, such is for clarity as to the view being illustrated. For parts that are undergoing stress and having a substantial number of contour lines to represent such stress, we leave the cross-hatching out of the drawing for that part. Note that the contour lines and stress regions are not assigned specific values for the drawings. However, in general, the smaller and tighter the region, the higher the stress.

FIG. 4A illustrates the parts with the back ferrule 30 positioned in the socket 60 of the nut 14 and the front ferrule 24 positioned in the nut 14 so that the extension 46 contacts the first tapered portion 52. The geometry of the recess or groove 48 is modified in this embodiment and therefore indicated with a prime (') notation. The recess 48' in this example comprises a single simple arc which may but need not be a hemispherical shape. The recess 48' thus still includes a first portion that tapers radially outward and a second portion that tapers radially inward. In practice, the ferrules 24, 30 may be but need not be inserted into the nut 14 while the nut is in an upright orientation. Note that in this pre-retained position of FIG. 4A, there may be an axial gap 64 between the front and back ferrules.

In FIG. 4B, the front ferrule 24 has been axially displaced into the nut 14 such that the distal end 46a of the extension is pressed along the first tapered surface 52, which causes an inward deflection of the extension 46. This bending or deflection causes stress regions 66 to appear in the extension 46 and related stress regions 68 in the nut. Further axial insertion of the front ferrule 24 leads to the position illustrated in FIG. 4C in which the distal end 46a of the extension has just moved past the first tapered surface 52. This results in lower stress concentrations 66a in the extension 46 as compared to the position of FIG. 4B, indicating that in this embodiment the extension 46 has taken a set or been somewhat plastically deformed, however, there is still residual stress in the extension 46. Note also that the gap 64 has closed somewhat, compared to FIG. 4A.

Further axial displacement or insertion of the front ferrule into the nut 14 leads to the position illustrated in FIG. 4D in which the distal end 46a of the extension has cleared the reduced inner diameter of the nut interior wall and snapped into or otherwise become positioned in the groove 48'. In this position, the gap 64 may be minimal or even zero with direct contact between the front and back ferrules 24, 30 but such contact is not necessarily required. With the extension 46 now positioned in the groove 48', the ferrules 24, 30 are retained in the nut 14 as a cartridge 25. The extension 46 may be somewhat loose in the groove 48', yet there may still be residual stress 66b in the extension 46, and as illustrated the extension 46 may have taken a set through plastic deformation due to the bending action of inserting the ferrule 24 into the groove 48'.

With reference next to FIGS. 5A-5D, the fitting assembly 10 is modeled using FEA to show what happens as the assembly is pulled-up from the finger-tight position (FIG. 5A) to a completely pulled-up position (FIG. 5D). As illustrated in FIG. 5A, in the finger tight position, the ferrules 24, 30 are typically snugged up against each other between the nut 14 and the body 12. The extension 46 is disposed in the groove 48'. The extension 46 may have some residual stress as indicated by the stress regions 66b. In this example, the nut and body may be threadably joined so that relative rotation of the nut and body produces an axial movement of the ferrules towards the body. The back wall 34 of the nut 14 acts as a drive surface and engages the back wall 32 of the back ferrule 30. This pushes the back ferrule 30 against the front ferrule 24 which is therefore pushed against the camming surface 20 of the body 12.

In the position of FIG. 5B, the nut 14 has advanced sufficiently that the extension 46 engages the second curved portion 56 of the groove 48'. The extension 46 is further radially deflected or bent inwardly. Moreover, the extension 46 may undergo further inward deflection because in this exemplary fitting design, the back ferrule 30 tends to push the back end of the front ferrule 24 radially outward, thus pushing the extension 46 harder against the second curved portion 56 of the groove 48', thereby producing stress regions 78 where the extension 46 contacts the groove 48'.

FIG. 5B may also be considered a pre-swage position, such as may be achieved using a swaging tool during an assembly step that precedes final tightening. Oftentimes, it may be desirable to pre-install the ferrules and nut onto the conduit end before the final assembly steps are taken to make up the fitting and tighten the fitting onto a conduit. This often is the case, for example, with larger conduit diameters in which the pull-up forces can be substantial and facilitated by an automatic or manual pre-swaging tool. Exemplary tools include an AHSU Air Actuated Hydraulic Swage Unit (automatic) and an MGST Manual Gageable Swage Tool (manual) available from Swagelok Company, Solon, Ohio. The retaining structure 40 may be designed to cooperate with a pre-swaging operation so that the retaining structure no longer retains the nut with the ferrules, or only loosely retains them together. This may be achieved, for example, by designing the retaining structure and the pre-swaging tool to work together so that when a pre-swage operation is performed to a position such as in FIG. 4B, the extension 46 has been sufficiently deformed inwardly to allow the nut to be easily backed off of or separated from the ferrules, even though the ferrules have been pre-swaged into gripping engagement with the conduit.

Upon further tightening of the nut 14 and body 12, the front edge 30b of back ferrule 30 begins to bite into the conduit outer surface creating a stress region 80 in the conduit 18, and the front ferrule 24 begins to tightly engage the camming surface 20 to form a fluid-tight seal, thus also inducing stress regions 82 in the conduit. This is the condition illustrated in FIG. 5C. Note that the extension 46 in this view has cleared the groove 48' and engages an outboard cylindrical wall portion 84 of the nut 14. This wall portion 84 may alternatively be tapered (for example, surface 58 in FIG. 3) to further cause the extension 46 to be radially inwardly deflected. Bending of the extension 46 against the wall portion 84 may also induce stress 72 in the nut.

In FIG. 5D the fitting assembly 10 has been completely pulled-up to result in the ferrules 24, 30 forming a fluid tight seal and conduit grip with the body 12 and the conduit 18. In this example, the extension 46 has been deflected or bent into an almost parallel relationship with the outboard cylindrical wall portion 84. Note in comparing FIG. 5D with FIGS. 5A-5C how the back end of the front ferrule 24 rotates radially outwardly during pull-up, caused by the back ferrule 30 pushing against the camming surface 26. This deformation will allow for substantially reduced or eliminated frictional engagement between the extension 46 and the groove 48' as well as the inboard cylindrical wall 50 and the threads 16b when the fitting 10 is disassembled. Note that in the various embodiments illustrated herein, the retaining structure 40 and operation thereof do not significantly or noticeably affect the pull-up operation for the fitting assembly 10.

With reference to FIGS. 5E and 5F, should it be desired to disassemble the fitting 10 after a complete pull-up, the nut 14 may be reverse rotated with respect to the body 12. Because the extension 46 no longer engages with the groove 48', or engages with substantially reduced contact and interference, the nut 14 may be easily backed off the fitting 10 assembly, for example allowing the nut to be axially separated from the ferrules, thus allowing the fitting 10 to be separated or otherwise disassembled as needed. Typically, although not required, the ferrules 24, 30 remain attached to the conduit 18 so as to facilitate remake of the fitting assembly 10.

The retaining member 46 may be made of any suitable material, including elastomer, plastic and metal and preferably sturdy enough to retain the ferrules with the nut 14 as a cartridge 25. Use of a metal retaining member 46 allows for all metal fitting assemblies for high temperature applications or use with fluids that may damage an elastomer or plastic. Suitable metals may include but are not limited to stainless steel, brass, copper, steel and so on to name just a few of the many available materials.

It is also important to note that the first retaining portion 42, which in the exemplary embodiment of FIGS. 1-3 is an integrally formed or machined part of the front ferrule 24, may alternatively be a separate piece that attaches to the front ferrule, for example.

Accordingly, one or more of the present inventions facilitates a mechanism or structure and method by which one or more ferrules or conduit gripping devices may be retained with a fitting component as a discontinuous cartridge 25, with the retaining structure then being altered during pull-up (either a complete pull-up or a partial pull-up as needed) so that the nut 14 is released and may subsequently be withdrawn or pulled back from the fitting assembly.

Use of the discontinuous cartridge 25 facilitates providing ferrule sets to the end user in which the ferrules and nuts are properly matched at the manufacturer. This can significantly simplify inventory control and reduce final assembly time. The embodiments herein also allow for a cartridge design in which the retaining fitting component may be used for fitting assemblies that do not need or have the retaining member 46.

In an exemplary method, one or more conduit gripping devices are retained with a retaining fitting component as a discontinuous cartridge. This discontinuous cartridge forms a first part of a two part fitting assembly. The cartridge is then joined with the second part of the fitting assembly and a portion of a conduit. During at least a partial pull-up of the fitting assembly, the conduit gripping devices become attached to the conduit and become disengaged from the retaining fitting component so that the retaining fitting component may be removed from the fitting assembly after the partial pull-up while the one or more conduit gripping devices remain attached to the conduit. In a more specific embodiment, the method may include the steps of retaining one or more conduit gripping devices with a retaining fitting component as a discontinuous cartridge, joining the cartridge to a second fitting component on a conduit to cause the conduit gripping devices to attach to the conduit, and disengaging the retaining fitting component from the conduit gripping devices so that the retaining fitting component may be removed from the fitting assembly after a partial pull-up while the one or more conduit gripping devices remain attached to the conduit. In still a more specific embodiment, the conduit gripping devices may be snapped into place in the retaining fitting component to form the cartridge.

With reference to FIG. 6, we illustrate another embodiment of a retaining structure 100 that may be used to retain one or more conduit gripping devices, for example ferrules, within a retaining fitting component. In this embodiment, the retaining fitting component may be realized in the form of a female nut 102. Rather than using a groove formed in the nut as in the embodiments of FIGS. 1-5 herein, the retaining structure 100 may include a first retaining portion such as, for example, a front ferrule 24 extension 46 that engages a second retaining portion 104, such as, for example, the inner cylindrical surface 104 of the nut 102. Frictional engagement between the extension 46 and the inner cylindrical surface 104 will act to retain the ferrules 24, 30 within the nut 102 as a discontinuous subassembly 106. FIG. 6 illustrates the subassembly 106 joined with the body 12 in a finger-tight position. The frictional engagement between the extension 46 and the inner cylindrical surface 104 of the nut may be enhanced by providing a modified finish to the inner cylindrical surface 104 of the nut, such as, for example, roughening, shallow grooves, knurling and so on. The nut 102 may further include an axially shortened radially inward tapered or contoured surface 108 that tapers inwardly towards the back end of the nut 102. In the embodiment of FIG. 6, this surface 108 may be frusto-conical, but any contour may be used. This short tapered surface may be angled more sharply, for example, about 45° to about 60° degrees relative to the axis X, so that the front ferrule 24 sits against or engages this surface when placed into the nut 102 after the back ferrule has been installed in the nut 102. Other angles may be used as needed. During pre-swaging or pull-up operations, the extension 46 will engage this tapered surface 108 and be radially deflected or bent inward so that during subsequent disassembly the extension 46 does not present a significant frictional resistance to removing or withdrawing the nut 102. A second tapered surface 110 may be used to further deflect the extension 46 during pull-up.

With reference to FIGS. 7A and 7B, we illustrate another embodiment. FIG. 7A illustrates a conduit fitting assembly 150 having a first fitting component 12, for example a male threaded body, and a second fitting component 152, for example a female threaded nut. The front ferrule 24 and the back ferrule 30 may be, but need not be, the same design as in the embodiment of FIGS. 1-3 herein. A retaining structure 154 is provided for retaining the ferrules 24, 30 (or a single ferrule as the case may be) with the second fitting component 152 as a discontinuous unit, subassembly or preassembly 156. FIG. 7A shows the subassembly 156 already joined with the first fitting component 12 and installed on the conduit 18 in a finger-tight position.

The retaining structure 154 in this embodiment includes a first retaining portion 158 associated with the front ferrule 24, and a second retaining portion 160 associated with the nut 152. The first retaining portion 158 may be realized, for example, in the form of an extension 162 which may be similar in design and operation to the extension 46 described hereinabove. Thus the extension 162 may taper in a radial and axial direction. The second retaining portion 160 may be realized in the form of a groove 164 formed in the interior cylindrical surface 166 of the nut 152.

The groove 164 receives the distal end 162a of the extension 162 in a similar manner as the embodiment of FIGS. 1-3 hereinabove. Associated with the groove 164 is a radial flange 168 that may extend radially inwardly from the interior cylindrical surface 166 of the nut. This flange 168 may include an optional first radially inwardly tapered surface 170 that engages the distal end 162a of the extension 162 as the front ferrule 24 is pushed into the nut 152. This engagement deflects the extension 162 radially inwardly with a resulting snap or click when the front ferrule has been sufficiently inserted so that the extension 162 is pushed past the flange 168 to be aligned with the groove 164. This is the finger-tight position illustrated in FIG. 7A, with the ferrules 24, 30 retained with the nut 152 as a discontinuous subassembly 156. The groove 164 and the radial flange 168 may form an interfering surface 165 that interferes with the extension 162 to retain the ferrules with the fitting component as a discontinuous cartridge.

The groove 164 may include an optional second radially inwardly tapered surface 172 that causes further inward deflection of the extension 162 during partial or complete pull-up of the fitting 150. This second tapered surface 172 may further join to an optional third radially inwardly tapered surface 174. This third tapered surface 174 may be used to further deflect the extension 162 during pull-up of the fitting 150. The innermost or smallest radial dimension of the third tapered surface 174, or alternatively the optional second tapered surface 172, may be preferably at least equal to or less than the diameter of the radial flange 168. This will allow for the extension 162 to be sufficiently inwardly deflected so that the nut 152 may be easily backed off the fitting 150 during subsequent disassembly.

With reference to FIG. 7B, after a complete pull-up as illustrated, the second and third tapered surfaces 172, 174 have caused the extension 162 to be bent or deflected radially inwardly sufficiently so that the extension 162 no longer substantially interferes with the flange 168 or the groove 164. Also it will be noted that the back ferrule 30 has pushed the back end of the front ferrule 24 radially outward so as to further bend or deflect the extension 162. Although FIG. 7B is for a complete pull-up position, the retaining structure 154 may be designed to bend the extension 162 after a partial pull-up, such as for example during a pre-swaging operation.

Figure 8A:
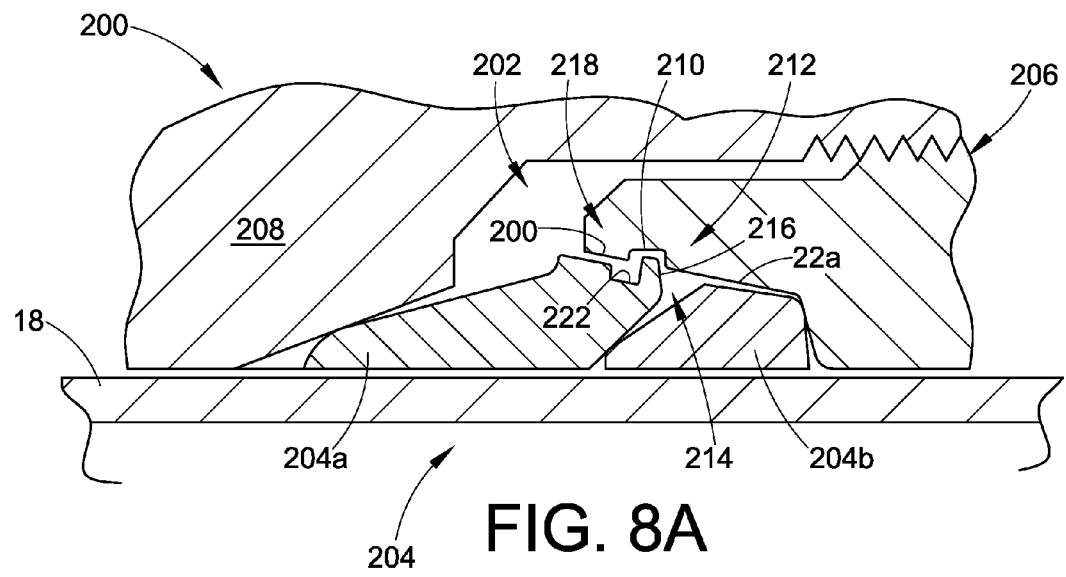
FIGS. 8A and 8B illustrate another embodiment of a fitting having a subassembly of a ferrule retained with a fitting component, for a male threaded nut, illustrated in half-longitudinal cross-section for a finger-tight position and a pulled-up position respectively.
Figure 8B:
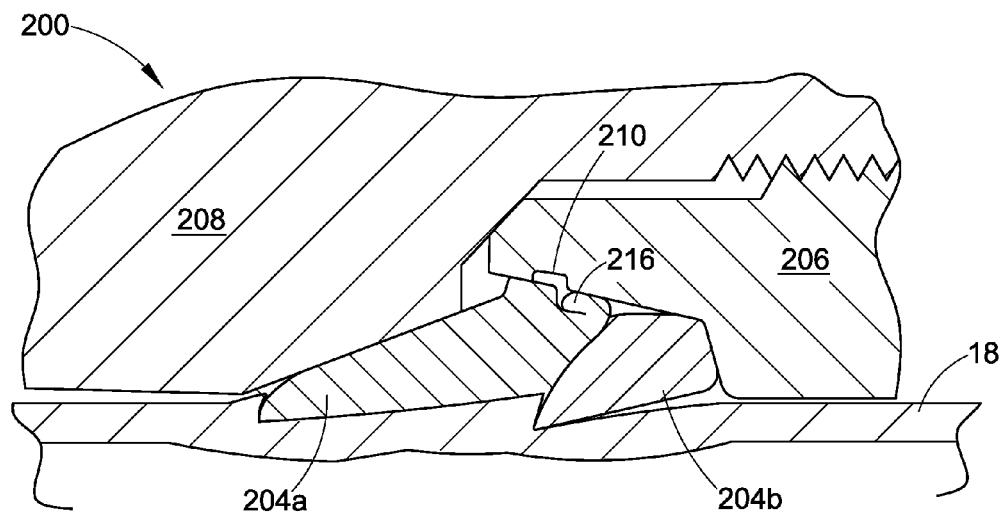

With reference to FIGS. 8A and 8B, we show another embodiment of a conduit fitting assembly 200 that includes a discontinuous subassembly, preassembly or unit 202 having one or more conduit gripping devices 204 retained with a retaining fitting component 206. In this embodiment, the fitting assembly 200 is commonly referred to as a female fitting because the first fitting component 208 may be realized in the form of a female threaded body, and the second or retaining fitting component 206 may be realized in the form of a male threaded nut. The basic structure of the first and second fitting components, except as otherwise noted herein, are fully described in pending U.S. patent application Ser. No. 11/112,800, published as Publication no. US 2005/0242582 A1 on Nov. 3, 2005 for FITTING FOR TUBE AND PIPE, the entire disclosure of which is fully incorporated herein by reference. The body 208 and nut 206 as used herein may be, but need not be, basically the same as in the Ser. No. 11/112,800 application, except that the nut 206 has been modified to include a recess or groove 210 formed in an inboard portion of the nut 206.

In the embodiment of FIGS. 8A and 8B, a retaining structure 212 for retaining the one or more conduit gripping devices 204 (in this example including a front ferrule 204*a* and a back ferrule 204*b*) may include a first retaining portion 214 in the form of a generally radial extension 216 from the rearward end of the front ferrule 204*a*, and a second retaining portion 218 in the form of the recess or groove 210 formed in the nut 206. The extension 216 cooperates with the groove 210 to retain the one or more conduit gripping devices with the nut 206 as the discontinuous cartridge 202. In this embodiment, the male nut 206 may include a radially tapered surface 220 as per the above referenced disclosure, and the recess 210 may be conveniently formed therein. The outboard portion 220*a* of the tapered surface 220 will function to cause a radially inward compression of the extension 216 during a partial or complete pull-up of the fitting 200. In the finger-tight assembly of FIG. 8A, the extension 216 has been snapped into place in the groove 210 to retain the ferrules with the nut 206.

FIG. 8B illustrates the fitting assembly 200 in a complete pull-up position in which the extension 216 has been deflected or bent so that upon disassembly of the fitting 200 the extension 216 will no longer interfere with the groove 210. Note that the extension 216 has been deflected in a counter-clockwise direction (or in-board direction, as viewed in FIG. 8B), whereas in various other embodiments illustrated herein, the extension may be deflected in a clockwise or outboard direction. The retaining structures of the various embodiments herein may be designed as needed to provide a desired degree and direction of deflection as needed.

The front ferrule 204*a* may also be provided with an optional recess or groove 222 that may be positioned adjacent the radial extension 216 so as to facilitate the flexibility of the extension 216 to allow it to be bent or deflected as it engages the tapered surface 220*a* during pull-up.

Figure 9B:
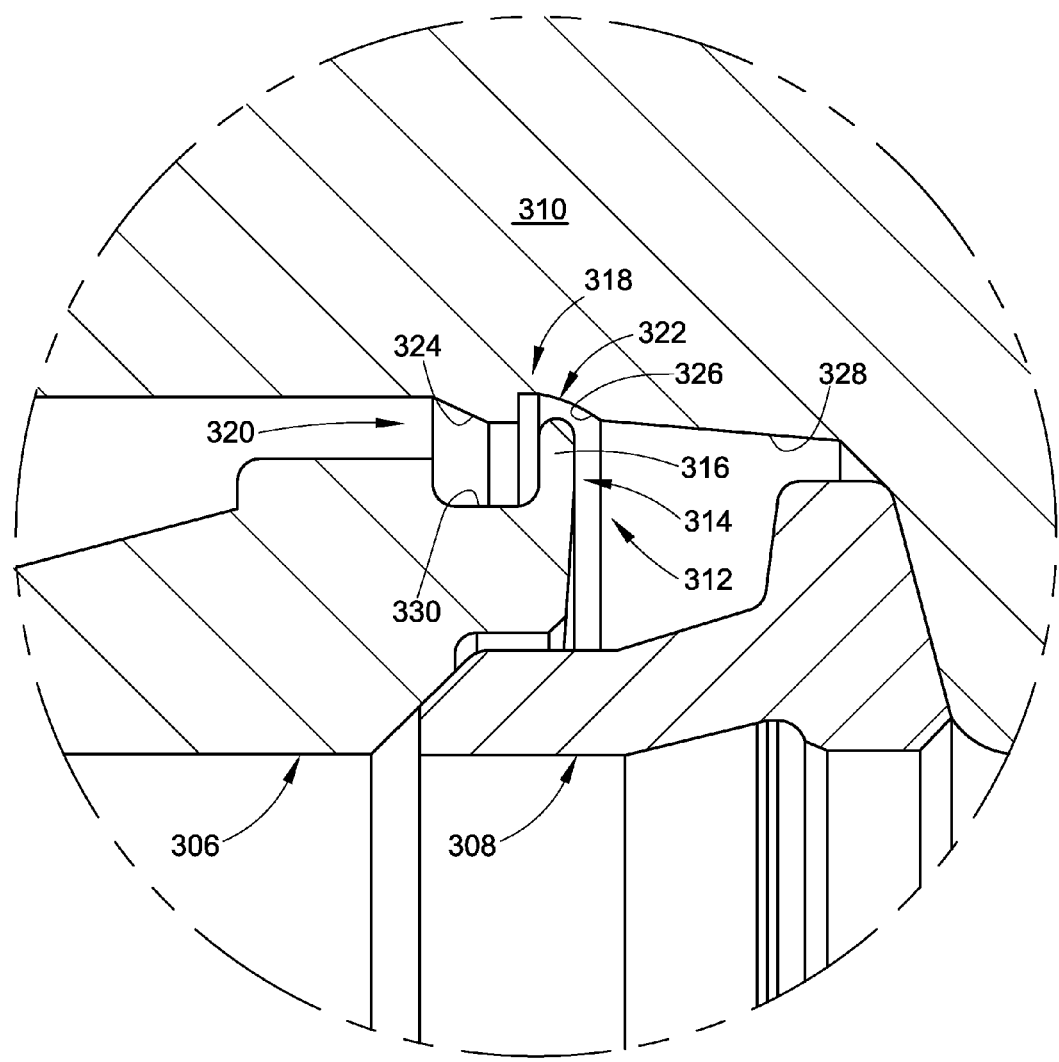

With reference to FIGS. 9A and 9B, in still another embodiment for a male fitting 300, in this example the body 12 is formed as part of a conventional union 302. In FIG. 9A the cartridge 304 has been joined to the body 12 in a finger-tight position but the conduit is omitted for clarity. A front ferrule 306 and back ferrule 308 are retained with the retaining fitting component in the form of a female threaded nut 310 as the discontinuous cartridge 304. As best illustrated in FIG. 9B, the discontinuous cartridge 304 includes a retaining structure 312 which may include a first retaining portion 314 in the form of a substantially radial extension 316. The nut 310 may include a second retaining portion 318 in the form of a radially inward tapered flange 320 and a groove 322. The radial flange 318 may include a first tapered surface 324 that causes an inward deflection or bending of the extension 316 as the front ferrule 306 is pushed into the nut 310. The extension 316 then snaps into the groove 322. Note that although in FIG. 9B there appears to have been no plastic deformation of the extension 316 during the insertion process, there may be some partial bending, however, the tapered surface 324 preferably will bend the extension 316 just enough to allow the extension to be disposed into the groove 322, with or without a resulting small latent deformation. The groove 322 may include a radially inwardly tapered portion 326 that causes the extension 316 to be bent towards the inboard end of the nut 310 (as viewed in FIG. 9B) during a partial or complete pull-up, similar to the bending direction of the embodiment of FIG. 8B herein. A second radially inwardly tapered surface 328 may optionally be provided to further bend the extension 316 radially inwardly during a partial or complete pull-up so that the extension 316 will not interfere with backing the nut 310 away from the assembly as needed for fitting disassembly and re-make. The front ferrule 306 may also be provided with an optional recess or groove 330 that may be positioned adjacent the radial extension 316 so as to facilitate the flexibility of the extension 316 to allow it to be bent or deflected as it engages the tapered surface 328 during pull-up.

It will be noted that in the various embodiments herein, although not required in all situations, the retaining structure, as well as the fitting components and the conduit gripping devices, are preferably all metal. Furthermore, the retaining structure preferably is designed so that during or after a partial or complete pull-up, the retaining fitting component may be axially released and moved away from the conduit gripping device or devices that the retaining fitting component had retained initially as a discontinuous subassembly or cartridge.

Figure 10:
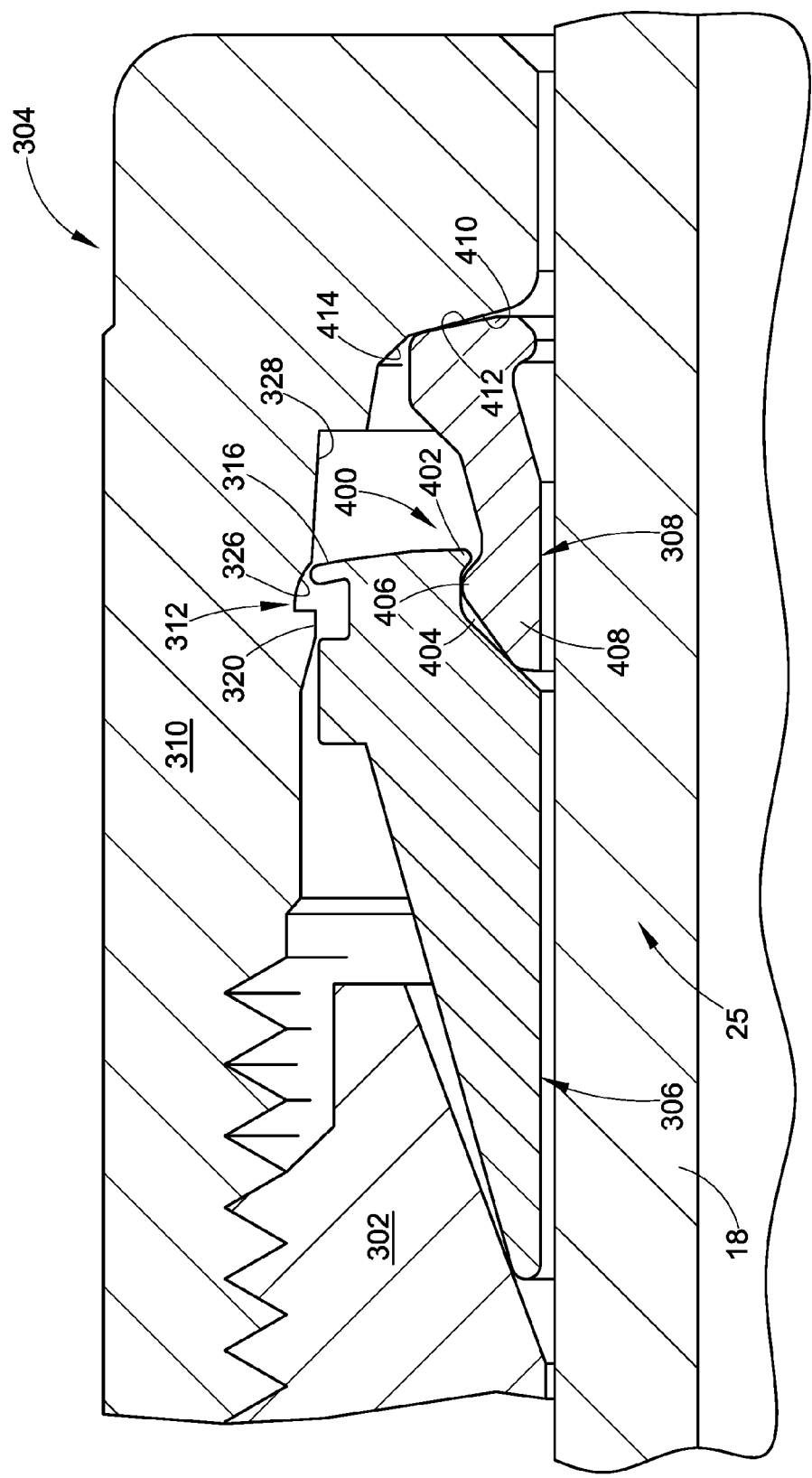
FIG. 10 illustrates another embodiment of a cartridge assembly using a ferrule cartridge concept, shown in half longitudinal cross section in a finger-tight position.
Figure 11:
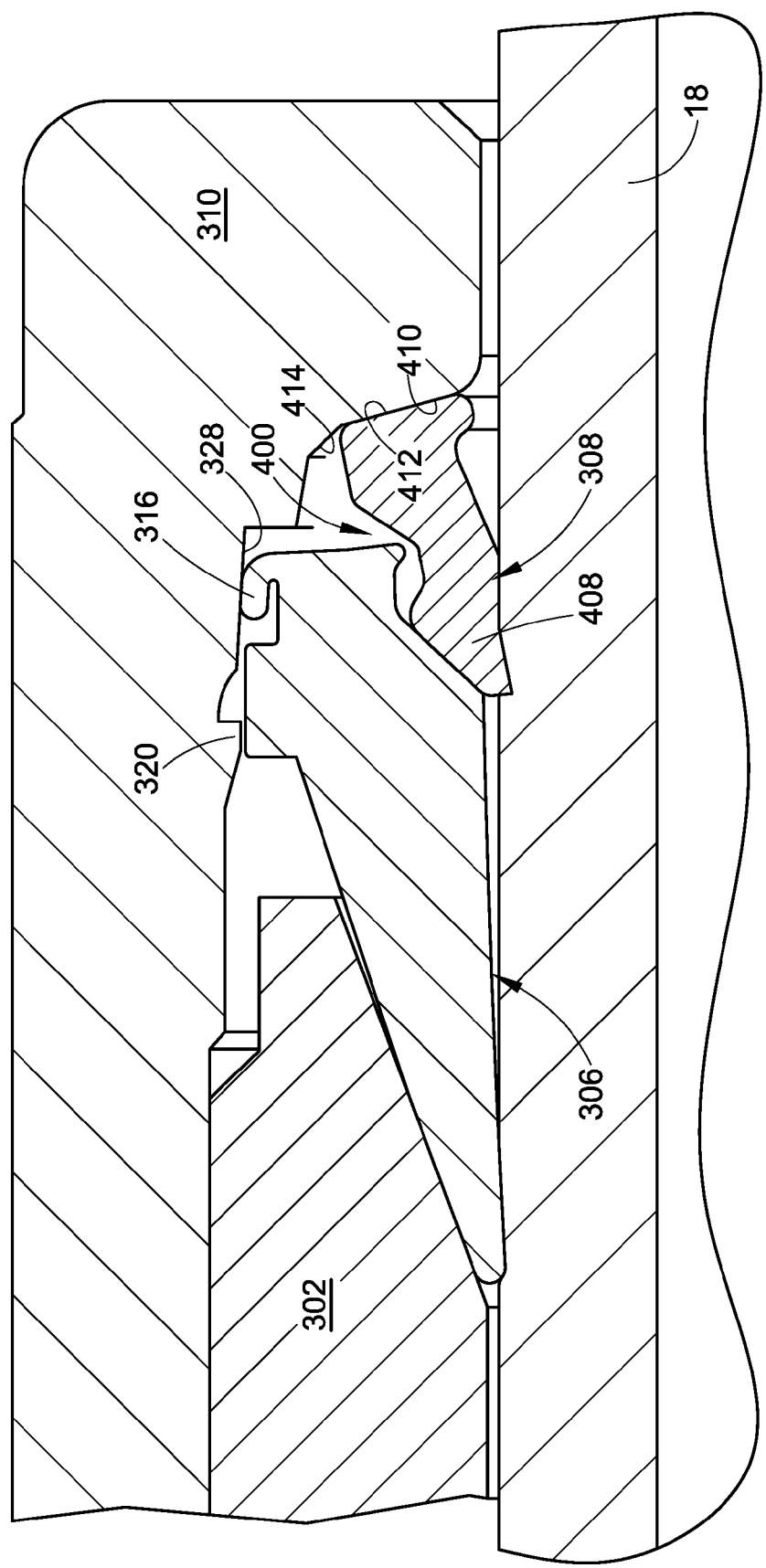
FIG. 11 illustrates the embodiment of FIG. 10 in a pulled-up position.

With reference to FIGS. 10 and 11, we illustrate another embodiment of a cartridge nut concept. This embodiment is similar in many respects to the embodiment of FIG. 9B and we use like reference numerals to refer to like parts. A significant difference is that the conduit gripping devices, in this example front and back ferrules 306, 308, are connected together in a ferrule cartridge or subassembly 25 preferably prior to installation into the retaining fitting component 310. The ferrules 306, 308 are connected by a retaining structure 400 which in this embodiment may be realized in the form of a lip 402 that presents a recess 404 in the rearward portion of the front ferrule. The crown portion 406 of the back ferrule 308 is received into the recess 404 to hold the ferrules together as a cartridge 25. The cartridge nut arrangement 304 may be realized using the retaining structure 312. The ferrule cartridge 25 design is fully described in pending United States patent application serial no. PCT/US2009/67508 filed on Dec. 10, 2009 for FERRULE ASSEMBLY FOR CONDUIT FITTING, then entire disclosure of which is fully incorporated herein by reference.

FIG. 11 illustrates the fitting in a pulled-up condition. Note that the radial extension 316 has been bent in an in-board or forward direction by contact with the second radially inwardly tapered surface 328 and that the back ferrule forward portion 408 has been radially compressed inwardly to disengage or release from the retaining structure 400.

Note also that FIG. 10 illustrates how in some cases the radial extension 316 may have an inward deflection or bend produced as the front ferrule 306 is pushed into the nut 310, caused by the inward tapered flange 320. Also it will be noted that the nut 310 includes a tapered drive surface 410 that acts as a ferrule drive surface against a back wall or driven surface 412 of the back ferrule 308 during pull-up. A third tapered surface 414 may be provided to facilitate centering the back ferrule in the nut 310 as the fitting is assembled in the finger-tight position. This tapered surface is also shown in the other embodiments herein (FIGS. 1-9B) and is fully described in pending International application serial no. PCT/US10/32524 filed on Apr. 27, 2010 for TAPERED DRIVE NUT FOR CONDUIT FITTING, the entire disclosure of which is fully incorporated herein by reference.

Figure 12:
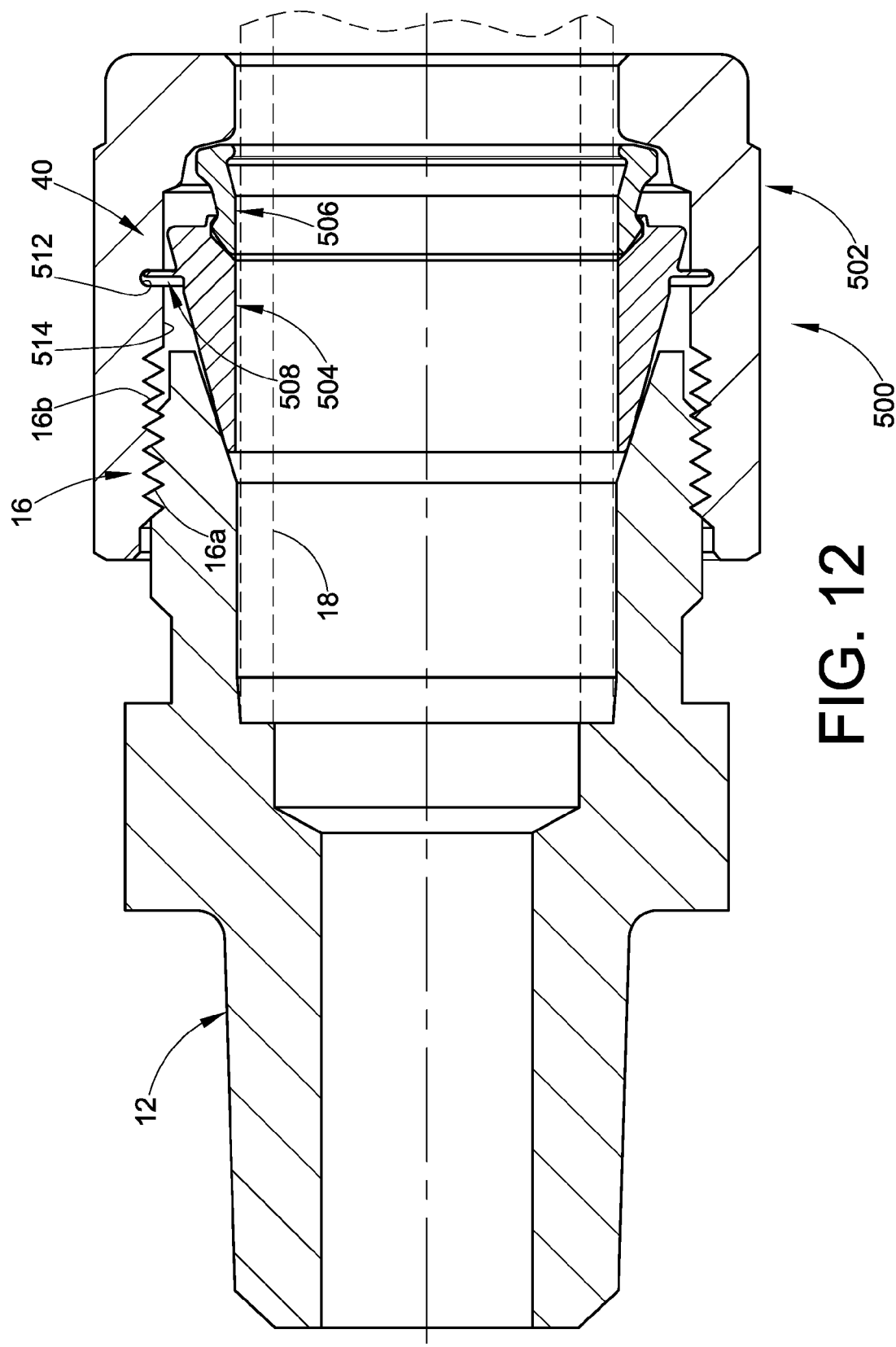
FIG. 12 another embodiment of a conduit fitting cartridge, subassembly or preassembly illustrating one or more of the inventions herein, shown in longitudinal cross-section.
Figure 13:
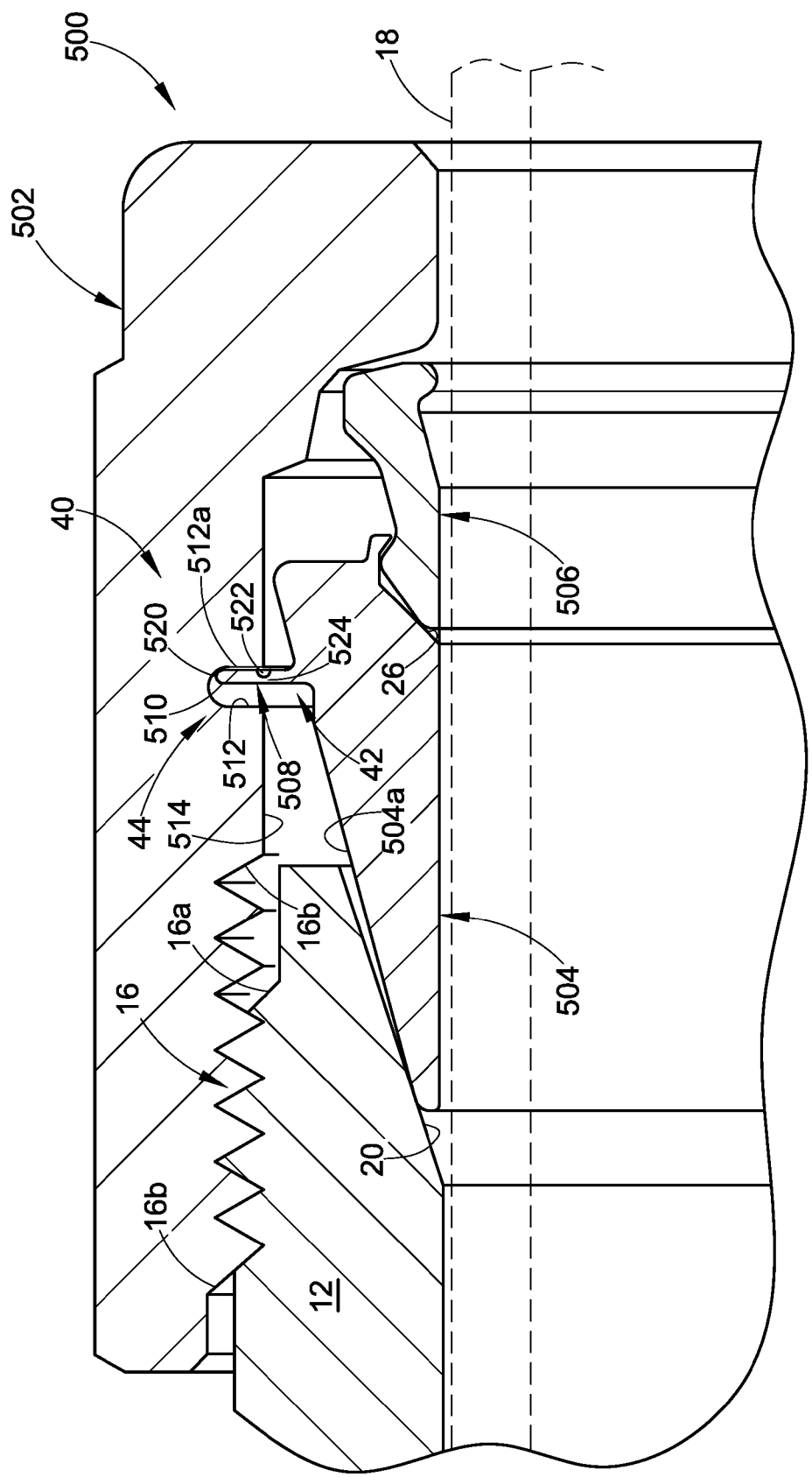
FIG. 13 is an enlarged view of the conduit fitting cartridge of FIG. 12.

With reference to FIGS. 12 and 13, we illustrate another embodiment of a discontinuous cartridge nut 500, shown assembled to a mating fitting component 12 such as a fitting body with a conduit end 18 (shown in phantom) in a finger-tight position. A retaining structure 40 is provided for retaining one or more ferrules or conduit gripping device with the retaining fitting component 502 which may be, for example, a female threaded nut. The retaining structure 40 includes a first retaining portion 42 associated with one of the conduit gripping devices, in this example the inboard front ferrule 504, and a second retaining portion 44 associated with the retaining fitting component. Alternatively, as with many of the other embodiments herein, the first retaining portion 42 may be associated with the back or outboard ferrule 506, especially when a ferrule cartridge concept is optionally used. In the embodiment of FIGS. 12-17 we illustrate use of the ferrule cartridge which may be realized as set forth in the above incorporated patent application. However, use of the ferrule cartridge is optional, and in the embodiment of FIGS. 12-17 the cartridge nut 500 design will retain both the front and back ferrules with the retaining fitting component without use of the ferrule cartridge concept.

As compared to other embodiments herein, the front ferrule 504 is provided with a generally radial flange 508 that extends radially outward from the outer surface 504a at a rearward portion of the front ferrule 504. The flange 508 need not be radial but may extend at a rake angle as needed or alternatively have a different profile. The angle of the flange 508 will be a design feature selected to achieve the desired robustness of the cartridge nut 500.

A distal portion 510 of the flange 508 is received in a groove or recess 512 formed in the interior wall 514 of the retaining fitting component 502. This recess 512 serves as the second retaining portion 44 of the retaining structure 40.

The flange 508 is sized and shaped or profiled so as to allow the front ferrule 504 to be threaded or screwed into the nut 502 via the female threads 16b of the threaded connection 16 between the nut and body. The back ferrule 506 is inserted first into the nut 502, and then the front ferrule is rotated through the female threads 16b and positioned into the recess 512. The recess 512 may be sized as needed to provide either a loose retention of the ferrules within the cartridge nut 500, or a more snug retention if so desired. When the fitting is assembled to a finger-tight position as in FIG. 13, the flange 508 may abut an outboard wall portion 512a of the recess 512. Preferably, although not necessarily, the threads 16b of the nut 502 extend nearly to the inboard end of the recess 512, so that the interior wall portion 514 is fairly short, allowing the flange 508 to be threaded down into the nut 502 almost to the recess 512 and then snapped or otherwise pushed into position in the recess 512. Alternatively, the threads 16b may extend all the way to the recess 512, or the threads may have a shorter axial length (thus increasing the axial length of the axial length of the interior wall 514).

Figure 14:
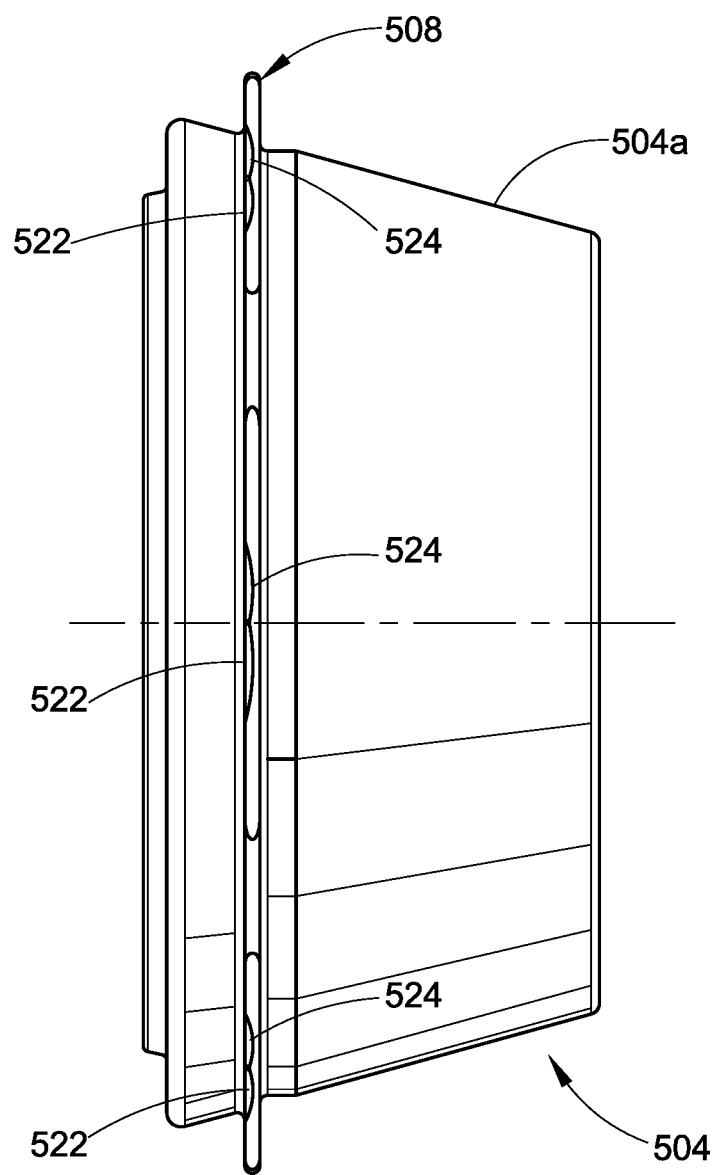

With reference to FIGS. 14-16 as well as FIG. 13, the front ferrule 504 may include a tapered conical outer surface 504a that will engage the camming surface 20 of the body 12 so that the front ferrule can function as a conventional front ferrule. The flange 508 may be axially disposed towards a rearward portion of the front ferrule, but alternatively the flange may be located at any convenient axial location along the front ferrule outer surface 504a. To increase the flexibility of the flange 508, the flange may be formed with a polygonal profile. In the embodiment herein, the flange 508 is formed with a hexagonal shape, with six thread engaging hex sides such as radial tabs 516 generally evenly spaced about the circumference of the ferrule 504. The outer surface 518 of each radial tab 516 may be arcuate to facilitate screwing the flange 508 past the female threads of the nut 502. For example, the arc of the outer surface 518 of each hex portion may generally conform to the major diameter of the nut threads. Each radial tab 516 outer surface may also include a bevel or rounded portion 520 (best viewed in FIG. 16) to facilitate threading the flange through the nut threads. The bevel angle may generally match the thread pitch of the nut threads in the outboard facing direction. The flange 508 will also be preferably thin enough to easily pass along the nut threads during assembly. Moreover, each radial tab 516 may include a slight twist to match the nut thread angle.

The front ferrule 504 also includes a frusto-conical camming surface 26 as is conventional, against which the back ferrule 506 engages during pull-up.

Figure 17:
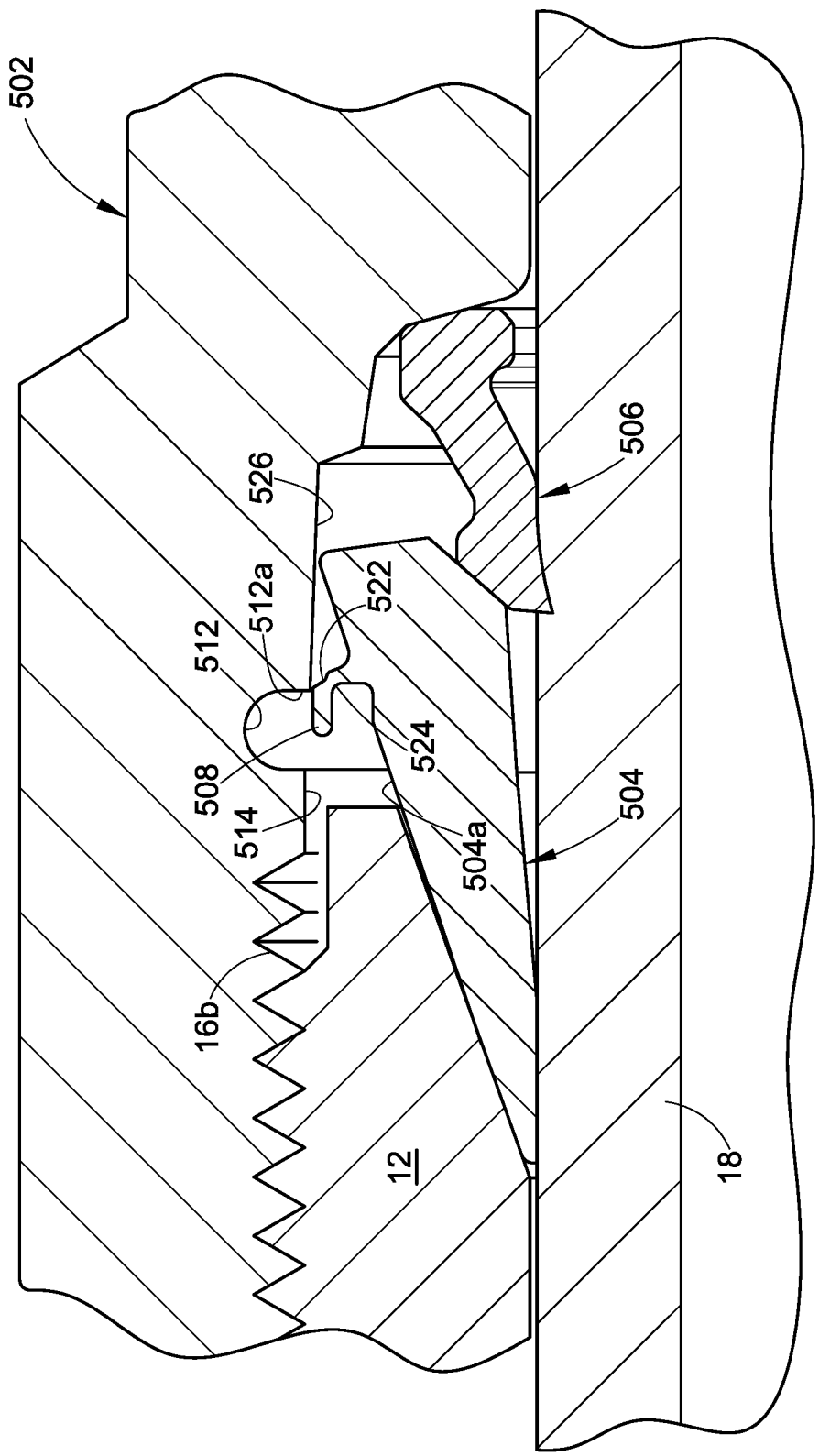
FIG. 17 illustrates in a stylized manner the embodiment of FIGS. 12 and 13 in a pulled up condition.

In a manner similar to the above-described embodiments, during either a partial or complete pull-up of the fitting assembly, the nut 502 moves axially relative to the body 12 so that the ferrules are axially engaged and radially compressed against the conduit 18. The nut 502 moves axially faster relative to the body 12 than do the ferrules, so that the nut 504 will move past the flange 508. This causes an interference between the outboard wall 512a of the recess 512 and the flange 508. As the nut advances axially further, the flange 508 will be bent over and in an in-board direction as illustrated in FIG. 17. The nut may include a tapered wall portion 526 adjacent the recess 512 and having a decreasing radial dimension in the outboard direction, to facilitate bending the flange 508 during pull-up. In this manner, after at least a partial pull-up, the flange 508 has been bent sufficiently to no longer retain the front ferrule with the nut 502 and does not interfere with the operation of the ferrules during pull-up. This will allow the nut 504 to be axially withdrawn from the fitting assembly if so desired, after a partial or complete pull-up.

To facilitate the bending action of the ferrule during pull-up each radial tab 516 may be provided optionally with a relief notch or recess 522 (see FIG. 13 for example) that provides a thinned wall 524 of the hex portion. The shape, depth and size of the relief notch 522 may be designed as needed to facilitate bending the radial tabs 516 during pull-up. The relief notch 522 in the drawings is illustrated on the outboard side of the flange 508, but alternatively may be on the inboard side of the flange 508.

The flange 508, in a manner analogous to some of the embodiments hereinabove, thus has a retaining position at a first axial location relative to the nut 502 as illustrated in FIG. 13 and a release position at a second axial location relative to the nut 502 as illustrated in FIG. 17. The flange in this example undergoes a radial modification or deformation between the retaining position and the release position.

The flange 508 preferably is formed integral with the front ferrule 504 during machining of the ferrule. For example, the ferrule 504 may be machined from hex bar stock to facilitate forming the hex flange 508. Alternatively, the flange 508 may be provided as an attached additional piece by welding, brazing, press fit or other suitable technique, for example, or may be a breakaway piece.

The use of multiple radial tabs 516 provides a circumferentially discontinuous structure that do not take on any added hoop strength while flexing or bending out of the way during pull-up, and therefore the radial tabs can more readily disengage from the recess 512. A continuous or non-segmented flange, which is an alternative embodiment if so needed, would take on a hoop compression stress that could resist the bending action, therefore other design criteria might be needed to facilitate the bending action, for example, a thinner flange.

In the exemplary embodiments of FIGS. 18-22 (wherein the -1 designator is used to group various alternative embodiments as well as to designate like components of other embodiments herein as well as distinguishing alternative, different or additional components described with this grouping) the front ferrule 24-1 may be conventional in design, if so desired, so that the first retaining portion 42-1 may simply be realized in the form of the outer tapered surface 24a-1 of the front ferrule 24-1. Alternatively, the front ferrule may be modified to include a structure or feature (not shown) that will interact with the second retaining portion 44-1, but for the exemplary embodiments such structure is not needed. In any case, the front ferrule 24-1 will coact with the second retaining portion 44-1 so as to retain the ferrule or ferrule set together with the nut 14-1 as a discrete and discontinuous subassembly 25-1.

The second retaining portion 44-1 may be realized in the form of a retaining member 46-1, such as an extension or protrusion from an interior surface 48-1 of the retaining fitting component 14-1. The retaining member or protrusion 46-1 may be a tab or tab-like structure that extends generally radially inward to a distance by which the distal end 46a-1 of the retaining member will prevent or inhibit the ferrules 24-1, 30-1 from falling out of the retaining fitting component 14-1. However, alternatively the retaining member 46-1 may protrude inwardly other than radially. For example, the retaining member may be canted (as shown in phantom in FIG. 18) towards the outboard end 14a-1 of the nut 14-1, which may facilitate inserting the front ferrule into the nut 14-1, particularly if the retaining member 46-1 is quite stiff or resistant to bending moments. The distal end 46a-1 may also alternatively have a rounded, curved or sloped contour so as to not scratch or dig into the front ferrule when the front ferrule is pushed into the nut 14-1. Alternatively, the retaining member may be multiple extensions spaced around the interior surface 48-1, or may be an annular projection or a series of arcuate projections, for example.

The location, shape, size, length and profile of the retaining member 46-1 may depend in part on the design of the cooperating first retaining portion 42-1 of the front ferrule 24-1. The design of the retaining structure 40-1, including the design of the first retaining portion 42-1 and the second retaining portion 44-1, may also depend in part on the nature of the retention force desired. For example, in some applications it may be desired to have the ferrules 24-1, 30-1 strongly and securely retained with the fitting component 14-1 so that the ferrules do not fall out or get knocked out during handling, shipping or exposure to other force applying environments, while in other applications such a strong retention force may not be needed. As another example, in some applications it may be desired to have the ferrules snugly held together and retained with the fitting component, while in other applications it may be more desirable to have the ferrules somewhat loosely held together and retained with the fitting component. These are just a few of the criteria that may be considered when designing the retaining structure 40-1. The retaining member 46-1 may contact the front ferrule 24-1 when the ferrules 24-1, 30-1 and the retaining fitting component 14-1 are installed in the retaining fitting component, or may be axially spaced such that the retaining member only contacts the front ferrule 24-1 should the front ferrule drop down into contact with the retaining member 46-1. Looser retention of the ferrules in the nut 14-1 may facilitate pull-up of the fitting assembly by not interfering with centering of the ferrules as the nut 14-1 is initially rotated relative to the body 12-1.

The second retaining portion 44-1 may be designed to achieve the desired retaining force for the subassembly 25-1 prior to assembly with the mating fitting component. The second retaining portion may also optionally be designed to facilitate release of the retaining fitting component from the one or more conduit gripping devices after assembly with the mating fitting component, for example after or during a partial pull up or a complete pull up of the fitting assembly onto a conduit.

The retaining member 46-1 may be configured such that as the front ferrule is inserted into contact with and then pushed past the retaining member 46-1 (keeping in mind the back ferrule 30-1 is installed first for a two ferrule fitting), the front ferrule 24-1 may optionally snap into or otherwise be received in the socket 50-1 of the nut 14-1. This snap effect may occur after the front ferrule 24-1 has been axially pushed or inserted into the nut 14-1 so as to move the enlarged back end 24b-1 of the front ferrule past the retaining member 46-1. This is the position illustrated in FIGS. 18 and 19. The retaining member 46-1 may be dimensioned and designed such that as an option, a tactile or audible snap or click or both may be sensed by an assembler as the front ferrule is pushed past the retaining member 46-1.

Figure 18:
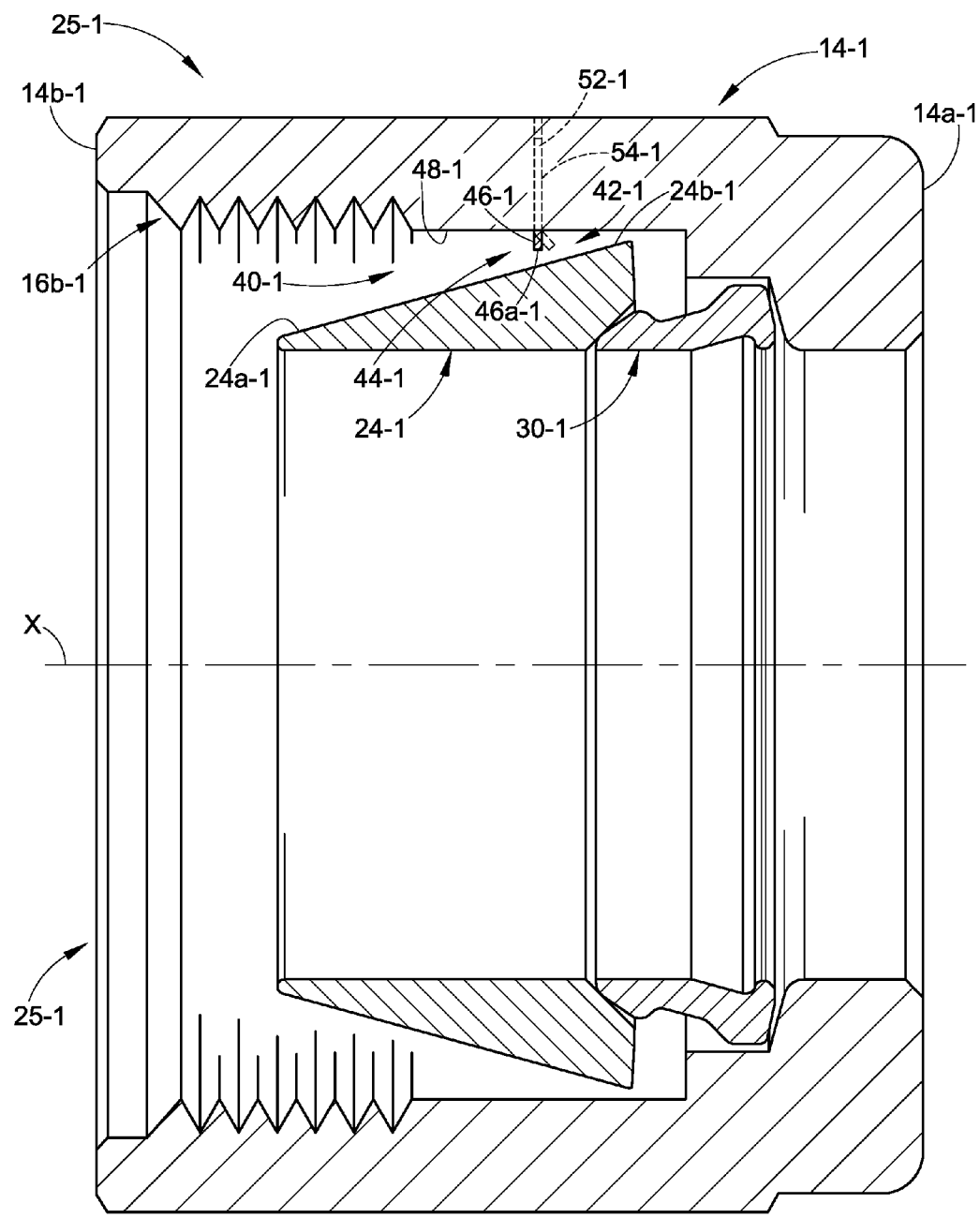
FIG. 18 is another embodiment of a conduit fitting cartridge, subassembly or preassembly illustrating one embodiment of one or more of the inventions herein, shown in longitudinal cross-section.

The radial outermost dimension of the retaining member 46-1, in cooperation with the taper angle of the outer surface 24a-1 of the front ferrule, and the degree of bending to which the retaining member 46-1 is subjected, may also be chosen such that when the cartridge 25-1 is in the retained configuration of FIG. 18, the ferrules 24-1, 30-1 are somewhat loosely retained and may even have a slight rattle when the nut 14-1 is gently shaken. This looseness may in some applications facilitate final assembly with the second or mating fitting component (in this example the body 12-1), especially in allowing the ferrules to center and align during pull-up of the fitting assembly 10-1. In alternative embodiments, however, the ferrules 24-1, 30-1 may be snugly or even tightly retained in the nut 14-1. In any case, it is contemplated that after the front ferrule 24-1 has been inserted such that the enlarged back end 24b-1 is axially past the retaining member 46-1, that the radial dimension of the retaining member 46-1 will be sufficient so as to interfere with the front ferrule 24-1 (such as the enlarged back end portion in the exemplary embodiment) to prevent or inhibit the front ferrule 24-1 (as well as the back ferrule for a two ferrule fitting assembly) from dropping out of the nut 14-1, even if the nut is dropped or otherwise exposed to shock or other adverse forces prior to assembly with the mating fitting component 12-1. Preferably the retaining member 46-1 will interfere with the front ferrule 24-1 to retain the one or more ferrules with the retaining fitting component even if the retaining member is somewhat bent or plastically deformed when the front ferrule 24-1 is pushed into the socket 50-1.

In order to facilitate inserting the front ferrule 24-1 into the nut 14-1, the retaining member 46-1 may be dimensioned so that it is bendable or flexible to allow the front ferrule to be pushed past the retaining member 46-1. Moreover, in the exemplary embodiments herein, the bendable or flexible retaining member 46-1 will also be able to be plastically deformed or bent away so as to no longer interfere with the front ferrule 24-1. The retaining member 46-1 may be integrally machined with the nut 14-1 or attached in some manner.

In an alternative embodiment, rather than a member that extends from the interior surface 48-1 of the retaining fitting component, a pin-like member 52-1 may be inserted through a hole 54-1 formed through the nut 14-1, as shown in phantom in FIG. 18. The pin-like member 52-1 may extend down into the nut interior so as to function in a manner similar to the retaining member 46-1.

Figure 19:
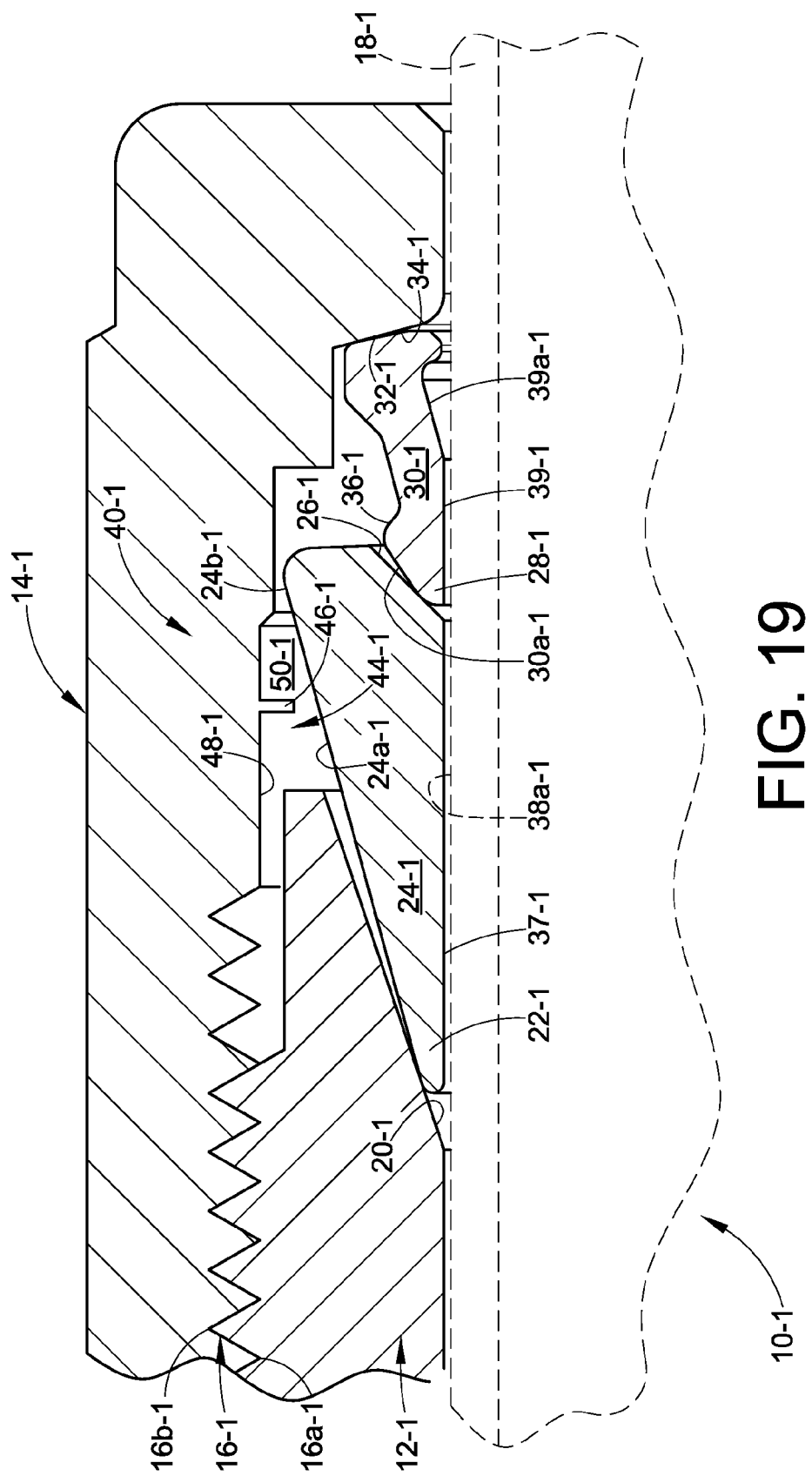
FIG. 19 illustrates an embodiment of a fitting assembly using the subassembly of FIG. 1, shown in a finger-tight position.
Figure 20:
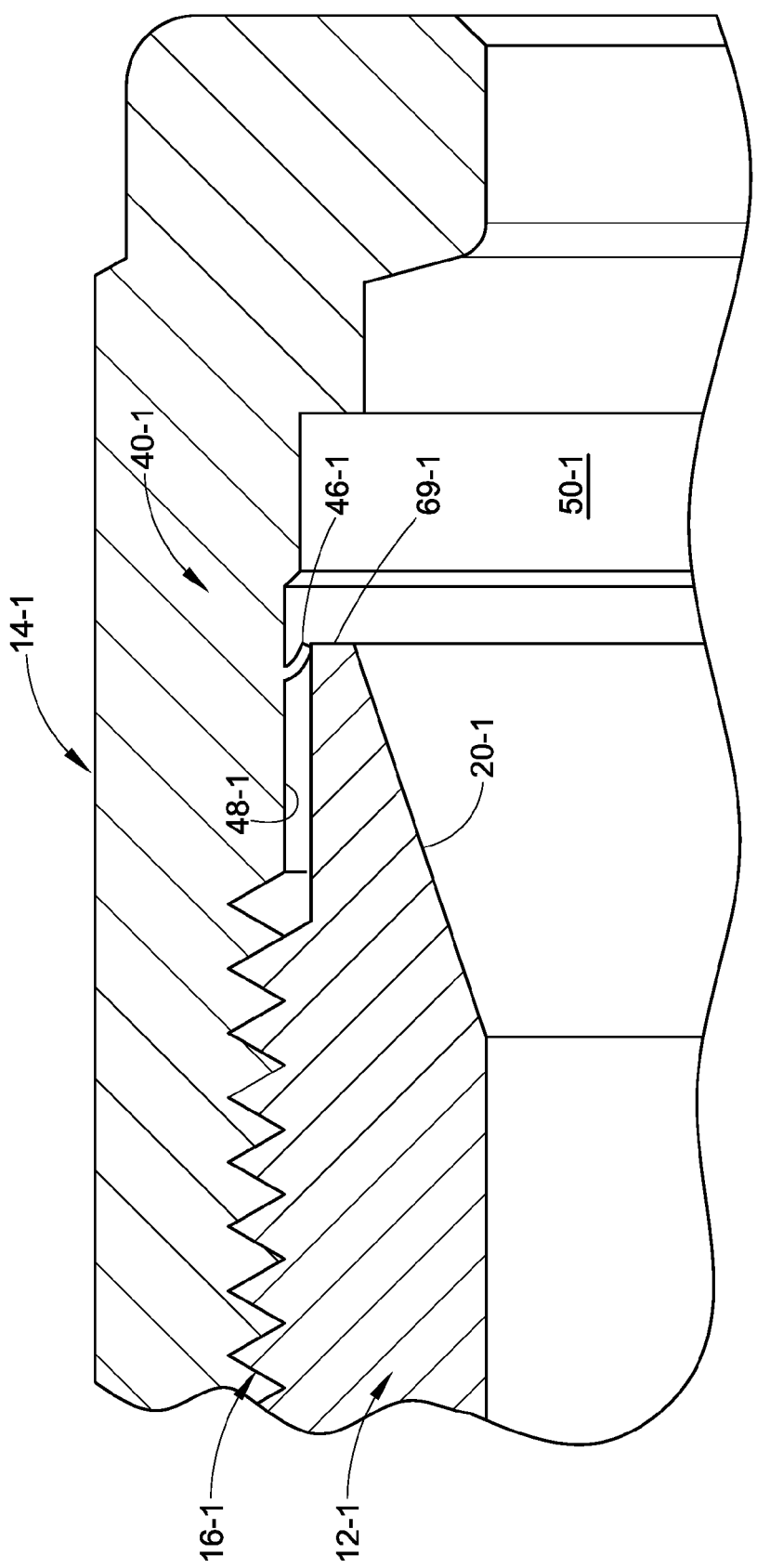
FIG. 20 illustrates the embodiment of FIG. 19 for the nut and body fitting components in an assembled position of a partial or complete pull-up.

FIG. 19 therefore shows the subassembly 25-1 after it has been joined to the second or mating fitting component 12-1 to a finger tight position. In this position, the retaining member 46-1 is axially forward of a portion of the front ferrule 24-1 that is radially larger than the radial dimension of the distal end 46a-1. With reference to FIG. 20, we show just the body 12-1 and the retaining fitting component or nut 14-1 after they have been tightened together during pull-up. In this example, we illustrate the parts tightened together during a partial pull-up. The body 12-1 includes an axially outboard end 60-1 that will engage the retaining member 46-1 after some predetermined axial displacement of the nut 14-1 relative to the body 12-1. Further tightening of the nut onto the body causes the outboard end 60-1 to push against the retaining member 46-1, and in this embodiment, plastically deform and bend the retaining member 46-1 radially outward towards the internal surface 48-1 of the nut 14-1. Preferably, although not necessarily, the retaining member 46-1 may be sufficiently plastically deformed such that it will remain in a bent away position even after the nut 14-1 and body 12-1 may be subsequently disassembled. In such case, the retaining member 46-1 will no longer interfere with the retaining front ferrule 24-1, thus allowing, if so desired, for the nut 14-1 to be axially backed away from the body 12-1 even if the ferrules 24-1, 30-1 remain attached to the conduit 18-1.

Although omitted in FIG. 20, axial movement of the nut 14-1 relative to the body 12-1 causes the ferrules to deform and grip the conduit 18-1 (FIG. 19) in a known manner. The retaining structure 40-1 preferably is designed so as to not interfere with normal operation and pull-up of the conduit gripping devices onto the conduit to effect grip and seal.

In an alternative embodiment, the retaining member 46-1 may be elastic enough so that it is not necessarily plastically bent away, but rather will not prevent the nut 14-1 from being backed off axially from the body after a partial or complete pull-up. It is contemplated that in these embodiments, the retaining member 46-1 comprises metal or a stiff non-metal or plastic material that may plastically deform so as to no longer interfere with the front ferrule 24-1 after a partial or complete pull-up and disassembly of the nut and body. This is to distinguish the material of the retaining member from an elastic or elastomeric material such as rubber.

Accordingly, one or more of the embodiments facilitates a mechanism or structure and method by which one or more ferrules or conduit gripping devices may be retained with a fitting component as a discontinuous cartridge 25-1, with the retaining structure then being altered during pull-up (either a complete pull-up or a partial pull-up as needed) so that the nut 14-1 is released and may subsequently be axially withdrawn or pulled back from the body 12-1. The female nut 14-1 also helps to protect the ferrules during shipping and handling.

In an exemplary method, one or more conduit gripping devices are retained with a retaining fitting component as a discontinuous cartridge. This discontinuous cartridge forms a first part of a two part fitting assembly. The cartridge is then joined with the second part of the fitting assembly and a portion of a conduit. During at least a partial pull-up of the fitting assembly, the conduit gripping devices become attached to the conduit and become disengaged from the retaining fitting component so that the retaining fitting component may be removed from the fitting assembly after the partial or complete pull-up while the one or more conduit gripping devices remain attached to the conduit. In a more specific embodiment, the method may include the steps of retaining one or more conduit gripping devices with a retaining fitting component as a discontinuous cartridge, joining the cartridge to a second fitting component on a conduit to cause the conduit gripping devices to attach to the conduit, and disengaging the retaining fitting component from the conduit gripping devices so that the retaining fitting component may be removed from the fitting assembly after a partial pull-up while the one or more conduit gripping devices remain attached to the conduit. In still a more specific embodiment, the conduit gripping devices may be snapped into place in the retaining fitting component to form the cartridge.

Figure 21:
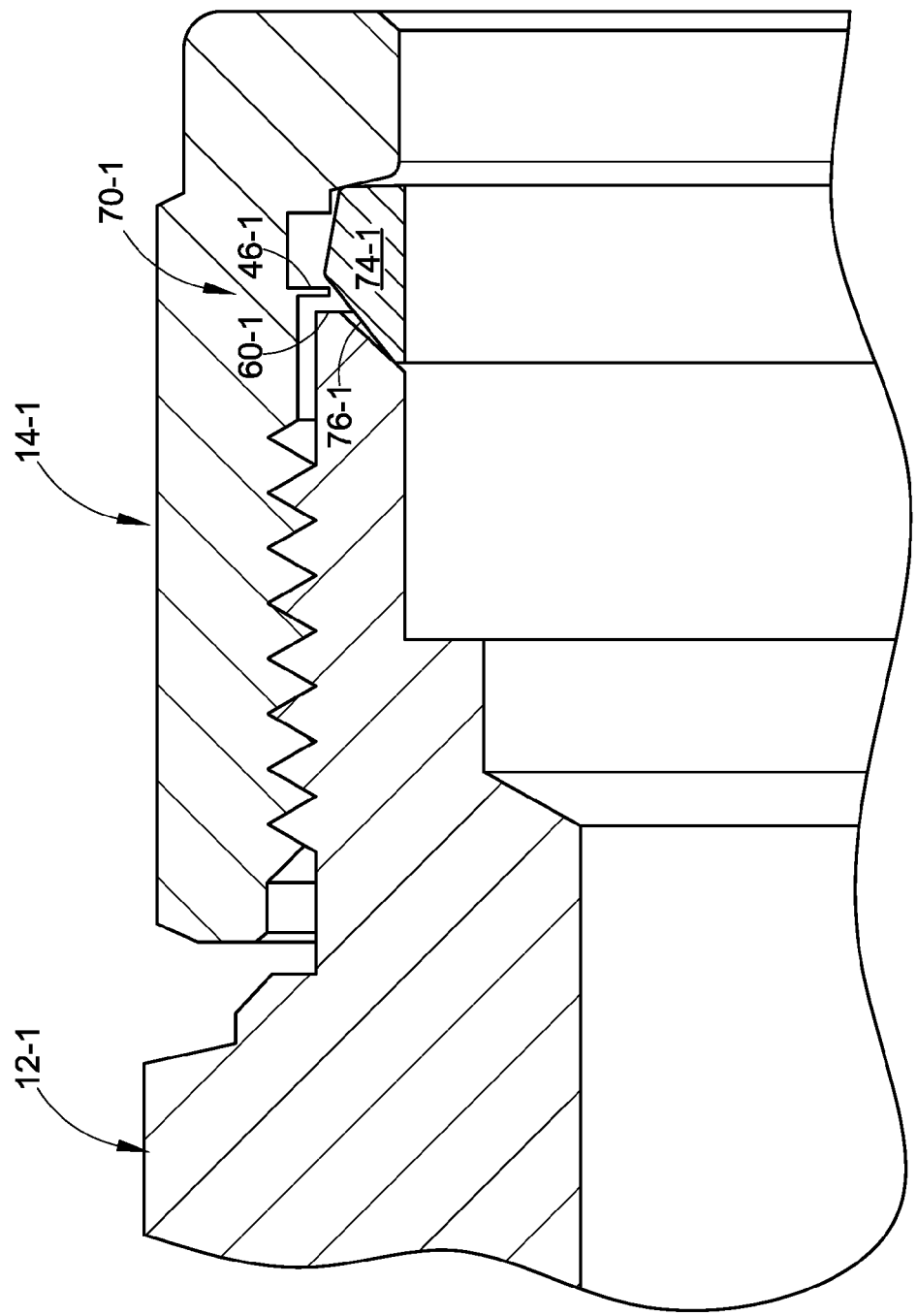
FIG. 21 illustrates another embodiment using a single conduit gripping device.

With reference to FIG. 21, we illustrate an embodiment of a retaining structure 70-1 that may be used to retain a single conduit gripping device with a retaining fitting component. The retaining structure 70-1 may be, but need not be, similar to the retaining structure 40-1 of the FIGS. 18-20 embodiment hereinabove. In this example, the retaining structure 70-1 may include a retaining member 72-1, such as in the form of a bendable tab or pin that interferes with the ferrule 74-1 to retain the ferrule in the nut 14-1 as a discontinuous subassembly or cartridge. The retaining member 72-1, for example, may interfere with an outer surface 76-1 of the ferrule. The body 12-1 may have an outboard end 60-1 that pushes and bends the retaining member 46-1 away so as to release the ferrule from the nut for subsequent disassembly, thus allowing the nut 14-1 to be axially moved away from the body even after a partial or complete pull-up.

In an alternative embodiment, the body 12-1 need not necessarily contact or bend the retaining member 72-1 away, but rather the inward radial compression of the ferrule 74-1 during pull-up may be sufficient to allow the ferrule 74-1 to clear the retaining member 72-1 after a partial or complete pull-up.

Figure 22:
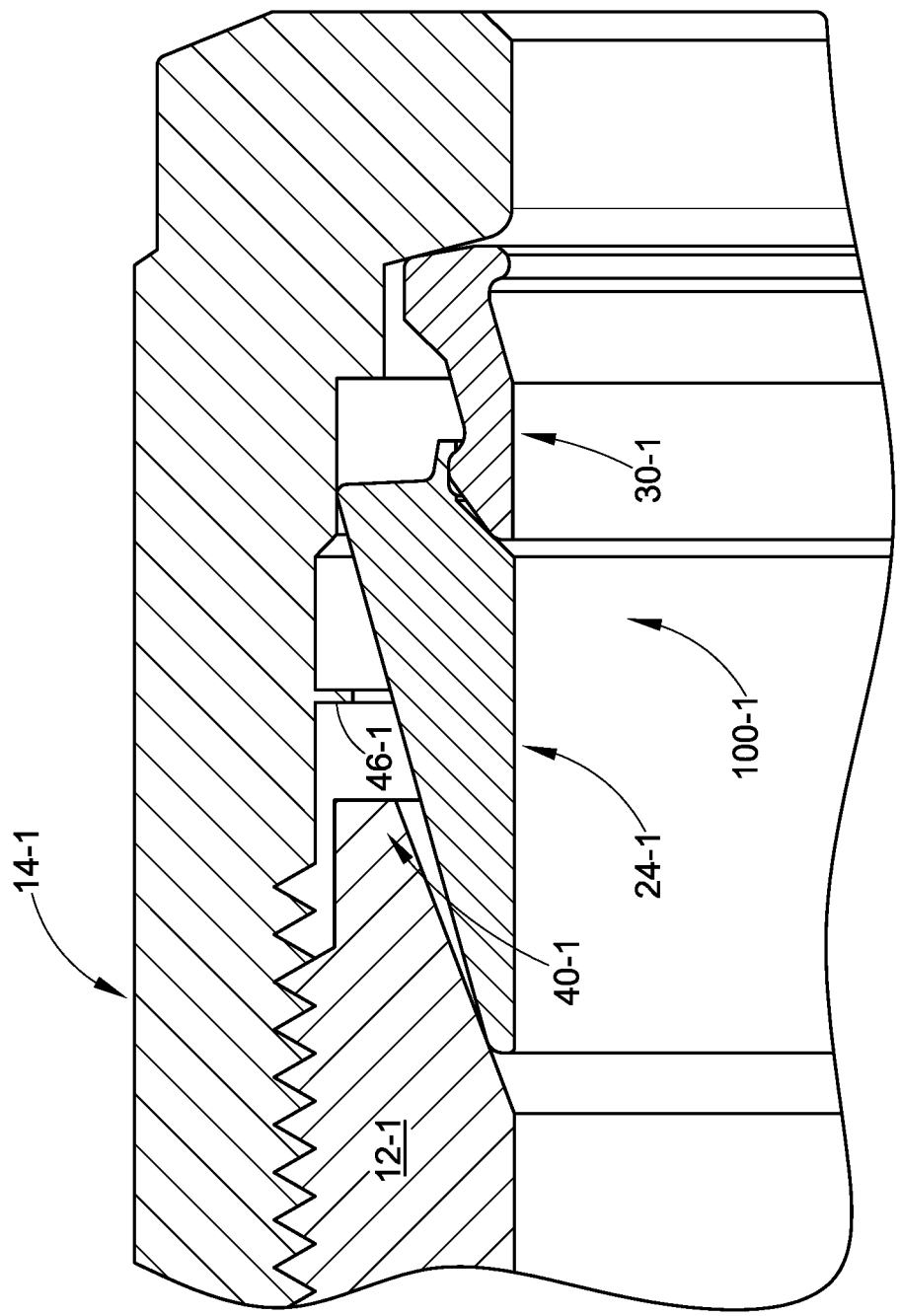
FIG. 22 illustrates another embodiment of a conduit fitting cartridge.

With reference to FIG. 22, we illustrate another embodiment. In this embodiment, a retaining structure 40-1 is provided that may be but need not be the same as described with reference to FIGS. 18-20 above. In addition, the front and back ferrules 24-1, 30-1 may comprise ferrule cartridge assembly 100-1 as well, where the ferrules are held together as a discrete subassembly before installation into the nut 14-1. The cartridge ferrule assembly is described in pending United States patent application serial no. PCT/US2009/67508 filed on Dec. 10, 2009 for FERRULE ASSEMBLY FOR CONDUIT FITTING noted above.

In the exemplary embodiments of FIGS. 23-32 (wherein the -2 designator is used to group various alternative embodiments as well as to designate like components of other embodiments herein as well as distinguishing alternative, different or additional components described with this grouping), the front ferrule 24-2 may be conventional in design, if so desired, so that the first retaining portion 42-2 may simply be realized in the form of the outer tapered surface 24a-2 of the front ferrule 24-2. Alternatively, the front ferrule may be modified to include a structure or feature (not shown) that will interact with the second retaining portion 44-2, but for the exemplary embodiments such structure is not needed. In any case, the front ferrule 24-2 will coact with the second retaining portion 44-2 so as to retain the ferrule or ferrule set together with the nut 14-2 as a discrete and discontinuous subassembly 25-2.

The second retaining portion 44-2 may be realized in the form of a retaining member 46-2. The retaining member 46-2 may be any generally annular or ring-like structure or partial ring-like structure that extends or protrudes generally radially inward to a distance by which an interior portion or surface 46a-2 of the retaining member will prevent or inhibit the ferrules 24-2, 30-2 from falling out of the retaining fitting component 14-2. The shape and profile of the retaining member may have a rounded, curved or sloped contour or other shape so as to not scratch or dig into the front ferrule.

As with other embodiments herein, the location, shape, size, length and profile of the retaining member 46-2 may depend in part on the design of the cooperating first retaining portion 42-2 of the front ferrule 24-2. The design of the retaining structure 40-2, including the design of the first retaining portion 42-2 and the second retaining portion 44-2, may also depend in part on how robust a connection is desired between the retaining fitting component and the conduit gripping devices, in other words, the nature of the retention force desired. For example, in some applications it may be desired to have the ferrules 24-2, 30-2 strongly and securely retained with the fitting component 14-2 so that the ferrules do not fall out or get knocked out during handling, shipping or exposure to other force applying environments, while in other applications such a strong retention force may not be needed. As another example, in some applications it may be desired to have the ferrules snugly held together and retained with the fitting component, while in other applications it may be more desirable to have the ferrules somewhat loosely held together and retained with the fitting component. These are just a few of the criteria that may be considered when designing the retaining structure 40-2. The retaining member 46-2 may contact the front ferrule 24-2 when the ferrules 24-2, 30-2 and the retaining fitting component 14-2 are installed in the retaining fitting component, or may be axially spaced such that the retaining member only contacts the front ferrule 24-2 should the front ferrule drop down into contact with the retaining member 46-2. Looser retention of the ferrules in the nut 14-2 may facilitate pull-up of the fitting assembly by not interfering with centering of the ferrules as the nut 14-2 is initially rotated relative to the body 12-2.

The second retaining portion 44-2 may be designed to achieve the desired retaining force for the subassembly 25-2 prior to assembly with the mating fitting component. The second retaining portion 44-2 may also optionally be designed to facilitate release of the retaining fitting component from the one or more conduit gripping devices after assembly with the mating fitting component, for example after or during a partial pull up or a complete pull up of the fitting assembly onto a conduit.

The retaining member 46-2, in cooperation with the taper angle of the outer surface 24a-2 of the front ferrule, may also be designed such that the ferrules 24-2, 30-2 are somewhat loosely retained and may even have a slight rattle when the nut 14-2 is gently shaken. This looseness may in some applications facilitate final assembly with the second or mating fitting component (in this example the body 12-2), especially in allowing the ferrules to center and align during pull-up of the fitting assembly 10-2. In alternative embodiments, however, the ferrules 24-2, 30-2 may be snugly or even tightly retained in the nut 14-2. In any case, it is contemplated that after the front ferrule 24-2 has been inserted (the back ferrule being inserted first for a two ferrule fitting) such that the enlarged back end 24b-2 is axially behind the retaining member 46-2, that the radial inner dimension of the retaining member 46-2 will be sufficient so as to interfere with the front ferrule 24-2 (such as the enlarged back end portion 24b-2 in the exemplary embodiment) to prevent or inhibit the front ferrule 24-2 (as well as the back ferrule for a two ferrule fitting assembly) from dropping out of the nut 14-2, even if the nut is dropped or otherwise exposed to shock or other adverse forces prior to assembly with the mating fitting component 12-2.

Figure 23:
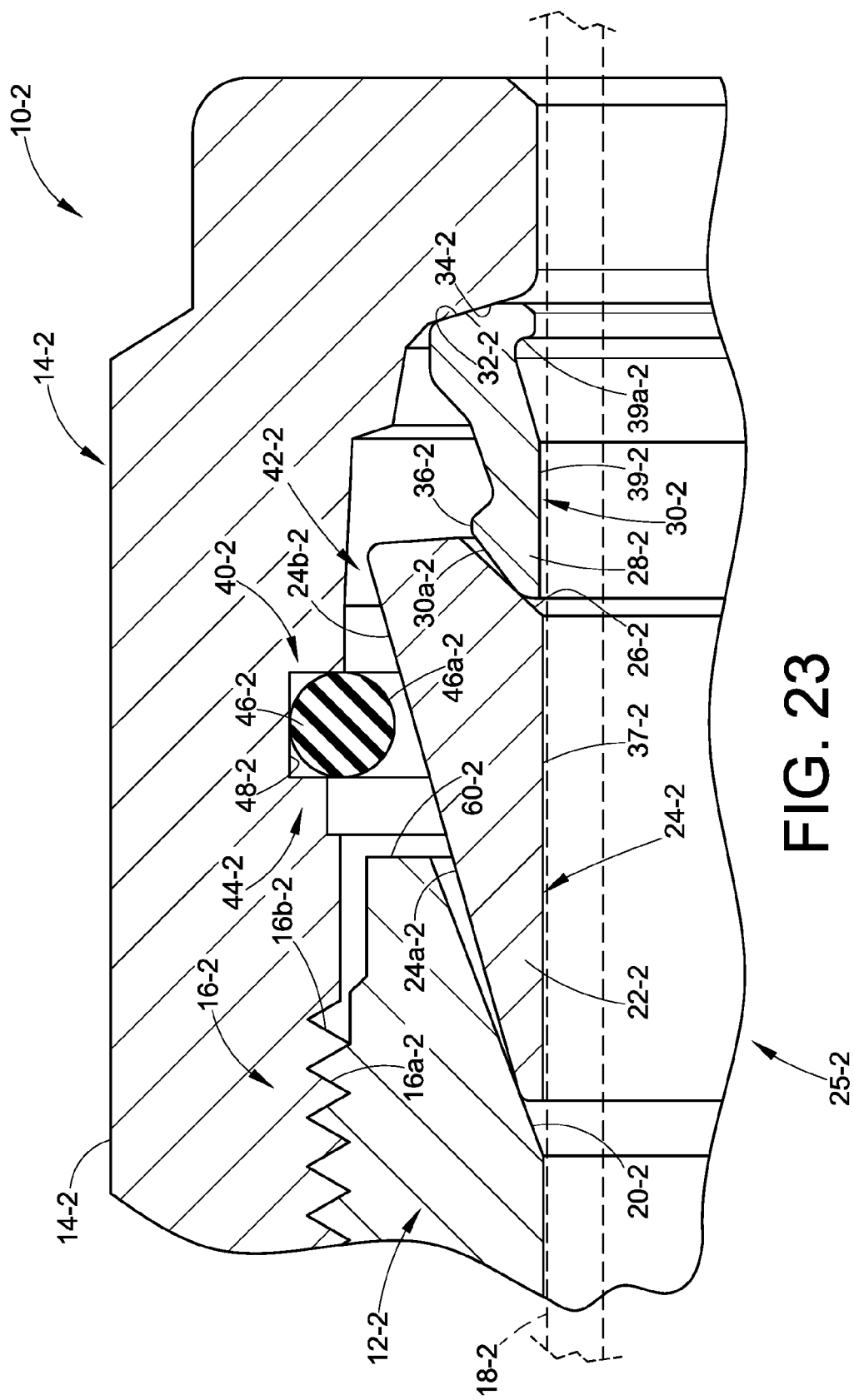
FIG. 23 is an embodiment of a conduit fitting cartridge, subassembly or preassembly illustrating one embodiment of one or more of the inventions herein, shown in longitudinal half cross-section and joined to a second fitting component in a finger-tight position.

In the exemplary embodiments, the retaining member 46-2 may be realized in the form of a flexible or compressible ring-like device that interferes with the ferrule 24-2 to retain the ferrule in the nut 14-2 as a discontinuous subassembly or cartridge 25-2. In the embodiment of FIG. 23, the retaining member 46-2 may be realized in the form of an o-ring or other resilient elastomeric or plastic or radially flexible metal part. The retaining member 46-2 may be captured in a groove or recess 48-2 formed in the retaining fitting component or nut 14-2. The retaining member 46-2 may be dimensioned so as to interfere with the radially enlarged rear portion 24b-2 of the front ferrule 24-2 to prevent the ferrule set (or a single ferrule) from falling out of the nut 14-2. The front ferrule 24-2 may be easily installed by pushing the ferrule past the retaining member due to the radial resiliency of the retaining member 46-2. Likewise, after a partial or complete pull-up the nut 14-2 may be easily moved axially back off the fitting assembly because the retaining member will not present an excessive resistance to moving the retaining fitting component back over the retaining member. The retaining member may, but does not have to, contact or engage the retaining conduit gripping device after a partial or complete pull-up. The designer may determine the degree of resistance or interference, if any, that the retaining member 46-2 presents to separation of the retaining fitting component from the fitting assembly after a complete or partial pull-up.

In the exemplary embodiments, the retaining member 46-2 may exhibit a radial outward force or bias against an interior surface of the recess 48-2. The retaining member 46-2 may be continuous or split and need not be round or of any particular shape. In cases where the retaining member is an elastomer or shaped ring (as in FIG. 27A hereinbelow), having a hoop strength or outward radial bias against the retaining member 46-2 may be beneficial in keeping the retaining member centered. However, for other embodiments, such as the cylindrical ring if FIG. 27B hereinbelow, it may be desirable not to have the ring contact the interior surface of the recess 48-2 in the free state as this might prevent radial expansion of the retaining member to allow insertion of the ferrule. Thus, the optional use of a radial outward load or hoop stress on the retaining member 46-2 will be determined by the type of materials used and the design of the retaining member, as well as the robustness desired for the discontinuous cartridge.

The retaining member 46-2 may be made of any suitable material, including elastomer, plastic and metal and preferably sturdy enough to retain the ferrules with the nut 14-2 as a cartridge 25-2. Use of a metal retaining member 46-2 allows for all metal fitting assemblies for high temperature applications or use with fluids that may damage an elastomer or plastic. Suitable metals may include but are not limited to stainless steel, brass, copper, steel, metal wire and so on to name just a few of the many available materials.

Axial movement of the nut 14-2 relative to the body 12-2 causes the ferrules to deform and grip the conduit 18-2 in a known manner. The retaining structure 40-2 preferably is designed so as to not interfere with normal operation and pull-up of the conduit gripping devices onto the conduit to effect grip and seal, or with remakes of the fitting.

For embodiments that use a retaining member 46-2 in the form of a compressed ring, it will be appreciated that in many uses the ring may likely be fairly stiff while in the cartridge subassembly as well as in the finger-tight position. This stiffness may be used to assure a robust subassembly that does not come apart too easily (as determined by the designer) during handling and shipping.

Use of the discontinuous cartridge 25-2 facilitates providing ferrule sets to the end user in which the ferrules and nuts are properly matched at the manufacturer. This can significantly simplify inventory control and reduce final assembly time. The embodiments herein also allow for a cartridge design in which the retaining fitting component may be used for fitting assemblies that do not need or have the retaining member 46-2. In other words, the cartridge designs herein use a nut or retaining fitting component that is backwards compatible with fitting assemblies that the end user may not require with a retaining structure. The cartridge design also may be realized using ferrule sets that do not require modification. Therefore, the cartridge concepts herein may be optionally provided for an end user without having to manufacture nuts or ferrules with different geometry and operation or performance. This allows the convenience of manufacturing and selling fitting components and ferrules as separate parts regardless of the end use of such individual parts, either for a cartridge use or a non-cartridge use.

Figure 24:
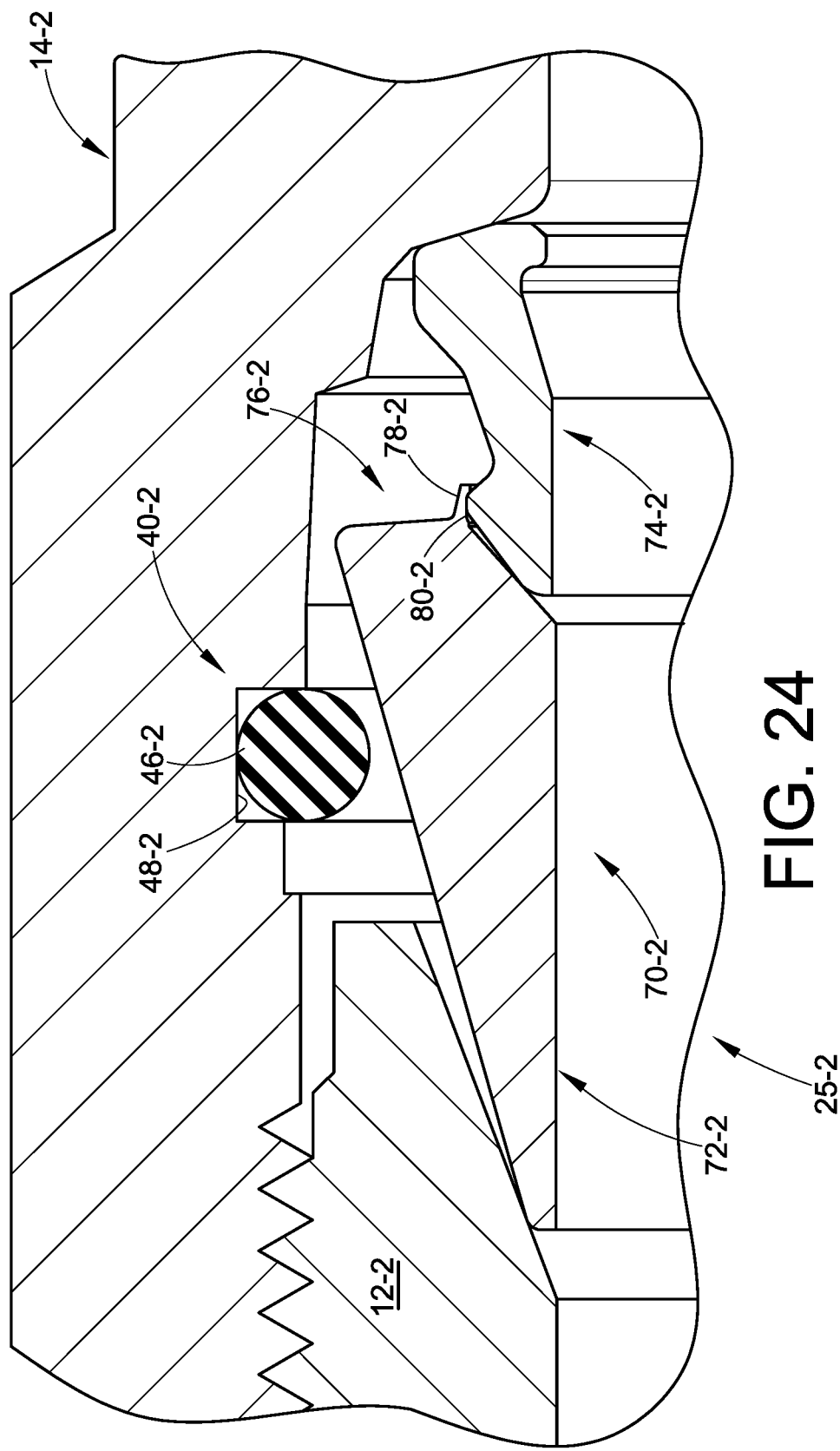
FIG. 24 is another embodiment of the fitting cartridge of FIG. 23 to include a ferrule cartridge assembly concept.
Figure 25:
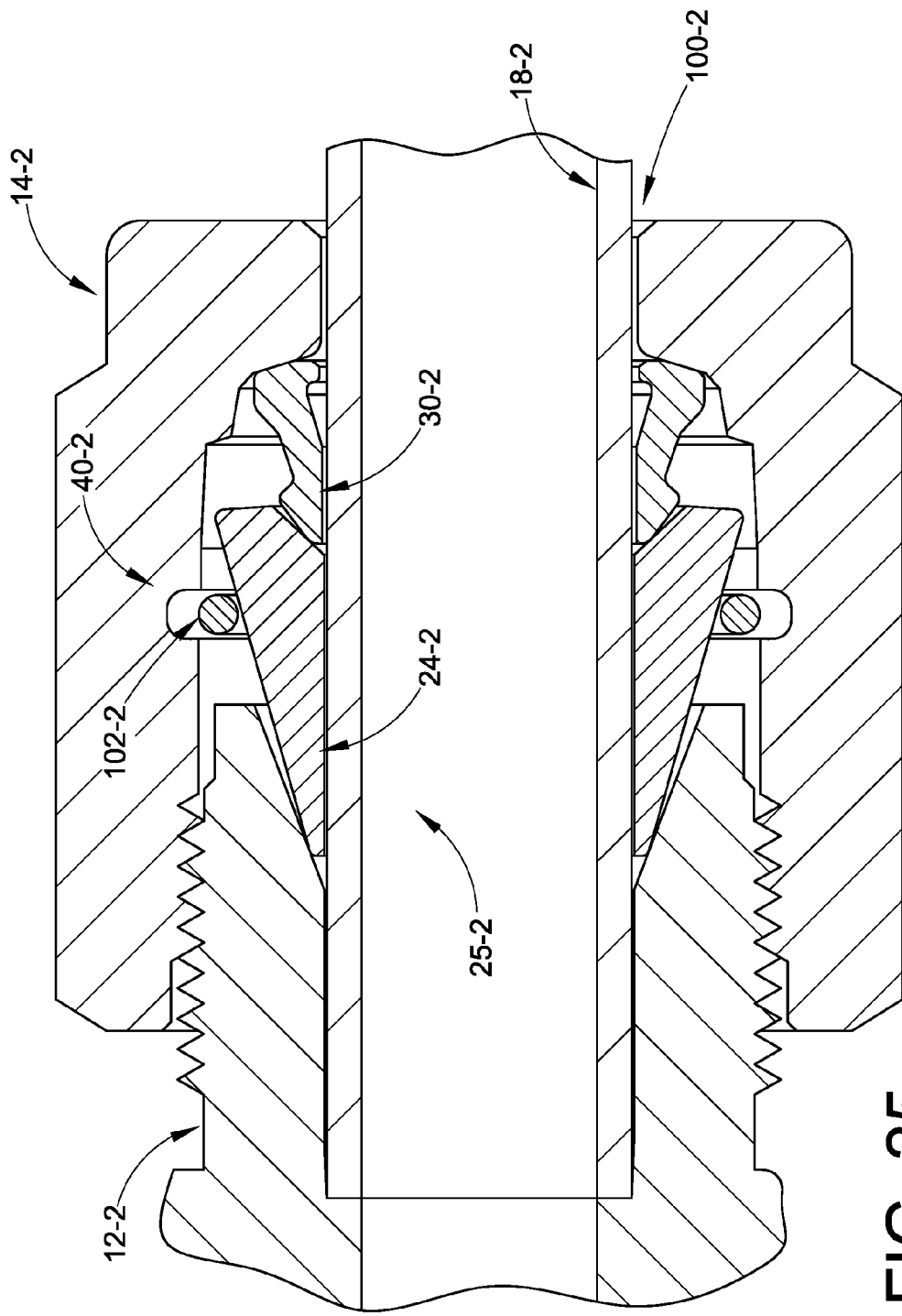
FIG. 25 illustrates another embodiment of a fitting cartridge, shown in longitudinal cross-section and joined with a second fitting component in a finger-tight position.

With reference to FIG. 24, we illustrate an alternative embodiment of a cartridge nut assembly. In this embodiment, the nut 14-2, body 12-2 and retaining structure 40-2 and operation may be but need not be the same as described hereinabove with reference to FIG. 23. Therefore, we use like reference numerals for like parts in the drawings. The notable difference in this embodiment is that we incorporate a ferrule cartridge 70-2 that provides a ferrule set of a front ferrule 72-2 and a back ferrule 74-2 that may be connected together as a discrete subassembly or cartridge before the ferrules are assemble with the retaining nut 14-2. The back ferrule 74-2 may be but need not be the same as the back ferrule 30-2 in the FIG. 23 embodiment. The front ferrule 72-2 may include a retaining structure 76-2 in the form of an extension or tang 78-2 that provides a socket or recess 80-2. The back ferrule front portion 74a-2 may be snapped into this recess 80-2 so as to connect the ferrules together as a ferrule cartridge. The cartridge nut retaining structure 40-2 may operate in the same manner as described hereinabove with respect to FIG. 23. The ferrule cartridge design is fully described in pending United States patent application serial no. PCT/US2009/67508 filed on Dec. 10, 2009 for FERRULE ASSEMBLY FOR CONDUIT FITTING, then entire disclosure of which is fully incorporated herein by reference.

With reference to FIGS. 25-28 we illustrate another embodiment of a fitting assembly 100-2 that uses a cartridge nut 25-2 arrangement. Most of the parts of the fitting assembly 100-2 may be though need not be the same as the embodiment of FIG. 23, and like parts are given like reference numerals and the description thereof need not be repeated. In the example of FIGS. 25-28, rather than an elastomer or plastic retaining member as part of the retaining structure 40-2, we use a retaining member 102-2 in the form of a thin metal wire-like ring. This retaining ring 102-2 may comprise any suitable metal, including but not limited to stainless steel.

The retaining ring 102-2 preferably is dimensioned so that an interior surface portion 104-2 (FIG. 26, note in FIG. 26 we omit the conduit 18-2 for clarity) will interfere with the first retaining portion 42-2 of the retaining structure 40-2, which in this example the first retaining portion 42-2 may be realized in the form of the outer conical surface 24b-2 of the front ferrule 24-2. The interference between the retaining ring 102-2 and the front ferrule 24-2 may be selected to produce the desired robustness of the connection of the ferrules 24-2, 30-2 in the nut 14-2 as described herein above. Preferably, the retaining ring 102-2 is provided with sufficient radial give or flexibility so that the ferrules may be pushed past the retaining ring 102-2 to assemble the parts as a cartridge 25-2.

A recess or groove 106-2 is provided for locating the retaining ring 102-2 at a desired axial location. When the fitting is in the finger-tight position as illustrated, or when the cartridge 25-2 is assembled as a separate discrete assembly, the retaining ring expands somewhat into the recess 106-2 to be retained therein, such that an outer surface portion 108-2 of the retaining ring may interfere with a portion 110-2 of the recess 106-2 so as to be retained in the recess 106-2 even if the front ferrule 24-2 is knocked against or pushed against the retaining ring 102-2 during handling or shipment.

Figure 27B:
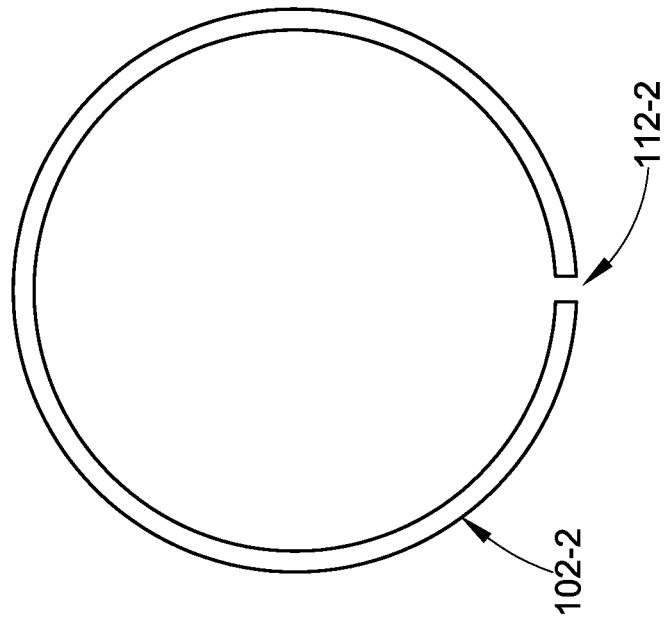
FIGS. 27A and 27B illustrate a plan view of two examples of a retaining ring that may be used in the embodiment of FIG. 25.
Figure 27A:
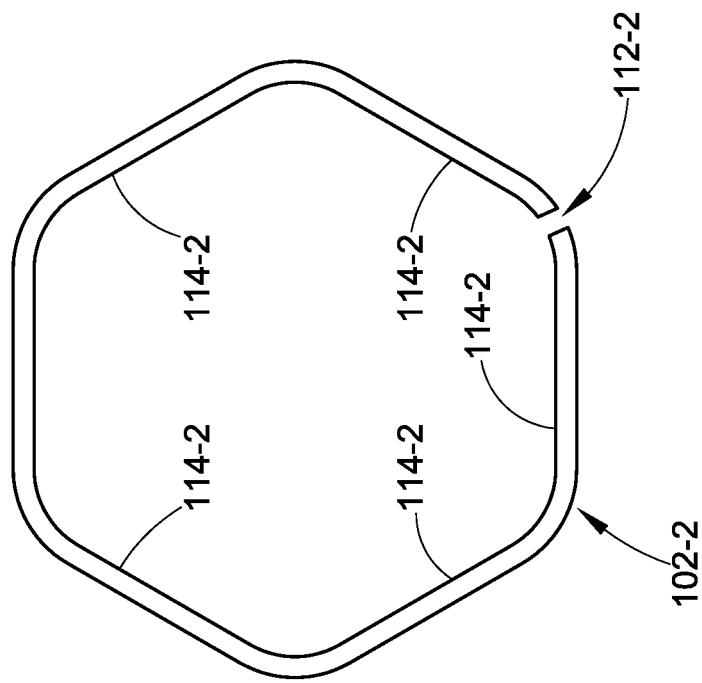

FIGS. 27A and 27B illustrate to examples of a retaining ring 102-2. In both cases the retaining ring 102-2 may be a split ring as at 112-2, but continuous rings may alternatively be used. The split ring concept for metal allows for increased control of the radial flexibility of the ring. The FIG. 27A embodiment may be hexagonal shaped, although other polygonal shapes or non-polygonal shapes may be used as needed, and the FIG. 27B embodiment is a simple circular shape. The hexagonal shape or other non-circular profile may be used to reduce the number of direct contact locations or points 114-2 between the retaining ring 102-2 and the front ferrule 24-2. This may reduce the amount of friction between the ring and the front ferrule during assembly, as well as reducing the friction between these parts during disassembly to facilitate axially backing the nut 14-2 away from the body 12-2. Moreover, a non-circular profile such as illustrated in FIG. 27A facilitates use of a retaining ring 102-2 that may optionally contact the outer diameter of the recess 106-2 at discrete locations to help center the ring 102-2, while at the same time providing a number of direct contact locations for retaining the ferrules.

Figure 28:
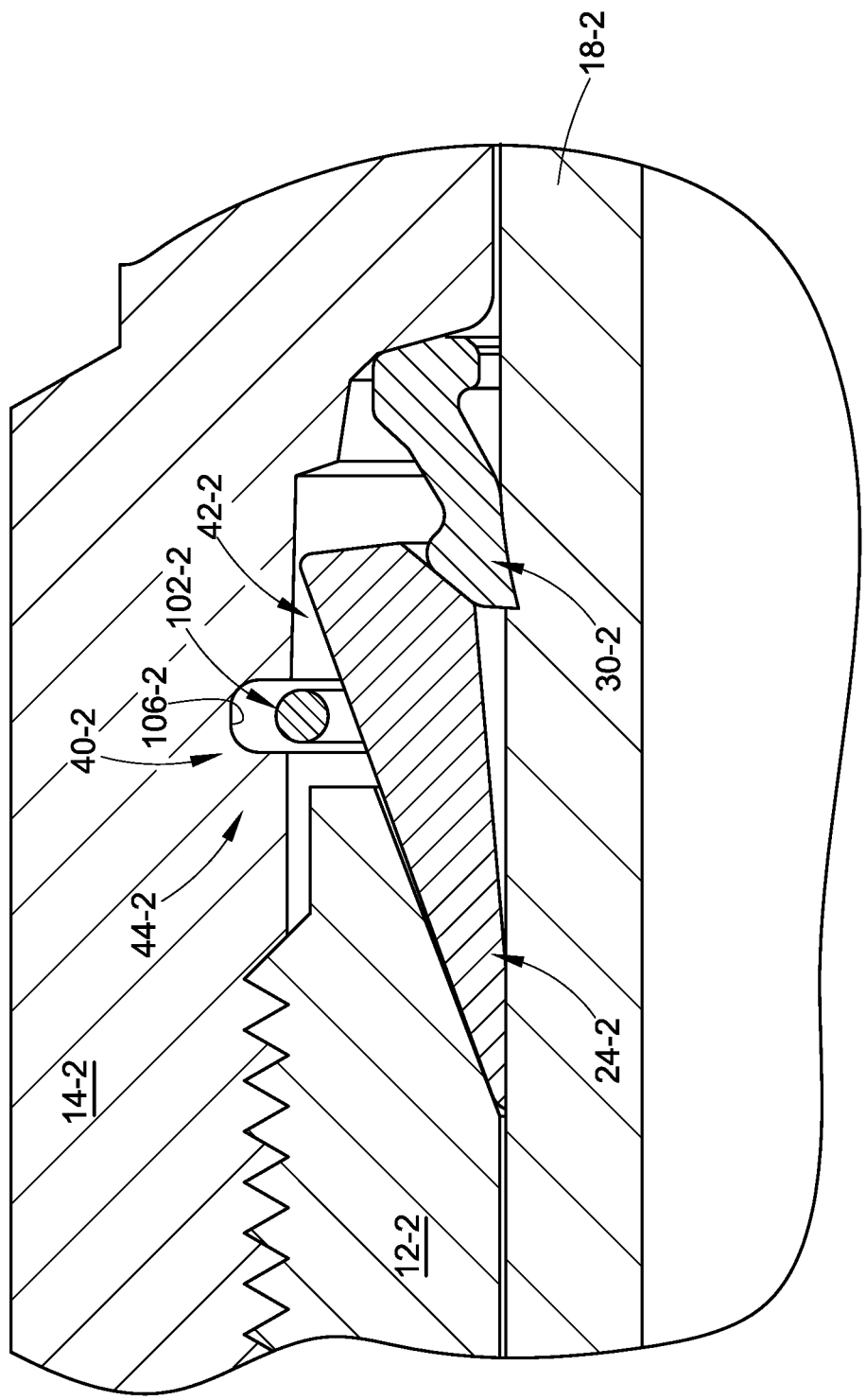
FIG. 28 illustrates the assembly of FIGS. 25 and 26 in a pulled-up position.

FIG. 28 illustrates the fitting in a pull-up position. As with the embodiment of FIG. 25, note that the retaining ring 102-2 does not interfere with operation of the ferrules 24-2, 30-2 during pull-up.

Figure 29:
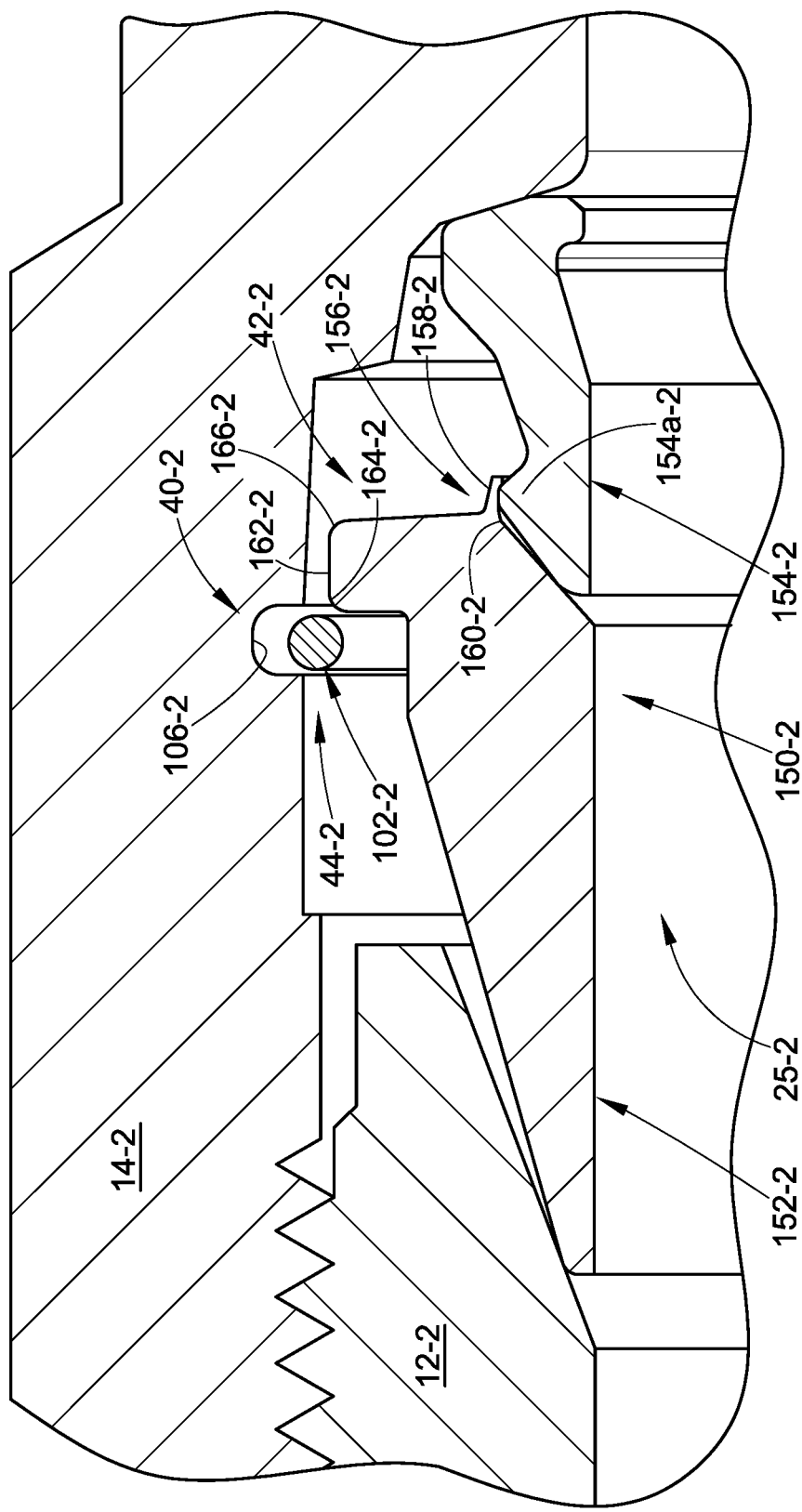
FIG. 29 illustrates another embodiment using a cartridge nut concept as in FIG. 25 in combination with a ferrule cartridge assembly concept.

With reference to FIG. 29, we illustrate an alternative embodiment of a cartridge nut assembly. In this embodiment, the nut 14-2, body 12-2 and retaining structure 40-2 and operation may be but need not be the same as described hereinabove with reference to FIGS. 25-28. Therefore, we use like reference numerals for like parts in the drawings. The notable difference in this embodiment is that we incorporate a ferrule cartridge 150-2 that provides a ferrule set of a front ferrule 152-2 and a back ferrule 154-2 that may be connected together as a discrete subassembly or cartridge before the ferrules are assemble with the retaining nut 14-2. The back ferrule 154-2 may be but need not be the same as the back ferrule 30-2 in the FIGS. 23-28 embodiments. The front ferrule 152-2 may include a retaining structure 156-2 in the form of an extension or tang 158-2 that provides a socket or recess 160-2. The back ferrule front portion 154a-2 may be snapped into this recess 160-2 so as to connect the ferrules together as a ferrule cartridge. The cartridge nut retaining structure 40-2 may operate in the same manner as described hereinabove with respect to FIGS. 23-28.

It will be noted that the front ferrule 152-2 has a different geometry from the front ferrules of the embodiments of FIGS. 23-28 hereinabove. In particular, the front ferrule 152-2 may optionally include a back-end flange 162-2. This flange 162-2 has an outer diameter that allows for an interference between the front ferrule 152-2 and the retaining ring 102-2 so as to hold the ferrules 152-2, 154-2 and the nut 14-2 together as a discontinuous cartridge 25-2. The flange 162-2 may be used to provide inboard and outboard surfaces 164-2, 166-2 that contact the retaining ring 120-2 during assembly and disassembly. In this example, the contacting surfaces 164-2, 166-2 are radii but other geometries may be used as needed. Also as illustrated, the inboard and outboard surfaces 164-2, 166-2 may be identical in shape and also may blend to the same cylindrical outer diameter of the flange 162-2 so that the front ferrule 152-2 can snap through or otherwise move past the retaining ring 120-2 with about equal force, whether the action is an initial assembly, a disassembly or a reassembly for remake. The flange 162-2 also may be axially dimensioned so as to prevent a portion of the front ferrule 152-2 from falling into the recess 106-2.

With reference to FIGS. 30-32 we illustrate another embodiment of a retaining member for providing a discontinuous cartridge assembly. FIG. 30 shows a partial cutaway of a female nut 180-2 that can be assembled with a body (not shown). A ferrule 184-2 is shown retained in the nut 180-2 using a retaining member in the form of a retaining ring 186-2. The ferrule 184-2 may be a single ferrule, the front ferrule of a two ferrule fitting, or a back ferrule of a two ferrule fitting, particularly when a ferrule cartridge concept is also used.

FIGS. 31 and 32 illustrate the retaining ring 186-2 in more detail, and is an alternative configuration to the rings shown in FIGS. 27A and 27B, for example. The ferrule 184-2 shape may be conventional, if so desired, or alternatively any shape that will cooperate with the retaining ring 186-2 to provide a cartridge nut assembly 25-2. The retaining ring 186-2 optionally includes one or more radial outward tabs 188-2 that are received in a groove 190-2 formed in the nut 180-2. The retaining ring 186-2 may be push inserted into the groove 190-2, or the radial outward tabs may be formed so as to allow the retaining ring 186-2 to be threaded into the nut 180-2 via the female threads 192-2 if so desired. Preferably, the radial outer tabs are flexible enough to permit assembly of the retaining ring 186-2 with the nut 180-2 but sufficiently rigid to provide a robust cartridge assembly. We show three radial outward 188-2 evenly spaced about the circumference of the retaining ring body, but more or less tabs may be used with different spacing if so required. In an exemplary embodiment, each tab 188-2 may subtend about ten degrees arc although other sizes may be used as needed. The retaining ring may comprise any suitable material, including but not limited to a robust plastic or metal such as stainless steel, but may also be an elastomer or softer polymer. The retaining ring 186-2 may be formed rather thin, perhaps only ten thousandths for example, particularly if the ring is made of a fairly stiff material. The material and geometry of the retaining ring will be selected based in part on the desired robustness needed for the cartridge application.

The retaining ring 186-2 further is provided with one or more optional radial inward tabs 194-2 that engage or interfere with the ferrule 184-2 when the ferrule 184-2 is inserted through the retaining ring 186-2. The ferrule 184-2 may include a flange (such as in the embodiment of FIG. 29 herein) or enlarged back end (such as the embodiment of FIG. 23 herein) that snaps through the retaining ring 186-2. The radial inward tabs 194-2 then will prevent the ferrule or ferrules from falling out of the cartridge assembly 25-2. During pull-up the retaining ring 186-2 travels with the nut 180-2. Since the nut 180-2 travels axially further than the ferrule 184-2 during pull-up, the retaining ring 186-2 will not interfere with the function of the ferrule. In this embodiment, it is contemplated that upon disassembly the retaining ring will remain with the nut 180-2 so as to reengage with the ferrule 184-2 (or a replacement ferrule as the case may be) for remakes. Since the ferrule 184-2 typically will be compressed against the conduit after a pull-up, having the retaining ring 186-2 remain with the nut 180-2 allows the nut 180-2 to be axially withdrawn or pulled back from the body.

When the ferrule 184-2 is a front ferrule of a two ferrule fitting, the front ferrule will also retain the back ferrule in the cartridge assembly. Alternatively, however, even with the ferrule 184-2 being a front ferrule, the ferrule cartridge concept described hereinabove may also be used.

In the exemplary embodiments of FIGS. 33-42 (wherein the -3 designator is used to group various alternative embodiments as well as to designate like components of other embodiments herein as well as distinguishing alternative, different or additional components described with this grouping), the front ferrule 24-3 may be conventional in design, if so desired, so that the first retaining portion 42-3 may simply be realized in the form of the outer tapered surface 24a-3 of the front ferrule 24-3. Alternatively, the front ferrule may be modified to include a structure or feature (not shown) that will interact with the second retaining portion 44-3, but for the exemplary embodiments such structure is not needed. In any case, the front ferrule 24-3 will coact with the second retaining portion 44-3 so as to retain the ferrule or ferrule set together with the nut 14-3 as a discrete and discontinuous subassembly 25-3.

The second retaining portion 44-3 may be realized in the form of a retaining member 46-3. The retaining member 46-3 may be any generally annular or ring-like structure or partial ring-like structure that extends or protrudes generally radially inward to a distance by which a distal portion 46a-3 of the retaining member will prevent or inhibit the ferrules 24-3, 30-3 from falling out of the retaining fitting component 14-3. However, alternatively the retaining member 46-3 may protrude inwardly other than just radially. A distal portion 46a-3 may also alternatively have a rounded, curved or sloped contour or other shape so as to not scratch or dig into the front ferrule. Although the retaining member 46-3 illustrated herein has a rectangular cross-section and extended axial length, the retaining member 46-3 may alternatively have a round or other cross-sectional shape with a narrow diameter or axial dimension, such as a wire, for example.

The retaining member 46-3 may have a retaining position and a release or disengage position. In the retaining position the conduit gripping devices and the retaining fitting component form the discontinuous cartridge 25-3. In the release position, the retaining fitting component is separable from the conduit gripping devices. Preferably, the retaining member is in the release position after a partial or complete pull-up but not in a finger-tight position. For example, the retaining member 46-3 may be a structure that is movable relative to the retaining component so as to have a first axial position at which the retaining member 46-3 interferes with the retaining conduit gripping device (the front ferrule 24-3 in the embodiment of FIGS. 33-35), and a second axial position at which the retaining member 46-3 does not adversely interfere with the retaining conduit gripping device.

By "adversely interfere" is meant that the retaining member no longer significantly resists separation of the retaining fitting component and the one or more conduit gripping devices, and also does not present an obstruction or otherwise affect operation of the conduit gripping devices during pull up, or with remakes. But, the retaining member may, but does not have to, contact or engage the retaining fitting component in the release position. The designer may determine the degree of resistance or interference, if any, that the retaining member presents to separation of the retaining fitting component from the fitting assembly after a complete or partial pull-up. This feature of a second position in which the retaining member 46-3 does not adversely interfere with the retaining conduit gripping device may optionally also be utilized in other of the embodiments described herein.

In other embodiments, the retaining member 46-3 may also exhibit a first radial position and a second radial position at the first and second axial positions respectively. For example, the innermost radial dimension of the retaining member 46-3 at the second axial position may be sufficiently greater than the innermost radial dimension at the first axial position so as not to adversely interfere with the retaining conduit gripping device. In still other embodiments, the retaining member 46-3 may have first and second radial positions at a single axial position.

Figure 34:
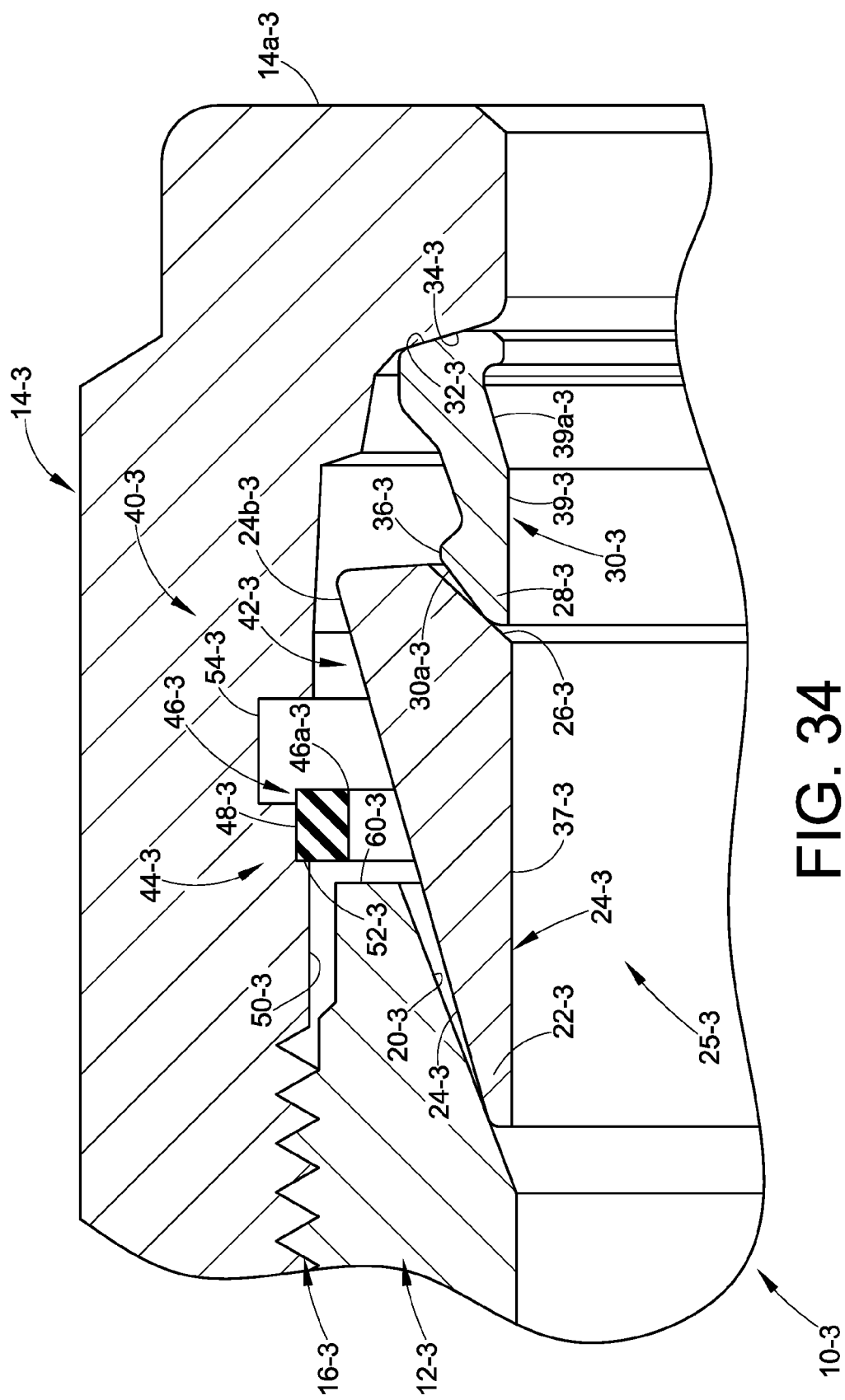
FIG. 34 is an enlarged view of the circled region A in FIG. 33.
Figure 35:
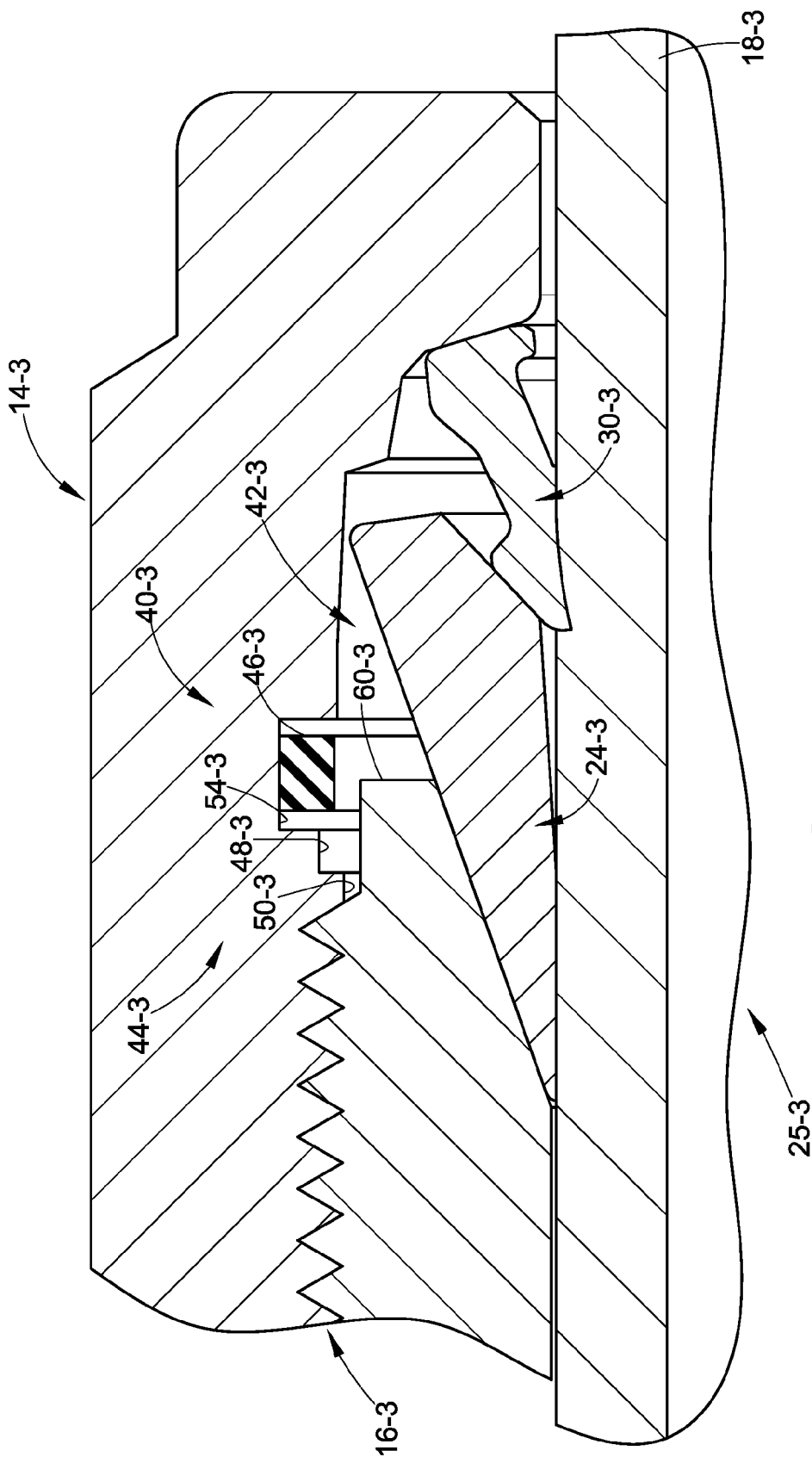
FIG. 35 illustrates the embodiment of FIG. 34 with the fitting components in an assembled position of a partial or complete pull-up.

With reference to FIGS. 33-35 herein, the retaining position, for example, a first axial position and/or a first radial position, may be used for the stand alone cartridge 25-3, and the retaining member 46-3 may remain in the retaining position (axially, radially or both) when the fitting assembly 10-3 is in the finger tight position illustrated in FIG. 33. As a result of, for example, a partial pull-up, the retaining member 46-3 assumes a second axial position. In other words, during a partial or complete pull-up the retaining member 46-3 may shift axially, radially or both relative to the retaining fitting component to the release or disengage position. In this exemplary embodiment, the retaining member 46-3 moves axially and radially relative to the retaining fitting component to the release or disengage position of FIG. 35, as understood in comparing FIG. 35 with the retaining position of FIG. 33.

In the exemplary embodiment of FIGS. 33-35, the retaining member 46-3 may be realized in the form of a snap ring or other ring like member that preferably exhibits a radial outward force or bias against an interior surface of the nut 14-3 in the retaining position. The ring may be continuous or split and need not be round or of any particular shape.

The retaining member 46-3 may be made of any suitable material, including elastomer, plastic and metal and preferably sturdy enough to retain the ferrules with the nut 14-3 as a cartridge 25-3. Use of a metal retaining member 46-3 allows for all metal fitting assemblies for high temperature applications or use with fluids that may damage an elastomer or plastic. Suitable metals may include but are not limited to stainless steel, brass, copper, steel and so on to name just a few of the many available materials.

The retaining fitting component or nut 14-3 may have a first recess or pocket 48-3 formed in an interior surface of the nut 14-3 that receives the retaining member 46-3 and axially locates the retaining position. The first recess 48-3 may be formed in the interior cylindrical wall 50-3 of the nut 14-3. After the ferrule set 24-3, 30-3 has been inserted into the nut 14-3, the retaining member 46-3 is inserted so as to snap into the first radial recess 48-3. The radial depth of the first recess 48-3 along with the dimensions of the retaining member 46-3 may be selected so that the retaining member 46-3 interferes with and inhibits the ferrule set (ferrules 24-3, 30-3) from falling out of the nut 14-3. The outward spring bias of the retaining member 46-3 along with an optional backing shoulder 52-3 may be used to help keep the retaining member 46-3 in the first recess 48-3.

The retaining fitting component or nut 14-3 may also include a second recess 54-3 that is located at an axial position that is different than the axial position of the first radial recess 48-3. The second recess 54-3 axially locates the release or disengage position and may be formed in an interior surface of the nut 14-3. The second recess 54-3 may be axially adjacent the first radial recess 48-3 as in FIGS. 33-35, or may be further axially spaced therefrom as needed. The second recess 54-3 preferably, although not necessarily, has a greater radial dimension than the first radial recess 48-3 so that when the retaining member 46-3 moves into the second radial recess 54-3, it expands radially outwardly as shown in FIG. 35. The second radial recess 54-3 thus axially locates the release position. The radial depth of the second radial recess 54-3 may be chosen so that when the retaining member 46-3 is located therein, the retaining member no longer adversely interferes with the conduit gripping devices 24-3, 30-3.

FIGS. 33 and 34 show the subassembly 25-3 after it has been joined to the second or mating fitting component 12-3 to a finger tight position. In this position, the retaining member 46-3 is axially forward (inboard) of a portion 24b-3 of the front ferrule 24-3 that is radially larger than the innermost radial dimension of the distal portion 46a-3. With reference to FIG. 35, we show the body 12-3, the conduit gripping devices 24-3, 30-3, and the retaining fitting component or nut 14-3 after they have been tightened together during pull-up. In this example, we illustrate the parts tightened together after a complete pull-up. The body 12-3 includes an axially outboard end 60-3 that will engage the retaining member 46-3 after some predetermined axial displacement of the nut 14-3 relative to the body 12-3. Further tightening of the nut onto the body causes the outboard end 60-3 to push against the retaining member 46-3, and in this embodiment, push or displace the retaining member 46-3 axially relative to the nut 14-3 towards and into the second radial recess 54-3 of the nut 14-3. In this release position, the retaining member 46-3 will no longer adversely interfere with the retaining front ferrule 24-3, thus allowing, if so desired, for the nut 14-3 to be axially backed away from the body 12-3 even if the ferrules 24-3, 30-3 remain attached to the conduit 18-3.

Typically, fittings are pulled-up by holding the body 12-3 rotationally fixed and using a wrench to rotate the nut 14-3 relative to the body 12-3. This causes an axially advance of the nut onto the body. But this relative axial advance of the nut and body together may also be effected by holding the nut and rotating the body or rotating both the nut and the body. Therefore, for purposes of this disclosure we consider the "movement" of the retaining member from the retaining position to the release position as being a relative movement between the retaining member 46 and the nut 14-3. This can be viewed as the body end 60-3 "pushing" on the retaining member 46-3, or simply abutting the retaining member 46-3 as the nut advances. Regardless of how the nut and body are tightened together, the retaining member 46-3 will exhibit an axial and/or radial displacement relative to the retaining fitting component so as to "move" from the retaining position to the release position.

The axial position of the second recess 54-3 may be used to determine at what point during a pull-up procedure the retaining member 46-3 disengages from the front ferrule 24-3. In other words, the axial position of the second recess may be selected so as to allow the retaining member 46-3 to disengage during a partial pull-up or closer to completion of a completed pull-up. The retaining member may also release after a pre-swaging operation.

Axial movement of the nut 14-3 relative to the body 12-3 causes the ferrules to deform and grip the conduit 18-3 in a known manner. The retaining structure 40-3 preferably is designed so as to not interfere with normal operation and pull-up of the conduit gripping devices onto the conduit to effect grip and seal, or with remakes of the fitting.

The axial dimension of the first radial recess 48-3 may be chosen in concert with the amount of relative axial displacement of the nut 14-3 and the body 12-3 to determine at what point during pull-up the retaining member 46-3 is transposed to the release position by being moved into the second radial recess 54-3. For example, it may be desired in some embodiments to have the retaining member 46-3 be displaced to the release position prior to completion of a pull-up operation. For example, it may be desired to have the retaining member release after a partial pull-up or after a pre-swage operation.

Accordingly, one or more of the present inventions facilitates a mechanism or structure and method by which one or more ferrules or conduit gripping devices may be retained with a fitting component as a discontinuous cartridge 25-3, with the retaining structure then being axially moved, radially moved or both during pull-up (either a complete pull-up or a partial pull-up as needed) so that the retaining structure is released from the conduit gripping devices to allow the nut 14-3 to be subsequently axially withdrawn or pulled back from the body 12-3.

For embodiments that use a retaining member 46-3 in the form of a compressed ring, it will be appreciated that in many uses the ring may likely be highly compressed while in the cartridge subassembly as well as in the finger-tight position. This compression may be used to assure a robust subassembly that does not come apart too easily (as determined by the designer) during handling and shipping. It can therefore be expected that when the retaining member shifts into the release position, that the retaining member 46-3 may snap out into the second recess 54-3 with sufficient impact as to produce an audible "click". This audible feedback may alert the assembler directly that the retaining member has released, or sensors may be used (such as, for example, recorders, transmitters and light indicators) to indicate sufficient pull-up to the release position.

Use of the discontinuous cartridge 25-3 facilitates providing ferrule sets to the end user in which the ferrules and nuts are properly matched at the manufacturer. This can significantly simplify inventory control and reduce final assembly time. The embodiments herein also allow for a cartridge design in which the retaining fitting component may be used for fitting assemblies that do not need or have the retaining member 46-3. In other words, the cartridge designs herein use a nut or retaining fitting component that is backwards compatible with fitting assemblies that the end user may not require with a retaining structure. The cartridge design also may be realized using ferrule sets that do not require modification. Therefore, the cartridge concepts herein may be optionally provided for an end user without having to manufacture nuts or ferrules with different geometry and operation or performance. This allows the convenience of manufacturing and selling fitting components and ferrules as separate parts regardless of the end use of such individual parts, either for a cartridge use or a non-cartridge use.

In an exemplary method, one or more conduit gripping devices are retained with a retaining fitting component as a discontinuous cartridge. This discontinuous cartridge forms a first part of a two part fitting assembly. The cartridge is then joined with the second part of the fitting assembly and a portion of a conduit. During at least a partial pull-up of the fitting assembly, the conduit gripping devices become attached to the conduit and become disengaged from the retaining structure of the retaining fitting component so that the retaining fitting component may be removed from the fitting assembly after the partial or complete pull-up while the one or more conduit gripping devices remain attached to the conduit. In a more specific embodiment, the method may include the steps of retaining one or more conduit gripping devices with a retaining fitting component as a discontinuous cartridge, joining the cartridge to a second fitting component on a conduit to cause the conduit gripping devices to attach to the conduit, and disengaging the retaining fitting component from the conduit gripping devices so that the retaining fitting component may be removed from the fitting assembly after a partial pull-up while the one or more conduit gripping devices remain attached to the conduit. In still a more specific embodiment, the conduit gripping devices may be retained in the retaining fitting component to form the cartridge by a retaining member having a retaining position and a release position. In the release position, the retaining member does not interfere with axial displacement of the retaining fitting component after a complete or alternatively partial pull-up.

Figure 36:
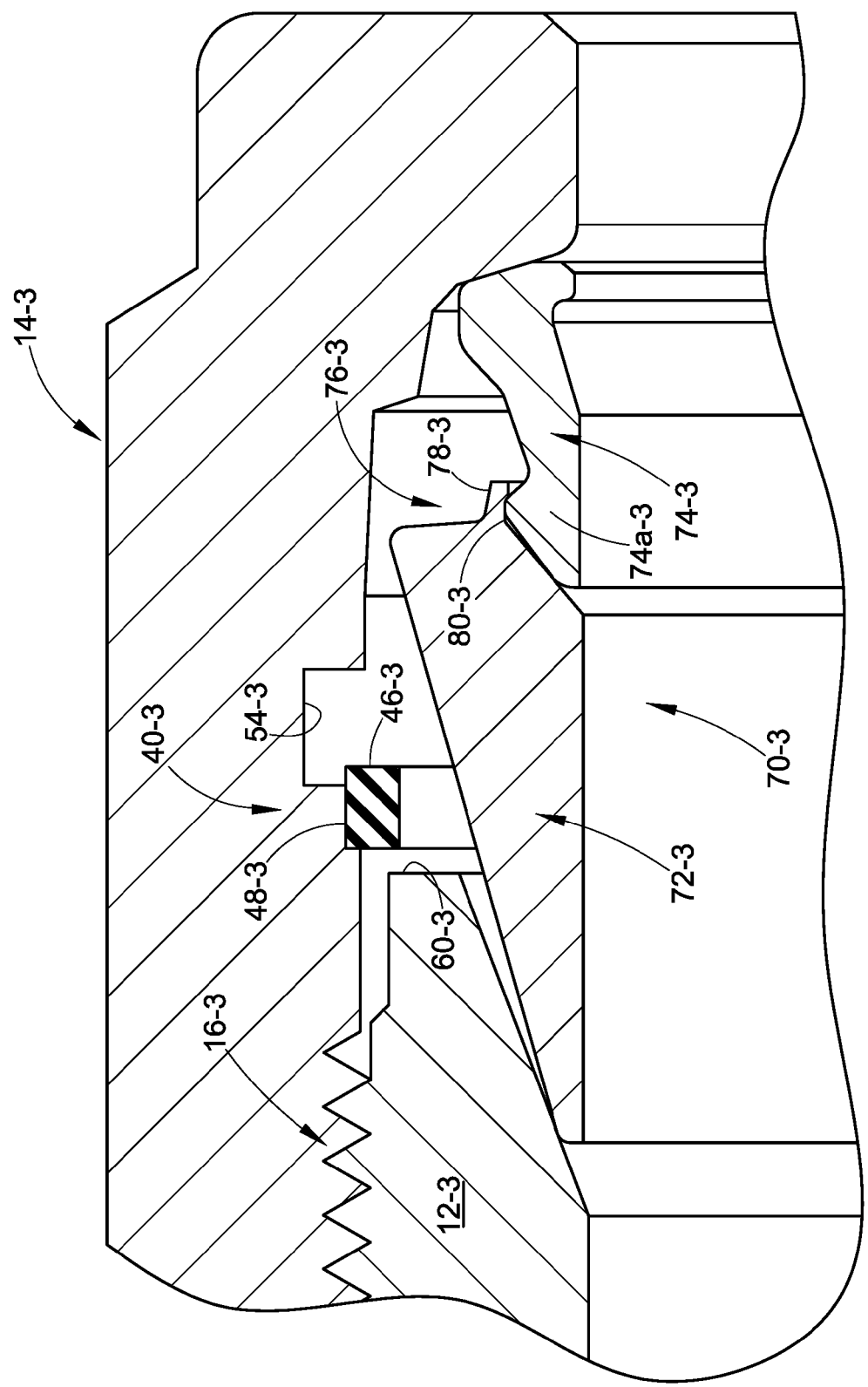
FIG. 36 illustrates another embodiment of a conduit fitting cartridge using a ferrule cartridge arrangement, shown in half-longitudinal cross-section and in a finger-tight position.
Figure 37:
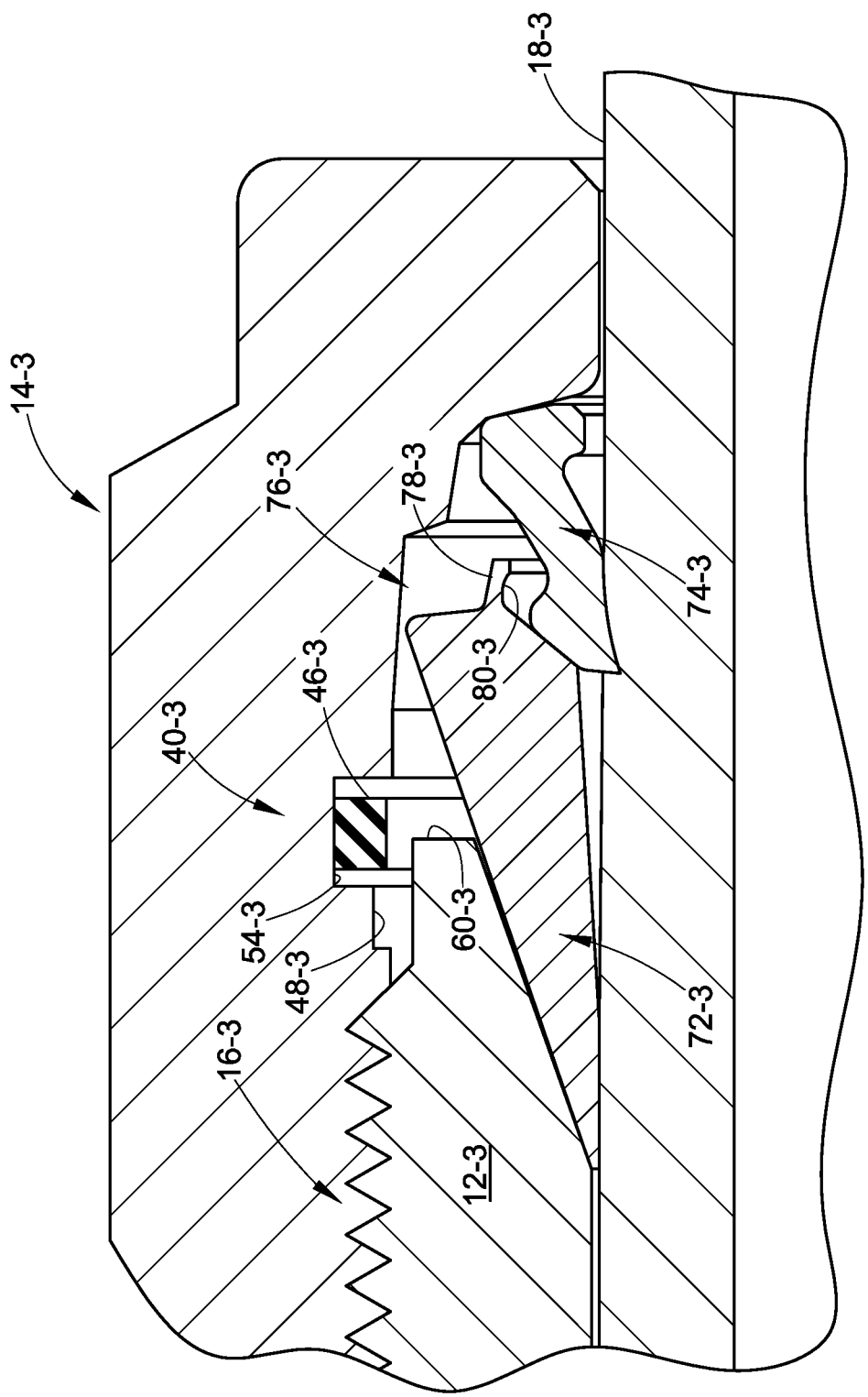
FIG. 37 illustrates the embodiment of FIG. 36 in a pulled-up position.

With reference to FIGS. 36 and 37, we illustrate an alternative embodiment of a cartridge nut assembly. In this embodiment, the nut 14-3, body 12-3 and retaining structure 40-3 and operation may be but need not be the same as described hereinabove with reference to FIGS. 33-35. Therefore, we use like reference numerals for like parts in the drawings. The notable difference in this embodiment is that we incorporate a ferrule cartridge 70-3 that provides a ferrule set of a front ferrule 72-3 and a back ferrule 74-3 that may be connected together as a discrete subassembly or cartridge before the ferrules are assemble with the retaining nut 14-3. The back ferrule 74-3 may be but need not be the same as the back ferrule 30-3 in the FIGS. 33-35 embodiment. The front ferrule 72-3 may include a retaining structure 76-3 in the form of an extension or tang 78-3 that provides a socket or recess 80-3. The back ferrule front portion 74a-3 may be snapped into this recess 80-3 so as to connect the ferrules together as a ferrule cartridge. Note from the pulled-up position in FIG. 37, the ferrule cartridge retaining structure has released the front and back ferrules. The cartridge nut retaining structure 40-3 has operated in the same manner as described hereinabove with respect to FIGS. 33-35. The ferrule cartridge design is fully described in pending United States patent application serial no. PCT/US2009/67508 filed on Dec. 10, 2009 for FERRULE ASSEMBLY FOR CONDUIT FITTING, noted above.

Figure 38:
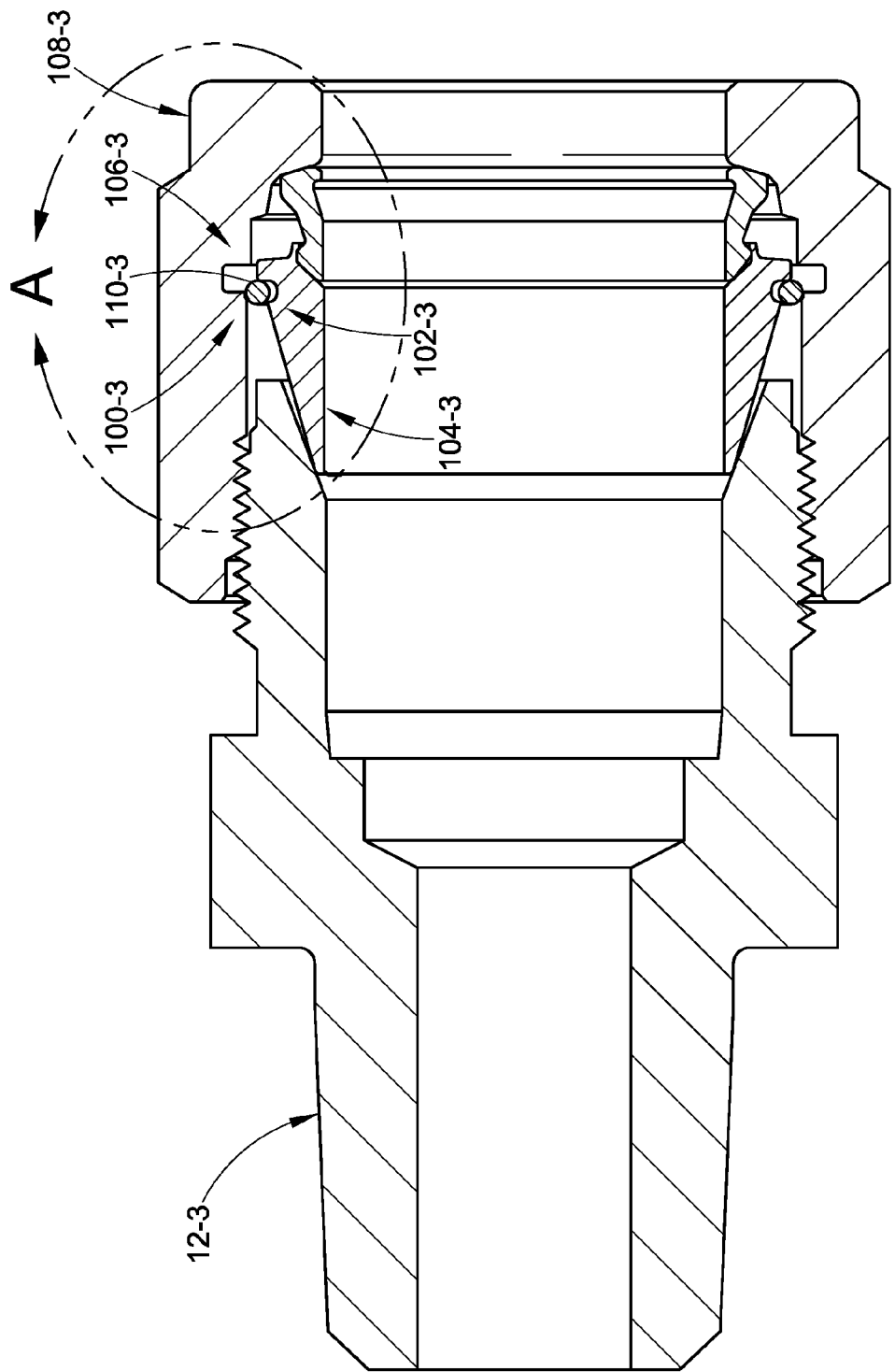
FIG. 38 illustrates another embodiment of a cartridge nut concept in the finger-tight position and shown in longitudinal cross-section.
Figure 39:
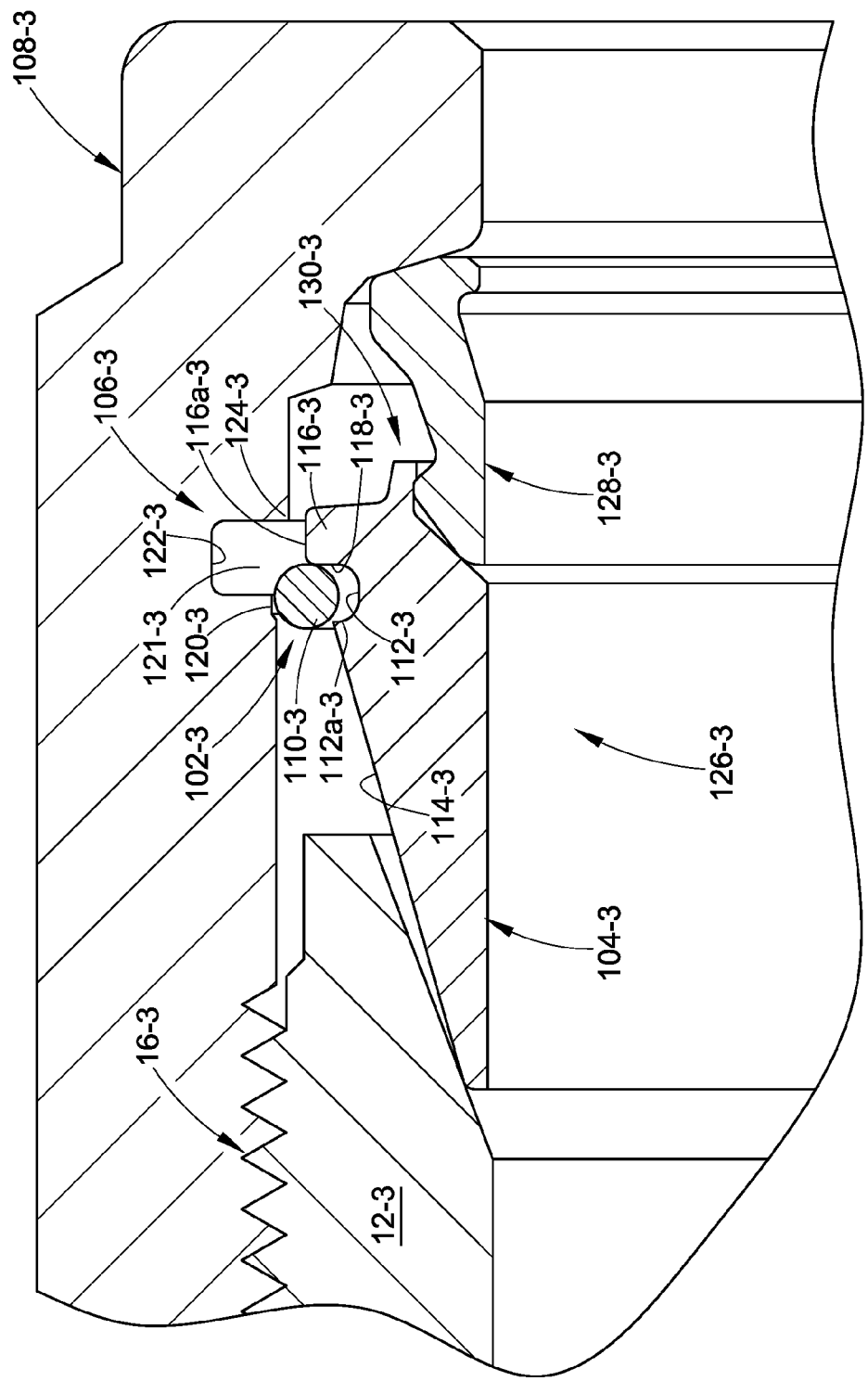
FIG. 39 is an enlarged view of the circled region of FIG. 38.

With reference to FIGS. 38 and 39, in an alternative embodiment, we use the retaining conduit gripping device, in this example the front ferrule, to help position and hold the retaining member relative to the retaining fitting component during pull-up. More specifically, the front ferrule may be used to control the axial position of the retaining member during pull-up by having structure that causes the retaining member to be axially fixed with the front ferrule at least to the point of the second axial position (the release position). This avoids having to establish contact between the mating fitting component and the retaining member in order for the retaining member to move to the release position, and utilizes the observation that the nut advances axially onto the body faster than the front ferrule axially advances relative to the body.

Accordingly, a retaining structure 100-3 may be provided having a first retaining portion 102-3 associated with the retaining conduit gripping device 104-3, in this case the front ferrule, and a second retaining portion 106-3 associated with the retaining fitting component 108-3, in this case the female threaded nut. A retaining member 110-3 is provided in the form of an annular device such as a ring or wire made of suitable material to provide a robust retention of the ferrule or ferrule set in the nut as a cartridge or subassembly. In the preferred embodiment, the retaining member comprises a rather stiff metal spring ring or wire that will have sufficient hoop strength to retain the ferrule or ferrule set with the nut as a cartridge.

Referring to FIG. 39 (FIG. 39 illustrates the cartridge nut arrangement assembled with the body 12-3 in a finger-tight position), the retaining structure 100-3 may be realized in the form of a first groove or recess 112-3 formed in the tapered outer wall 114-3 of the front ferrule 104-3. This first recess 112-3 receives an inner portion of the retaining member 110-3, and presents a radial flange 116-3 at the rearward portion of the front ferrule 114-3 having a wall portion 118-3 that preferably contacts the retaining member 110-3 when the retaining member 110-3 is in the retaining position (such as illustrated in FIG. 39).

The retaining fitting component 108-3, in this case the female threaded nut, includes a second recess 120-3 formed in an interior surface of the nut, which in some embodiments may function similar to a detent mechanism. The second recess 120-3 axially locates the retaining position for the retaining member 110-3. During assembly, the retaining member 110-3 may be held radially compressed in the first recess 112-3 until the ferrules are in position within the nut 108-3. The retaining member 110-3 is then partially released to expand and engage the second recess 120-3. This is the retaining position illustrated in FIG. 39. The second recess 120-3 may be used to help keep the retaining member 110-3 in the retaining position during normal handling so that the retaining member 110-3 does not pop out of the front ferrule recess 112-3 and release from the front ferrule 104-3. When the ferrule or ferrule set is installed in the nut as a cartridge, as well as when the fitting is in a finger-tight position, the first recess 112-3 is preferably generally axially aligned with the second recess 120-3 so that the retaining member is held in compression with strong hoop strength as needed to hold the ferrules with the nut.

Figure 40:
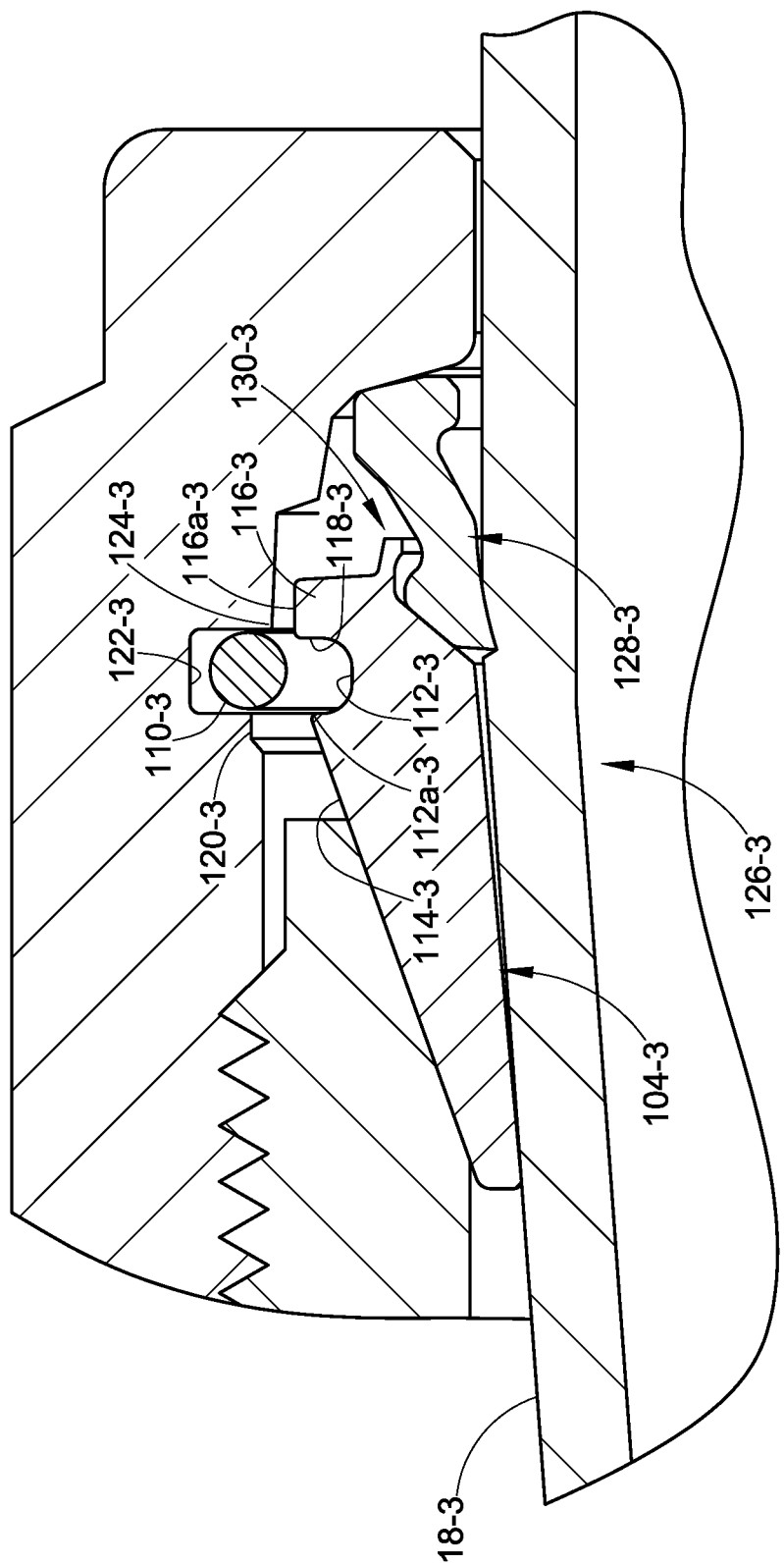
FIG. 40 illustrates the embodiment of FIGS. 38 and 39 in a pulled-up condition.

The retaining fitting component 108-3 includes a third recess 122-3. This third recess 122-3 is located at an axial position that is different than the axial position of the second radial recess 120-3. The third recess 122-3 axially locates the release or disengage position and may be formed in an interior surface of the nut 108-3. The third recess 122-3 may be axially adjacent the second recess 120-3 as in FIG. 39, or may be further axially spaced therefrom as needed. The third recess 122-3 preferably, although not necessarily, has a sufficiently greater radial dimension than the second recess 120-3 so that when the retaining member 110-3 moves into the third recess 122-3, it expands radially outwardly as shown in FIG. 40. The third recess 122-3 thus axially locates the release position. The radial depth of the third recess 122-3 may be chosen so that when the retaining member 110-3 is located therein, the retaining member no longer adversely interferes with the conduit gripping devices.

By comparing FIGS. 39 and 40, during a partial or complete pull-up, the nut 108-3 advances axially further for each relative turn of the nut and body than does the front ferrule 104-3. As the nut 108-3 axially advances relative to the body 12-3, the retaining member 110-3 is axially positioned with the front ferrule. When the first recess 112-3 becomes axially aligned with the third recess 122-3, the retaining member will snap or otherwise move into the third recess 122-3 as the flange 116-3 moves past the transition region 124-3 between the second and third recesses 120-3, 122-3. As the flange 116-3 begins to move past the transition region 124-3, a gap or opening 121-3 forms between the front ferrule 104-3 and the interior surfaces of the nut 108-3. Once this gap 121-3 becomes large enough, the retaining member 110-3 moves into the third recess 122-3. A wall portion 112a-3 of the first recess 112-3 may be used to move the retaining member 110-3 into the third recess 122-3. Since the retaining member 110-3 goes to a lower energy condition (less hoop stress) in the third recess 122-3, the retaining member will also tend to snap into the third recess. Note that because of this transition of higher energy to lower energy of the retaining member between the first and second axial positions, the flange 116-3 helps to prevent the retaining member from moving into the thirds recess 122-3 too soon, because the flange 116-3 at least partially blocks or obstructs the third recess 122-3.

Once the retaining member 110-3 is positioned at the release position, the retaining member 110-3 no longer adversely interferes with the retaining conduit gripping member 104-3. The facing wall 118-3 may help to maintain the stability of the retaining member 110-3 during pull-up as the nut 108-3 axially advances relative to the retaining member 110-3. The radial flange 116-3 may also be used to present a surface 116a-3 that sufficiently blocks the third recess 122-3 until such partial or complete pull-up as desired to allow the retaining member 110-3 to move into the third recess 122-3. This may be used to prevent the retaining member 110-3 from accidentally releasing into the third recess 122-3 during normal handling of the cartridge assembly or when the cartridge is assembled with the body 12-3 in the finger-tight position. Thus, the front ferrule 104-3 may be thought of in terms of being keyed to the retaining fitting component 108-3 in the sense that the relative axial position of the ferrule 104-3 with the nut 108-3 will determine when the retaining member 110-3 axially shifts to the release or second axial position.

By appropriate sizing and location of the first recess 112-3, the front ferrule 104-3 may be used in a fitting that utilizes the retaining feature, or a fitting that does not use the retaining feature, since the ferrule will still perform as needed in a non-cartridge design.

Note that in the embodiment of FIGS. 38-40 we illustrate the ferrule set as a ferrule cartridge assembly 126-3 utilizing the front ferrule 104-3 and a back ferrule 128-3, held together with a retaining structure 130-3. This use of the ferrule cartridge is optional as in the above embodiments herein, and may be but need not be, similar in design to the ferrule cartridge 70-3 (FIG. 36) and the ferrule cartridge concepts disclosed in the above-referenced pending patent application.

Figure 41:
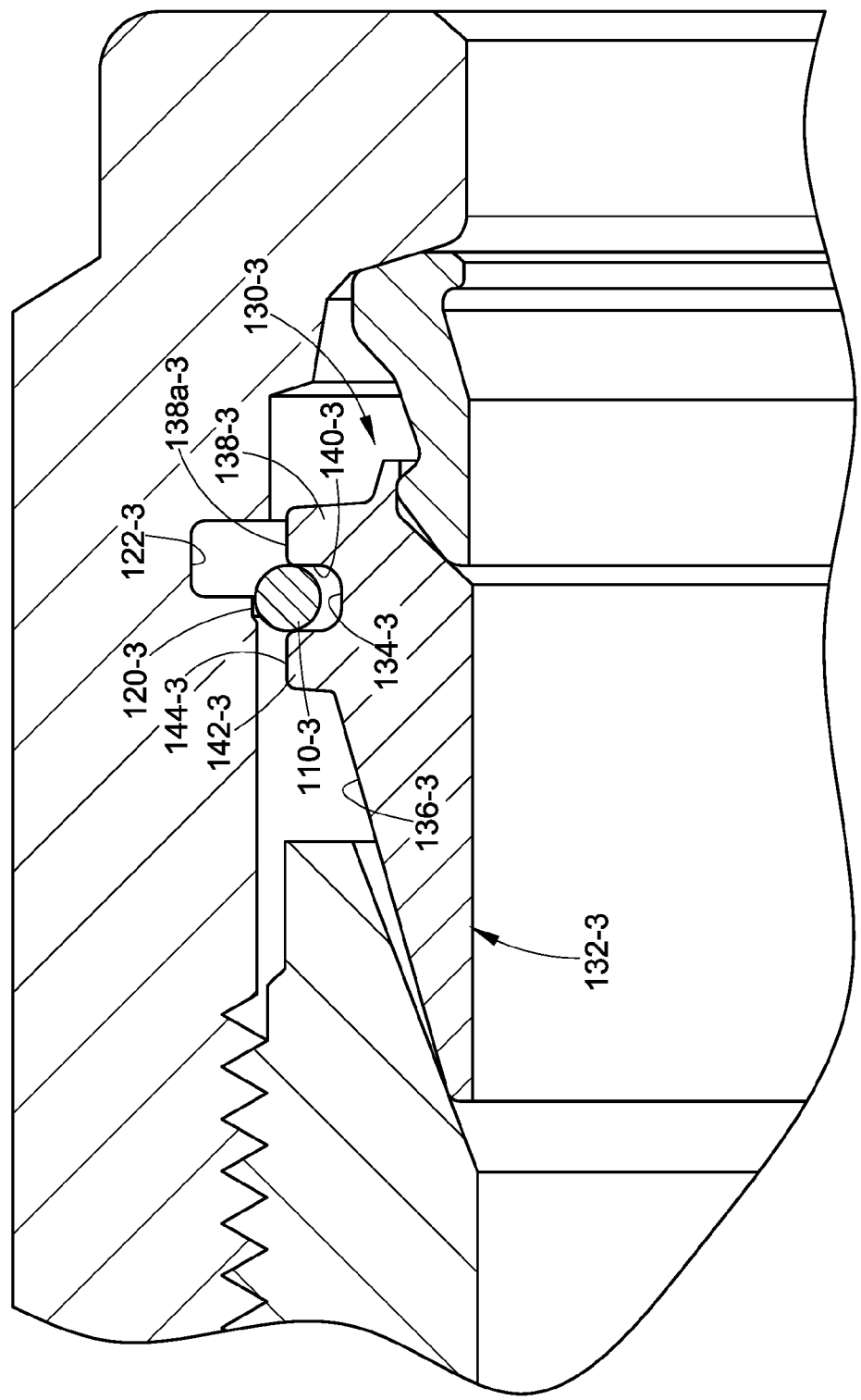
FIG. 41 illustrates another embodiment of a cartridge nut concept in the finger-tight position and shown in longitudinal cross-section.
Figure 42:
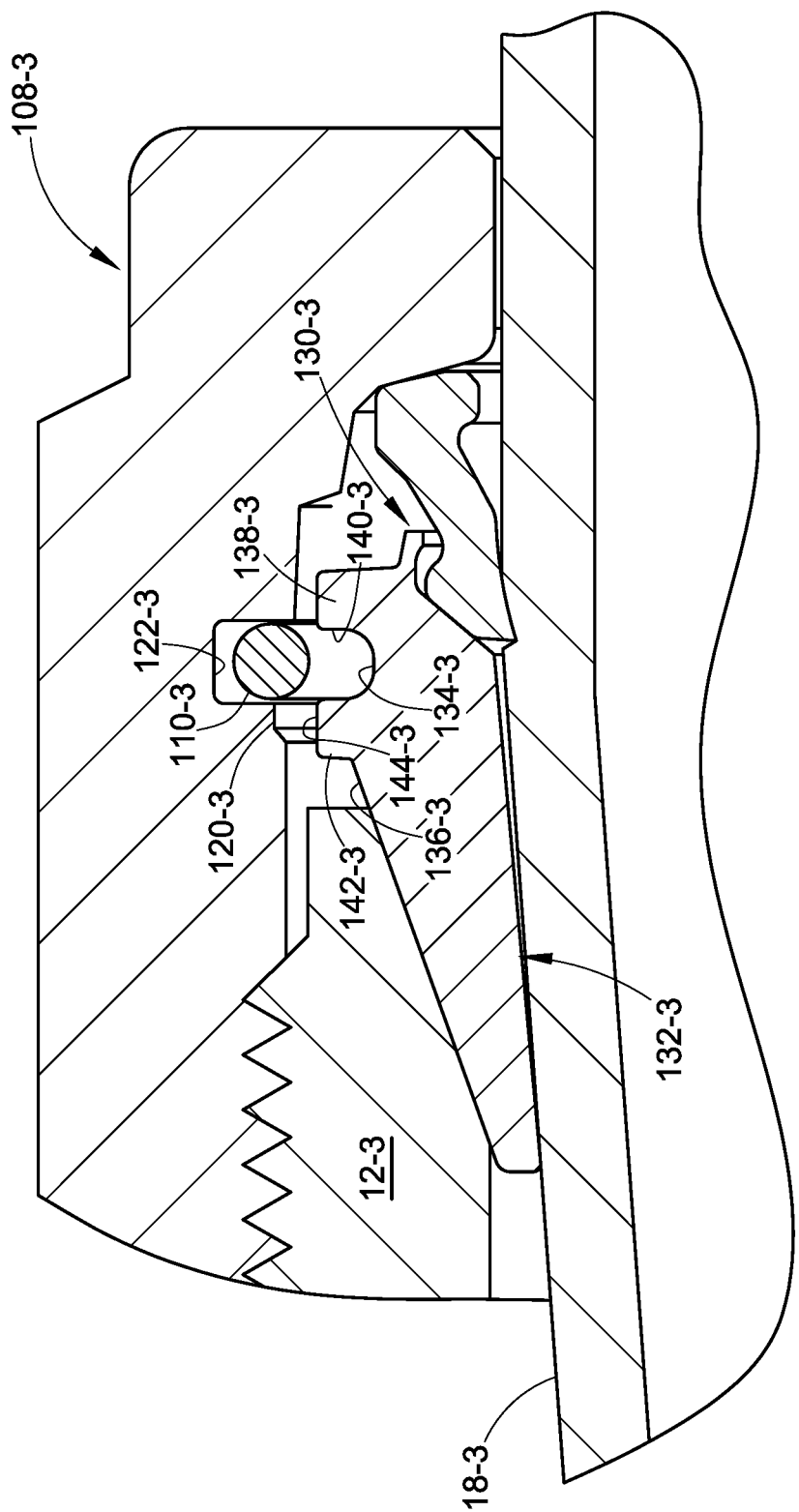
FIG. 42 illustrates the embodiment of FIG. 41 in a pulled-up condition.

With reference to FIGS. 41 and 42 we illustrate another embodiment. In this embodiment, the retaining fitting component 108-3 may be but need not be similar to the nut 108-3 of the FIGS. 38-40 embodiment, the retaining member 110-3 may be but need not be the same as well, and the same reference numerals are used for like features. The notable difference between this embodiment and the embodiment of FIGS. 38-40 is the front ferrule 132-3. In this design, the front ferrule 132-3 includes a first recess 134-3 in the outer wall 136-3 of the ferrule. This provides a first radial flange 138-3 having a wall portion 140-3 that preferably can contact the retaining member 110-3 when the retaining member 110-3 is in the retaining position. This first radial flange 138-3 presents a surface 138*a*-3 that also may be used to sufficiently block the third recess 122-3 so as to prevent the retaining member 110-3 from moving into the third recess 122-3 during normal handling of the cartridge assembly or in the finger-tight position of the fitting assembly. Moreover, a second radial flange 142-3 may be further provided on the inboard side of the first recess 134-3. This second radial flange 142-3 provides an axially lengthened major diameter on the front ferrule 132-3, thus providing more material for the front ferrule as compared to the embodiment of FIGS. 38-40. This added material assures no loss of tensile hoop spring load when the front ferrule and fitting have been completely pulled up. The lengthened major diameter also presents a surface 144-3 that bridges or otherwise at least partially obstructs the second recess 120-3 upon complete pull-up to prevent the front ferrule 132-3 from adversely engaging the second recess 120-3 during subsequent remakes and reassembly.

As with the embodiment of FIGS. 38-40, the embodiment of FIGS. 41-42 illustrate optional use of the ferrule cartridge configuration.

In the exemplary embodiments of FIGS. 43-49 (wherein the -4 designator is used to group various alternative embodiments as well as to designate like components of other embodiments herein as well as distinguishing alternative, different or additional components described with this grouping), the retaining structure 40-4 may be realized in many different ways, but in general may include a first retaining portion 42-4 that may be associated with at least one of the conduit gripping devices, and a second retaining portion 44-4 that may be associated with the fitting component being used to form the subassembly 25-4. In the present disclosure we show embodiments of two concepts, a first concept in which the second retaining portion 44-4 is a discrete separate part that is attachable or connectable with the retaining fitting component, and a second concept in which the second retaining portion 44-4 is integral with the retaining fitting component.

In the case of two or more conduit gripping devices or a ferrule set, the embodiments of a cartridge nut herein derive additional benefit for fitting assembly processes when used in combination with a ferrule cartridge concept, because the cartridge nut concepts herein relate to a retaining structure for holding the back or outboard ferrule to the retaining fitting component. In alternative embodiments, however, it will be feasible to have the retaining structure hold the front or inboard ferrule to the fitting component, with the ferrule cartridge feature thus being optional, or may hold a single conduit gripping device or may hold only the outboard conduit gripping device.

Although not limiting the scope of the present inventions, the exemplary fitting design of FIGS. 43-49 is well known and commercially available from Swagelok Company, Solon, Ohio, except as follows. In the exemplary embodiments herein that utilize two or more ferrules or additional parts with one or more ferrules, the ferrules include a ferrule cartridge feature or retaining structure R that allows the ferrules to be assembled together as a discrete unit. The ferrule cartridge design is fully described in pending United States patent application serial no. PCT/US2009/67508 filed on Dec. 10, 2009 for FERRULE ASSEMBLY FOR CONDUIT FITTING, noted above. The ferrule cartridge retaining feature R cooperates with the retaining feature described hereinbelow so as to retain two ferrules with the retaining fitting component if so desired. However, the retaining feature described herein may also be used to retain a single conduit gripping device with the retaining fitting component, or may be used to retain only one of two ferrules (such as the back ferrule 30-4 for example) in a two ferrule fitting, or other ferrule cartridge retaining structures may be used as needed. Therefore, the retaining feature and concepts herein are not limited in any manner to the disclosed use with the ferrule cartridge retaining structure R. Moreover, other ferrule cartridge retaining structures may alternatively be used, including using an adhesive to hold the ferrules together.

In the exemplary embodiments herein, the back ferrule 30-4 may be conventional in design, if so desired, so that the first retaining portion 42-4 may simply be realized in the form of the internal recess 39*a*-4 of the back ferrule 30-4. For back ferrules or single ferrules that do not have such a recess, a notch or other relief or structure may be formed or otherwise provided, provided that such change does not adversely affect form, fit and function of that ferrule or the fitting.

Alternatively, the front ferrule may be modified to include a structure or feature (not shown) that will interact with the second retaining portion 44-4, but for the exemplary embodiments such structure is not used. For example, a notch or relief may be formed in the inside cylindrical wall of the front ferrule provided such a notch or relief does not adversely affect the form, fit and function of the front ferrule, In such an example, for instance, the second retaining portion 44-4 may wrap around the outside of the back ferrule 30-4 so as not to interfere with the conduit gripping function of the back ferrule during pull-up. The second retaining portion 44 may extend to the front ferrule to provide the cartridge nut assembly.

The fitting parts 12-4, 14-4, 24-4 and 30-4 illustrated herein, other than with the ferrule cartridge retaining structure R and the retaining feature of the present disclosure, are also further described in a number of issued and pending patent applications, including U.S. Pat. Nos. 5,882,050 and 6,629,708 which are fully incorporated herein by reference. The fittings of FIGS. 43-48 herein may operate as described in such patents, but are modified as described herein to provide a discontinuous cartridge, subassembly or preassembly for retaining at least one conduit gripping device with one of the fitting components, as set forth below. It is intended that the retaining structures for the ferrule cartridge concept and the cartridge nut concept do not alter the form, fit and function of the basic fitting design and operation.

In this exemplary embodiment, two conduit gripping devices are retained with the female threaded nut 14-4 as a discontinuous cartridge 25-4, but alternative embodiments may be realized with a single conduit gripping device or more than two gripping devices with or without additional parts, or with male threaded nuts, or any combination thereof. For the case of multiple conduit gripping devices or a ferrule set, we refer to the out-board conduit gripping device (for example, the back ferrule 30-4 in the embodiment of FIGS. 43-48) as the retaining conduit gripping device because in the exemplary embodiments herein the retaining structure cooperates with the back ferrule 30-4. Alternative embodiments however may utilize a retaining structure that cooperates with the front ferrule 24-4 as the conduit gripping device.

The back ferrule 30-4 will coact with the second retaining portion 44-4, the latter of which will also coact with the retaining fitting component 14-4, so as to retain the ferrule or ferrule set together with the nut 14-4 as a discrete and discontinuous subassembly 25-4.

The second retaining portion 44-4 may be realized in the form of a retaining member such as a hook or clip-like device 46-4. The retaining member 46-4 may be but does not necessarily have to be a generally annular or ring-like structure that has a first portion 46a-4 that catches or engages with a portion of the retaining fitting component or nut 14-4, and a second portion 46b-4 that catches or engages with a portion of the back ferrule 30-4. In this embodiment, the retaining member first portion 46a-4 engages an outboard wall 14a-4 of the nut 14-4. The second portion 46b-4 may include a reverse hook 48-4 that is received in the interior recess 39a-4 of the back ferrule 30-4. The retaining member 46-4 may compressively hold the back ferrule against the nut 14-4 drive wall 34-4, or there may be some looseness provided. Alternatively, the retaining member need not be a completely annular part but may be a simple planar clip or a plurality of clips (not shown) that hold the back ferrule 30-4 with the nut 14-4. A third portion 46c-4 joins the first and second portions. The retaining member 46-4 may have some flex or give to it so that when the back ferrule 30-4 is inserted into the nut 14-4, the hook 48-4 may deflect radially outward somewhat to allow the back ferrule to be fully inserted into the nut and have the hook 48-4 received in the interior recess 39a-4. Alternatively, the retaining member 46-4 may be installed after the ferrules have been inserted into the retaining fitting component 14-4. In the optional alternative case where the ferrule cartridge concept R is also used, retention of the back ferrule 30-4 with the nut 14-4 also holds the front ferrule 24-4 as part of the cartridge assembly 25-4.

As with other embodiments above, the location, shape, size, length and profile of the retaining member 46-4 will depend in part on the design of the cooperating first retaining portion 42-4 of the retaining conduit gripping device, in this case the back ferrule 30-4, as well as the shape of the retaining fitting component 14-4. The design of the retaining structure 40-4, including the design of the first retaining portion 42-4 and the second retaining portion 44-4, may also depend in part on how robust a connection is desired between the retaining fitting component and the conduit gripping devices, in other words, the nature of the retention force desired. For example, in some applications it may be desired to have the ferrules 24-4, 30-4 strongly and securely retained with the fitting component 14-4 so that the ferrules do not fall out or get knocked out during handling, shipping or exposure to other force applying environments, while in other applications such a strong retention force may not be needed. As another example, in some applications it may be desired to have the ferrules snugly held together and retained with the fitting component, while in other applications it may be more desirable to have the ferrules somewhat loosely held together and retained with the fitting component. These are just a few of the criteria that may be considered when designing the retaining structure 40-4. The retaining member 46-4 may contact the back ferrule 30-4 when the ferrules 24-4, 30-4 are installed in the retaining fitting component, or may be axially spaced such that the retaining member only contacts the back ferrule 30-4 should the back ferrule drop down into contact with the retaining member 46-4. Looser retention of the ferrules in the nut 14-4 may facilitate pull-up of the fitting assembly by not interfering with centering of the ferrules as the nut 14-4 is initially rotated relative to the body 12-4.

The second retaining portion 44-4 may be designed to achieve the desired retaining force for the subassembly 25-4 prior to assembly with the mating fitting component. The second retaining portion 44-4 may also optionally be designed to facilitate release of the retaining fitting component from the one or more conduit gripping devices after assembly with the mating fitting component, for example after or during a partial pull up or a complete pull up of the fitting assembly onto a conduit.

As in other embodiments herein, the retaining member 46-4, in cooperation with the design of the interior recess 39a of the back ferrule, may also be designed such that the ferrules 24-4, 30-4 are somewhat loosely retained and may even have a slight rattle when the nut 14 is gently shaken. This looseness may in some applications facilitate final assembly with the second or mating fitting component (in this example the body 12-4), especially in allowing the ferrules to center and align during pull-up of the fitting assembly 10-4. In alternative embodiments, however, the ferrules 24-4, 30-4 may be snugly or even tightly retained in the nut 14-4.

The retaining conduit gripping device may have a retaining position and a release or disengage position. In the retaining position the conduit gripping devices and the retaining fitting component form and may be used as a discontinuous cartridge 25-4. In the release position, the retaining conduit gripping device is separable from the retaining structure 40-4. Preferably, the retaining conduit gripping device is in the release position after a partial or complete pull-up so as to not adversely interfere with the retaining fitting component.

The retaining member 46-4 may be made of any suitable material such as metal or plastic, and preferably robust enough to retain the ferrules with the nut 14-4 as a cartridge nut assembly 25-4. Use of a metal retaining member 46-4 allows for all metal fitting assemblies for high temperature applications or use with fluids that may damage an elastomer or plastic. Suitable metals may include but are not limited to stainless steel, brass, copper, steel and so on to name just a few of the many available materials.

Figure 43:
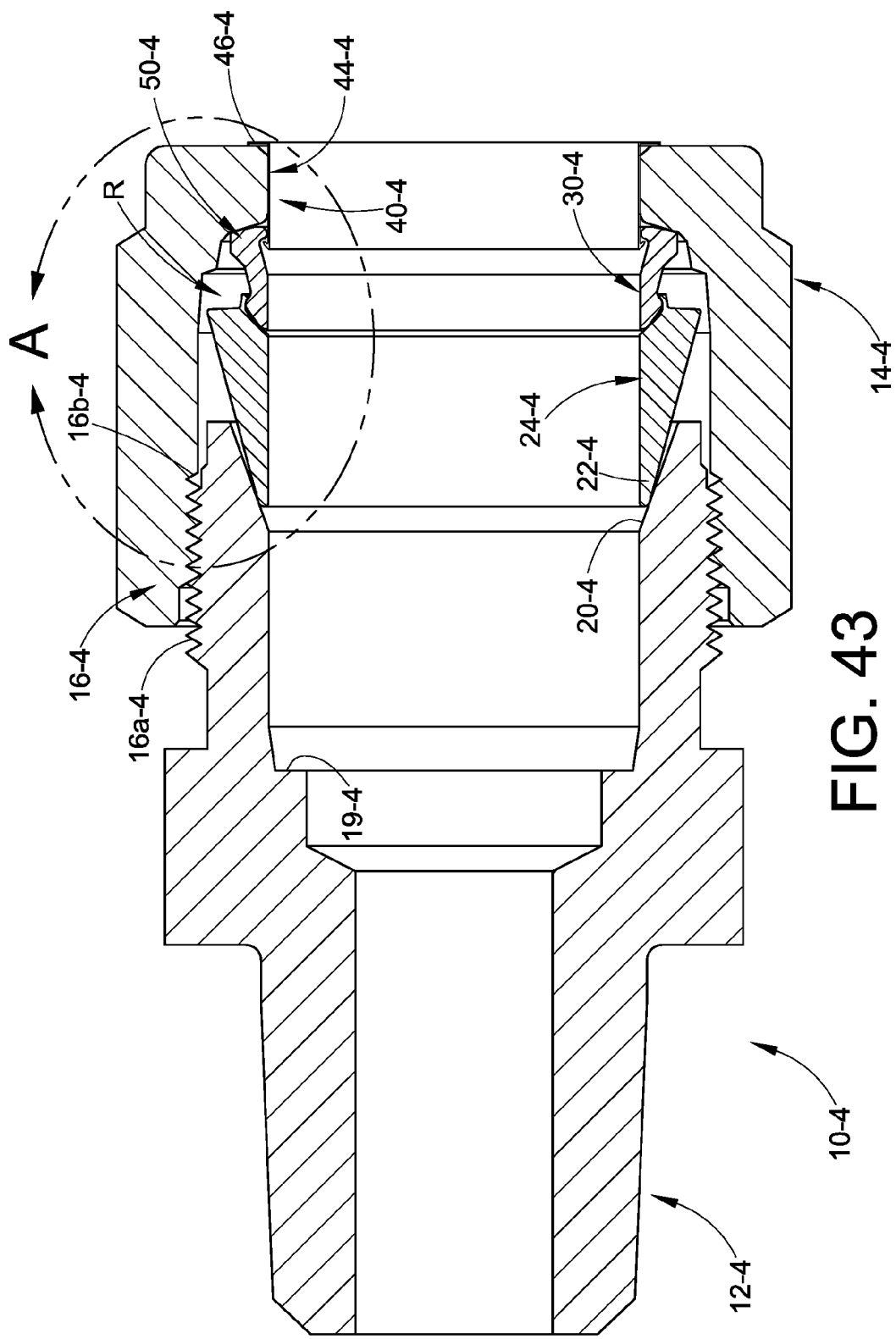
FIG. 43 is an embodiment of a conduit fitting cartridge, subassembly or preassembly illustrating one embodiment of one or more of the inventions herein, shown in longitudinal cross-section and joined to a second fitting component in a finger tight position, with the conduit omitted for clarity.
Figure 44:
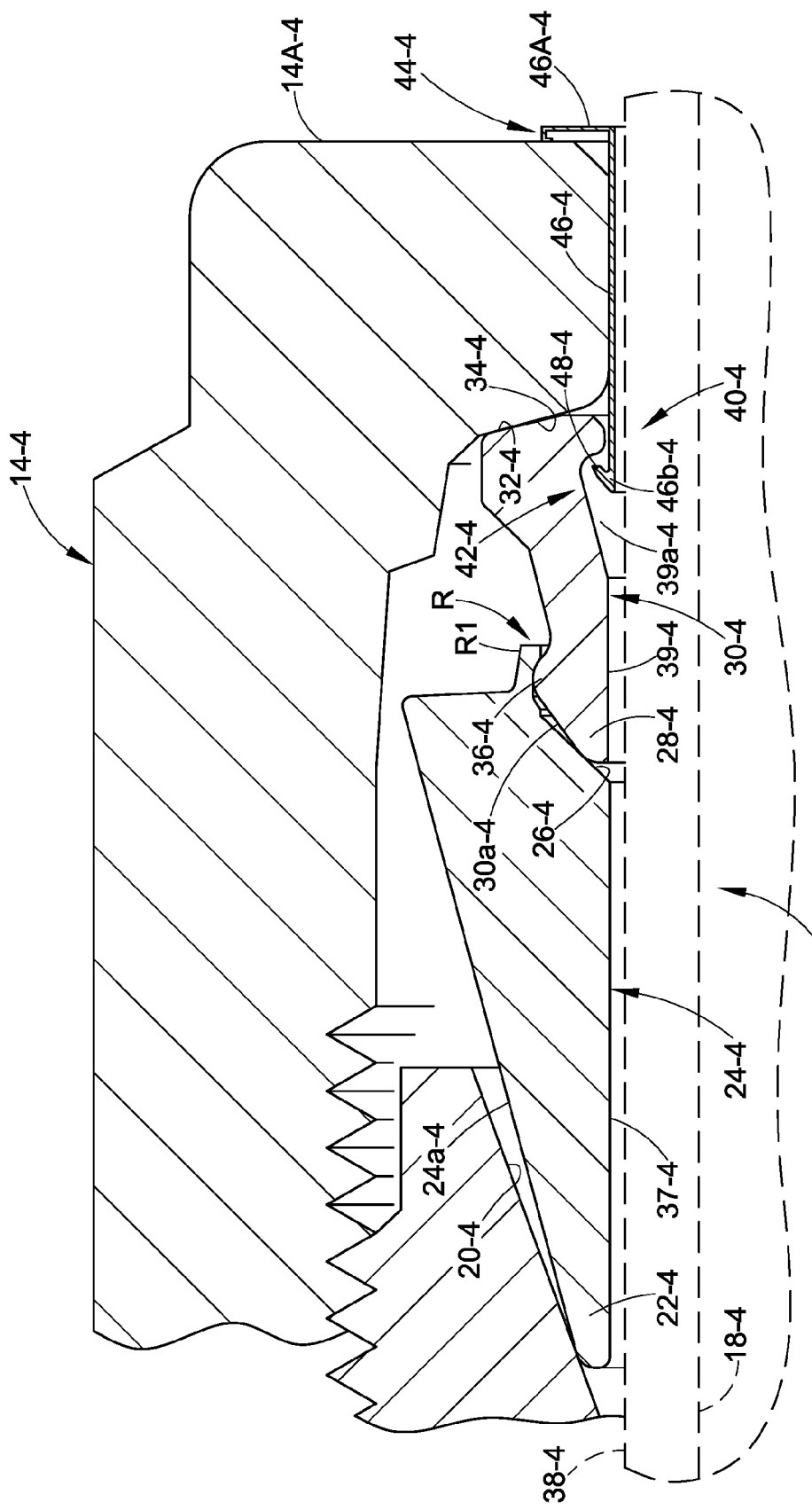
FIG. 44 is an enlarged view of the circled region A in FIG. 43.
Figure 45:
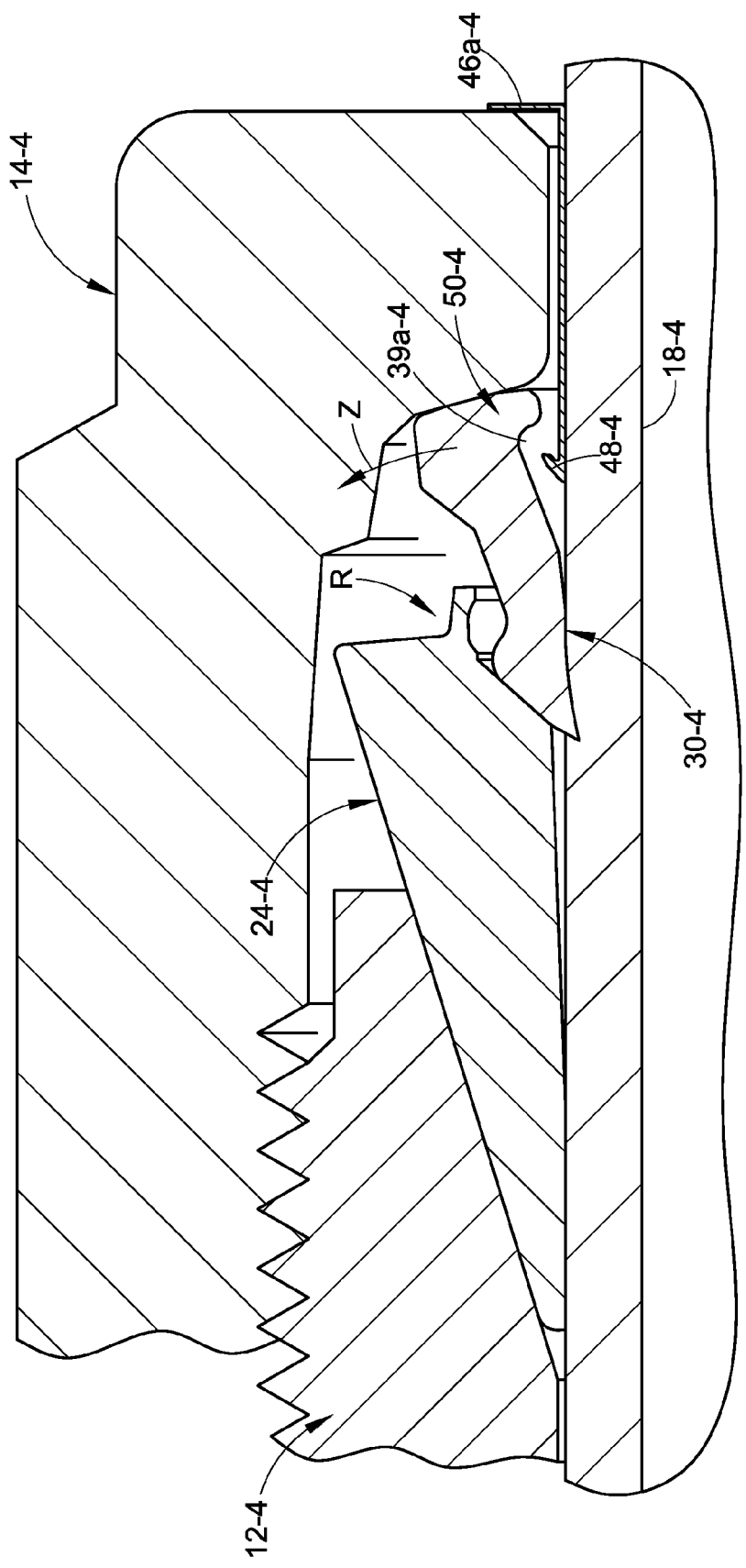
FIG. 45 illustrates the embodiment of FIG. 44 with the fitting components in an assembled position of a partial or complete pull-up onto a conduit end.

FIGS. 43 and 44 show the subassembly 25-4 after it has been joined to the second or mating fitting component 12-4 to a finger tight position. In this position, the retaining member 46-4 still has a hook 48-4 disposed within the interior recess 39a-4 of the back ferrule 30-4. With reference to FIG. 45, we show the body 12-4, the conduit gripping devices 24-4, 30-4, and the retaining fitting component or nut 14-4 after they have been tightened together during pull-up. In this example, we illustrate the parts tightened together after a complete pull-up. During pull-up, the ferrules 24-4 and 30-4 are axially compressed together by relative axial movement between the nut 14-4 and the body 12-4. This causes the ferrules to plastically deform so as to effect conduit grip and seal. For the exemplary fitting, the back ferrule deforms in such a manner that a rear portion 50-4 of the back ferrule rotates radially outward from the conduit 18-4 as represented by the arrow Z in FIG. 45. This deformation is typically a plastic deformation but also may partially include some elastic deformation. This rotation causes the hook 48 to be separated from the interior recess 39a-4, thereby releasing or separating the retaining member 46-4 from the back ferrule 30-4. The retaining structure 40-4 preferably is designed so as to not interfere with normal operation and pull-up of the conduit gripping devices onto the conduit to effect grip and seal.

When the ferrule cartridge retaining structure R is also used, it will be noted that the ferrules also release from each other during pull-up, because the front portion 28-4 of the back ferrule is radially compressed inward away from the retaining structure R1 of the front ferrule 24-4.

In an alternative embodiment, the retaining member 46-4, and especially the hook portion 48-4 may be elastic enough so that a back ferrule or single ferrule of different design may not need to be necessarily plastically rotated away from the hook 48-4.

The design of the retaining member 46-4 may be chosen in concert with the amount of relative axial displacement of the nut 14-4 and the body 12-4 to determine at what point during pull-up the retaining member 46 releases from the retaining conduit gripping device. For example, it may be desired in some embodiments to have the retaining member 46-4 released just prior to completion of a pull-up operation. As another example, it may be desired to have the retaining member release after a partial pull-up or after a pre-swage operation.

Accordingly, one or more of the present inventions facilitates a retaining mechanism or structure and method by which one or more ferrules or conduit gripping devices may be retained with a fitting component as a discontinuous cartridge 25-4, with the retaining structure then being released by plastic deformation of the retaining conduit gripping device during pull-up (either a complete pull-up or a partial pull-up as needed) so that the nut 14-4 is released and may subsequently be axially withdrawn or pulled back from the body 12-4.

For embodiments that use a retaining member 46-4 in the form of a clip or hook, it will be appreciated that in many uses the retaining member 46-4 may be flexible but fairly stiff to provide a robust connection between the conduit gripping devices and the retaining fitting component. This stiffness may be used to assure a robust subassembly that does not come apart too easily (as determined by the designer) during handling and shipping. It can therefore be expected that when the retaining member engages the retaining conduit gripping device (e.g. the back ferrule 30-4 as in the FIG. 43 embodiment), that the retaining member 46-4 may snap into the interior recess 39a-4 with sufficient impact as to produce an audible "click". This audible feedback may alert the assembler directly that the retaining member has released, or sensors may be used (such as, for example, recorders, transmitters and light indicators) to indicate sufficient pull-up to the release position.

As noted above, use of the discontinuous cartridge 25-4 facilitates providing ferrule sets to the end user in which the ferrules and nuts are properly matched at the manufacturer. This can significantly simplify inventory control and reduce final assembly time. The embodiments herein also allow for a cartridge design in which the retaining fitting component may be used for fitting assemblies that do not need or have the retaining member 46-4. In other words, the cartridge designs herein use a nut or retaining fitting component that is backwards compatible with fitting assemblies that the end user may not require with a retaining structure. The cartridge design also may be realized using ferrule sets that do not require modification. Therefore, the cartridge concepts herein may be optionally provided for an end user without having to manufacture nuts or ferrules with different geometry and operation or performance. This allows the convenience of manufacturing and selling fitting components and ferrules as separate parts regardless of the end use of such individual parts, either for a cartridge use or a non-cartridge use.

In an exemplary method, one or more conduit gripping devices are retained with a retaining fitting component as a discontinuous cartridge. This discontinuous cartridge forms a first part of a two part fitting assembly. The cartridge is then joined with the second part of the fitting assembly and a portion of a conduit. During at least a partial pull-up of the fitting assembly, the conduit gripping devices become attached to the conduit and become disengaged from the retaining fitting component so that the retaining fitting component may be removed from the fitting assembly after the partial or complete pull-up while the one or more conduit gripping devices remain attached to the conduit. In a more specific embodiment, the method may include the steps of retaining one or more conduit gripping devices with a retaining fitting component as a discontinuous cartridge, joining the cartridge to a second fitting component on a conduit to cause the conduit gripping devices to attach to the conduit, and disengaging the retaining fitting component from the conduit gripping devices so that the retaining fitting component may be removed from the fitting assembly after a partial pull-up while the one or more conduit gripping devices remain attached to the conduit. In still a more specific embodiment, the retaining member releases from the retaining conduit gripping device by deformation of the retaining conduit gripping device during pull-up.

Figure 46:
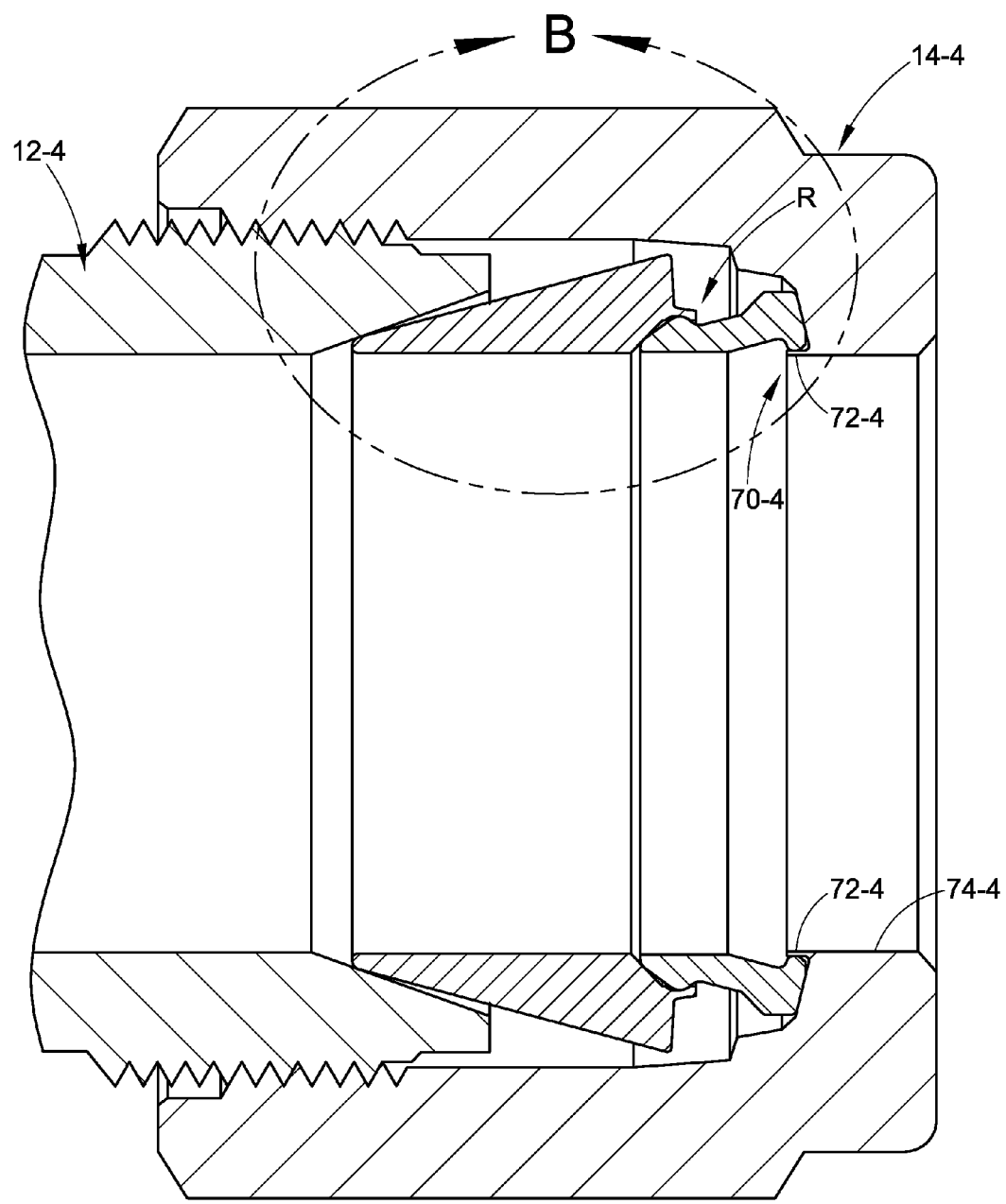
FIG. 46 illustrates another embodiment of a conduit fitting cartridge, subassembly or preassembly illustrating one embodiment of one or more of the inventions herein, shown in longitudinal cross-section and joined to a second fitting component in a finger tight position, with the conduit omitted for clarity.
Figure 47:
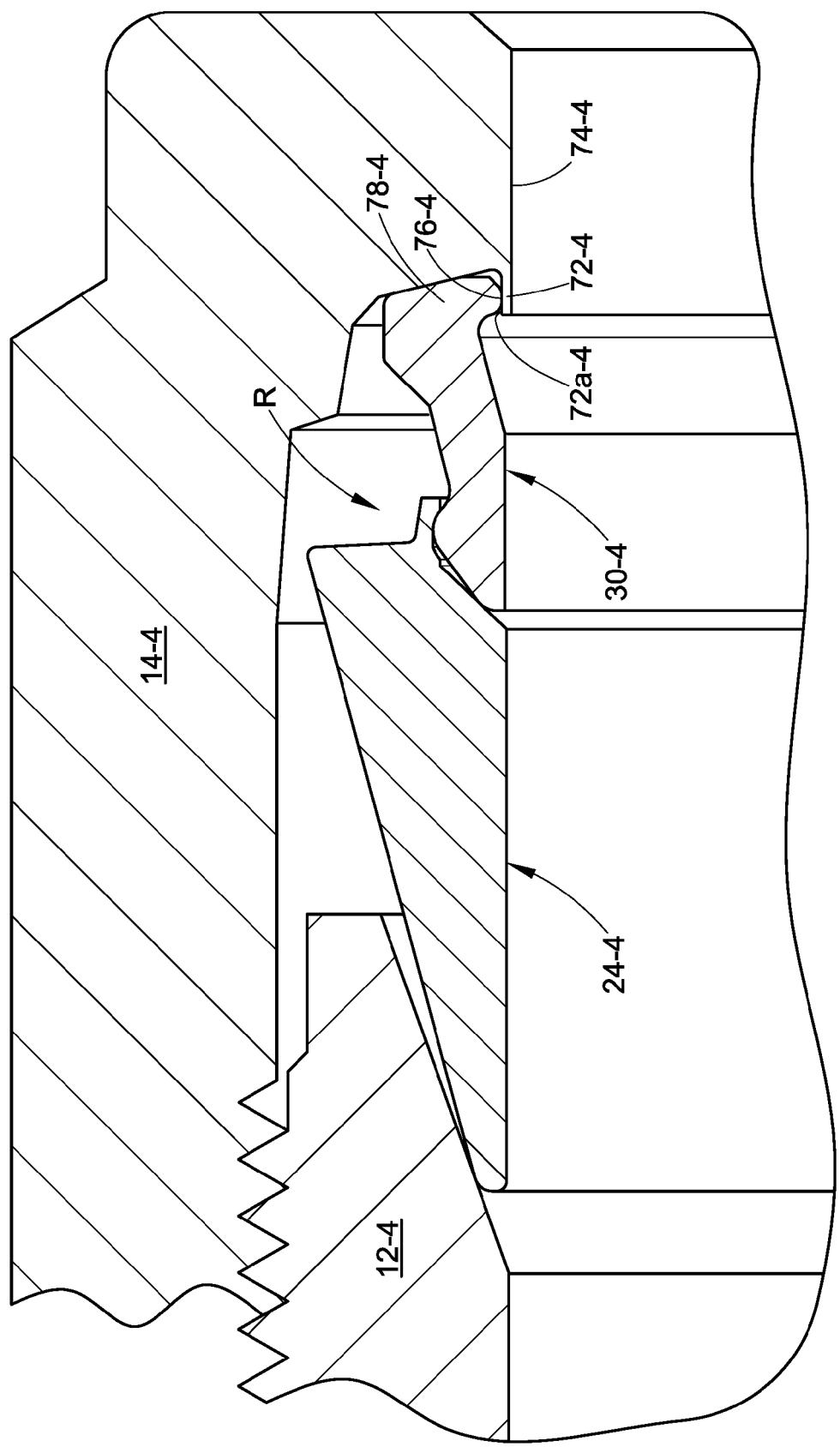
FIG. 47 is an enlarged view of the circled region B in FIG. 46.
Figure 48:
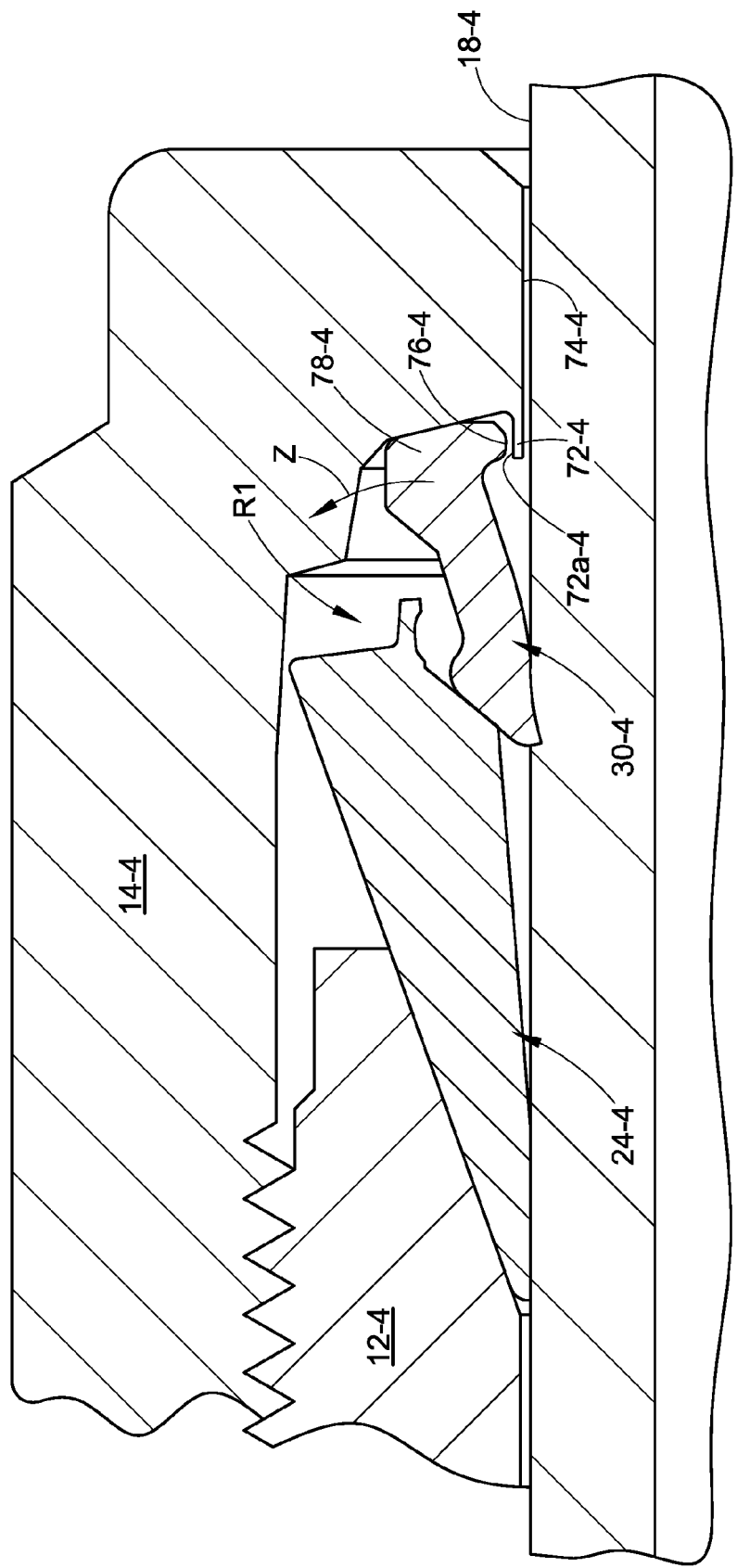
FIG. 48 illustrates the embodiment of FIG. 46 with the fitting components in an assembled position of a partial or complete pull-up onto a conduit end.

With reference to FIGS. 46-48, we illustrate another embodiment of a retaining member 70-4 that may be used to retain one or more conduit gripping devices with a retaining fitting component. In this example, the retaining member 70-4 may be realized in the form of a clip or tang 72-4 that is integrally machined or formed as an extension of an interior wall 74-4 of the nut 14-4. This tang 72-4 may alternatively be attached to the nut by any suitable process such as welding. The tang 72-4 may be dimensioned so as to have a surface 72a-4 that provides a desired friction fit with a back end wall portion 76-4 of the back ferrule 30-4 so as to hold onto the back ferrule. The optional ferrule cartridge retaining feature R may also be used for two ferrule fittings. During pull-up, the back ferrule 30-4 deforms in such a manner that the rear portion 78-4 of the back ferrule rotates radially outward from the conduit 18-4 as represented by the arrow Z in FIG. 48. This rotation causes the tang 72-4 to be separated from the back ferrule back end wall portion 76-4, thereby releasing or separating the retaining member 70-4 from the back ferrule 30-4. The release or separation of the tang surface 72a-4 from the back ferrule back end wall portion 76-4 may but need not be accompanied by the two surfaces being out of contact after pull-up. In some applications it may be sufficient that the back ferrule deform only to such an extent as to remove or substantially reduce the frictional engagement between the surfaces. The retaining member 70-4 preferably is designed so as to not interfere with normal operation and pull-up of the conduit gripping devices onto the conduit to effect grip and seal.

In further alternative embodiments, a single ferrule or the ferrule cartridge retaining structure R may be used with an adhesive or other attachment means applied to a back or outboard end of the back ferrule 30-4 to hold the conduit gripping devices with the retaining fitting component as a cartridge nut. In another alternative, spot welding may be used to secure a back or outboard end of the back ferrule 30-4 to hold the conduit gripping devices with the retaining fitting component as a cartridge nut. For fittings that use silver plating or other lubricant on the retaining fitting component, this plating may be removed prior to the spot welding operation. Autogenous spot welding may be conveniently used between the back end of the back ferrule and an inner surface of the nut 14-4.

Figure 49:
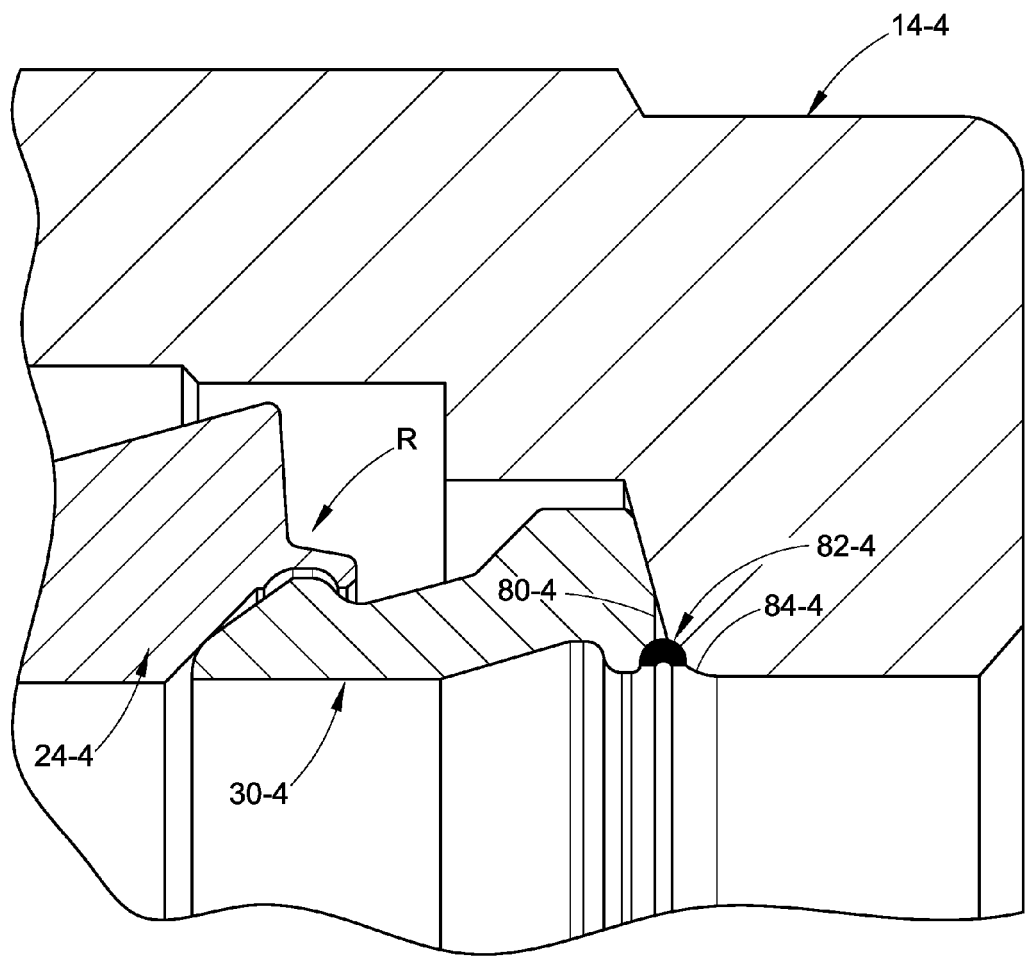
FIG. 49 illustrates an embodiment of a conduit fitting cartridge using welded parts, for example, tack welded.

FIG. 49 illustrates in partial longitudinal cross-section an embodiment of a cartridge nut concept that uses welded parts. The body 12-4 (not shown), nut 14-4 and cartridge ferrules 24-4, 30-4 may be similar to those described hereinabove and like reference numerals are used for like parts. In this example, a rearward surface 80-4 of the back ferrule 30-4 may be tack welded as at 82-4 to an interior surface 84-4 of the nut 14-4. The location of the tack weld 82-4 may be chosen as convenient for the welding process to be used. More than one tack weld may be used, and the size of the weld 82-4 may be selected to achieve the desired robustness for the cartridge nut, yet able to fracture or break during pull-up of the fitting. Preferably, the weld will not break during assembly to the finger-tight position as shown in FIG. 49, but upon relative rotation of the nut and body will break so as to disengage the back ferrule 30-4 from the nut 14-4 so as not to interfere with the normal pull-up performance of the fitting.

Although the adhesive and welding embodiments are not discontinuous cartridge embodiments per se, they may be useful in some fitting designs as the fitting components require no modification from their original design.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A preassembly for a conduit fitting, comprising:
a threaded fitting component, a front ferrule and a back ferrule,
said threaded fitting component comprising an interior volume and a drive surface, said back ferrule being disposed entirely in said interior volume between said front ferrule and said drive surface,
a retaining member that retains said front ferrule and said back ferrule with said threaded fitting component,
wherein said retaining member has a first position relative to said threaded fitting component in which said front ferrule is retained with said threaded fitting component, and a release position relative to said threaded fitting component in which said retained front ferrule is separable from said threaded fitting component; and
wherein when the preassembly is assembled with a mating fitting component and pulled up on a conduit, the retaining member is moved from the first position to the release position.

2. The preassembly of claim 1 wherein said retaining member is received in a recess of said threaded fitting component when said retaining member is in said first position relative to said threaded fitting component.

3. The preassembly of claim 2 wherein said retaining member comprises an extension of said front ferrule.

4. The preassembly of claim 3 wherein said threaded fitting component is female threaded.

5. The preassembly of claim 3 wherein said threaded fitting component comprises a surface that engages said retaining member when said retaining member is in said release position relative to said threaded fitting component such that said retaining member is bent from the first position to the release position when said retaining member engages said surface to release said front ferrule from said threaded fitting component.

6. The preassembly of claim 2 wherein said retaining member is bent in an inboard direction from the first position to the release position.

7. The preassembly of claim 2 wherein said retaining member is bent in an outboard direction from the first position to the release position.

8. The preassembly of claim 2 wherein said front ferrule comprises a recess that receives a portion of said retaining member when said retaining member is bent to the release position.

9. The preassembly of claim 2 wherein said retaining member is angled in an outboard direction when in said first position.

10. The preassembly of claim 2 wherein said retaining member is angled in an inboard direction when bent to said release position.

11. The preassembly of claim 3 wherein said retaining member comprises a flexible extension of said front ferrule.

12. The preassembly of claim 11 wherein said flexible extension comprises a flange.

13. The preassembly of claim 1 wherein relative axial movement of said front ferrule with respect to said threaded fitting component causes said retaining member to be at said release position.

14. The preassembly of claim 1, wherein the front ferrule includes a rear camming surface and a counterbore outboard of the rear camming surface and sized to receive a front end portion of the back ferrule.

15. The preassembly of claim 1 wherein said retaining member is in said release position after said front ferrule and said back ferrule have been pre-swaged onto a conduit.

16. The preassembly of claim 1 wherein said first position is a first radial position of said retaining member relative to said threaded fitting component, and said release position is a second radial position of said retaining member relative to said threaded fitting component.

17. A preassembly for a conduit fitting, comprising:
a threaded fitting component, a front ferrule and a back ferrule,
said threaded fitting component comprising an interior volume and a drive surface, said back ferrule being disposed entirely in said interior volume between said front ferrule and said drive surface,
a retaining member that retains said front ferrule and said back ferrule with said threaded fitting component,
wherein said retaining member has a first position relative to said threaded fitting component in which said front ferrule is retained with said threaded fitting component, and a release position relative to said threaded fitting component in which said retained front ferrule is separable from said threaded fitting component;
wherein said retaining member comprises a flexible extension of said front ferrule, wherein said flexible extension comprises a flange, and wherein said flange is a continuous annular member.

18. A conduit fitting, comprising:
a first threaded fitting component and a second threaded fitting component that can be mated with said first fitting component, a front ferrule and a back ferrule,
said second threaded fitting component comprising an interior volume and a drive surface, said back ferrule being disposed entirely in said interior volume between said front ferrule and said drive surface,
a retaining member that retains said front ferrule and said back ferrule with said second threaded fitting component, wherein said retaining member has a first position relative to said second threaded fitting component in which said front ferrule is retained with said second threaded fitting component, and a release position relative to said second threaded fitting component in which said retained front ferrule is separable from said second threaded fitting component; and wherein during a partial or complete pull-up of the conduit fitting on a conduit, the retaining member is moved from the first position to the release position.

19. The conduit fitting of claim 18 wherein said first threaded fitting component comprises a fitting body and said second threaded fitting component comprises a fitting nut.

20. The conduit fitting of claim 19 wherein said fitting body is male threaded and said fitting nut is female threaded.

21. The conduit fitting of claim 18 wherein the conduit fitting comprises only metal.

22. The conduit fitting of claim 18, wherein the front ferrule includes a rear camming surface and a counterbore outboard of the rear camming surface and sized to receive a front end portion of the back ferrule.

23. The conduit fitting of claim 18 wherein when said first threaded fitting component is at least partially tightened together with said second threaded fitting component, said retaining member is released from said second threaded fitting component.

24. The conduit fitting of claim 18 wherein said retaining member is in said release position after said front ferrule and said back ferrule have been pre-swaged onto a conduit.

25. A preassembly for a conduit fitting, comprising:

a threaded fitting component, a front ferrule and a back ferrule, said threaded fitting component comprising an interior volume and a drive surface, said back ferrule being disposed entirely in said interior volume between said front ferrule and said drive surface, a retaining member that retains said front ferrule and said back ferrule with said threaded fitting component, wherein said retaining member has a first position relative to said threaded fitting component in which said front ferrule is retained with said threaded fitting component, and a release position relative to said threaded fitting component in which said retained front ferrule is separable from said threaded fitting component; and wherein the preassembly comprises only metal.

26. A preassembly for a conduit fitting, comprising:

a threaded fitting component, a front ferrule and a back ferrule, said threaded fitting component comprising an interior volume and a drive surface, said back ferrule being disposed entirely in said interior volume between said front ferrule and said drive surface, a retaining member that retains said front ferrule and said back ferrule with said threaded fitting component, wherein said retaining member has a first position relative to said threaded fitting component in which said front ferrule is retained with said threaded fitting component, and a release position relative to said threaded fitting component in which said retained front ferrule is separable from said threaded fitting component;

wherein said retaining member is received in a recess of said threaded fitting component when said retaining member is in said first position relative to said threaded fitting component; and wherein when said retaining member is in said first position relative to said threaded fitting component, said retaining member is received in said recess of said threaded fitting component with a gap present between said retaining member and a surface of said recess so that said front ferrule and said back ferrule are loosely retained in said threaded fitting component.

* * * * *